(12) United States Patent
Stachura

(10) Patent No.: US 11,184,711 B2
(45) Date of Patent: Nov. 23, 2021

(54) PRIVACY DEVICE FOR MOBILE DEVICES

(71) Applicant: Thomas Stachura, Edmonton (CA)

(72) Inventor: Thomas Stachura, Edmonton (CA)

(73) Assignee: Thomas Stachura

( * ) Notice: Subject to any disclaimer, the term of this patent is extended or adjusted under 35 U.S.C. 154(b) by 0 days.

(21) Appl. No.: 16/785,202

(22) Filed: Feb. 7, 2020

(65) Prior Publication Data

US 2020/0260183 A1 Aug. 13, 2020

Related U.S. Application Data

(60) Provisional application No. 62/958,305, filed on Jan. 7, 2020, provisional application No. 62/802,628, filed on Feb. 7, 2019.

(51) Int. Cl.

| | |
|---|---|
| *G06F 3/01* | (2006.01) |
| *H04R 5/04* | (2006.01) |
| *G10L 15/18* | (2013.01) |
| *G10L 25/78* | (2013.01) |
| *G10L 15/08* | (2006.01) |

(Continued)

(52) U.S. Cl.
CPC ............... *H04R 5/04* (2013.01); *G06F 3/011* (2013.01); *G06F 3/017* (2013.01); *G10L 15/08* (2013.01); *G10L 15/18* (2013.01); *G10L 15/22* (2013.01); *G10L 15/30* (2013.01); *G10L 17/24* (2013.01); *G10L 25/51* (2013.01); *G10L 25/78* (2013.01); *H04R 3/005* (2013.01); *H04R 29/004* (2013.01); *G10L 2015/088* (2013.01); *G10L 2015/223* (2013.01); *G10L 2025/783* (2013.01); *H04R 2420/01* (2013.01); *H04R 2499/11* (2013.01)

(58) Field of Classification Search
CPC ...... H04R 3/005; H04R 2499/11; G06F 3/017
See application file for complete search history.

(56) References Cited

U.S. PATENT DOCUMENTS

| | | | | |
|---|---|---|---|---|
| 5,448,646 A | * | 9/1995 | Lucey | ..................... H04M 1/60 381/309 |
| 6,005,548 A | | 12/1999 | Latypov et al. | |

(Continued)

FOREIGN PATENT DOCUMENTS

CN 101604447 B 6/2011

OTHER PUBLICATIONS

Bjorn Karmann. "Project Alias." Instructables. https://www.instructables.com/id/Project-Alias/. Retrieved Feb. 7, 2020. 2 pages.

(Continued)

*Primary Examiner* — Ping Lee
(74) *Attorney, Agent, or Firm* — Banner & Witcoff, Ltd.

(57) ABSTRACT

Systems, apparatuses, and methods are described for a privacy blocking device configured to prevent receipt, by a listening device, of video and/or audio data until a trigger occurs. A blocker may be configured to prevent receipt of video and/or audio data by one or more microphones and/or one or more cameras of a listening device. The blocker may use the one or more microphones, the one or more cameras, and/or one or more second microphones and/or one or more second cameras to monitor for a trigger. The blocker may process the data. Upon detecting the trigger, the blocker may transmit data to the listening device. For example, the blocker may transmit all or a part of a spoken phrase to the listening device.

30 Claims, 10 Drawing Sheets

(51) Int. Cl.
*G10L 15/22* (2006.01)
*G10L 15/30* (2013.01)
*G10L 25/51* (2013.01)
*G10L 17/24* (2013.01)
*H04R 3/00* (2006.01)
*H04R 29/00* (2006.01)

(56) References Cited

U.S. PATENT DOCUMENTS

| | | | |
|---|---|---|---|
| 6,252,544 B1 | 6/2001 | Hoffberg | |
| 6,804,396 B2 | 10/2004 | Higaki et al. | |
| 7,010,332 B1* | 3/2006 | Irvin | H04M 1/05 455/575.2 |
| 7,106,843 B1 | 9/2006 | Gainsboro et al. | |
| 7,340,077 B2 | 3/2008 | Gokturk et al. | |
| 7,444,000 B2 | 10/2008 | Rhoads | |
| 7,760,905 B2 | 7/2010 | Rhoads et al. | |
| 7,840,031 B2 | 11/2010 | Albertson et al. | |
| 8,090,961 B2 | 1/2012 | Yoffe et al. | |
| 8,522,309 B2 | 8/2013 | Yoffe et al. | |
| 8,638,989 B2 | 1/2014 | Holz | |
| 8,723,789 B1 | 5/2014 | Rafii | |
| 8,745,541 B2 | 6/2014 | Wilson et al. | |
| 9,024,842 B1 | 5/2015 | Prada Gomez et al. | |
| 9,357,320 B2 | 5/2016 | Gelter | |
| 9,472,206 B2 | 10/2016 | Ady | |
| 9,697,828 B1 | 7/2017 | Prasad et al. | |
| 9,747,884 B2 | 8/2017 | Lehmann | |
| 10,002,259 B1 | 6/2018 | Mai | |
| 10,354,648 B2 | 7/2019 | Christopher | |
| 10,354,658 B2 | 7/2019 | Wilberding | |
| 10,616,411 B1 | 4/2020 | Chang et al. | |
| 2004/0264149 A1 | 12/2004 | Carswell | |
| 2008/0168290 A1 | 7/2008 | Jobs et al. | |
| 2008/0317265 A1* | 12/2008 | Bouza, II | G10K 11/002 381/177 |
| 2009/0103169 A1* | 4/2009 | Kokeguchi | G02F 1/1508 359/296 |
| 2010/0066676 A1 | 3/2010 | Kramer et al. | |
| 2010/0125816 A1 | 5/2010 | Bezos | |
| 2010/0306713 A1 | 12/2010 | Geisner et al. | |
| 2011/0032184 A1 | 2/2011 | Roche et al. | |
| 2011/0173204 A1 | 7/2011 | Murillo et al. | |
| 2011/0173574 A1 | 7/2011 | Clavin et al. | |
| 2011/0185309 A1 | 7/2011 | Challinor et al. | |
| 2011/0291926 A1 | 12/2011 | Gokturk et al. | |
| 2011/0301934 A1 | 12/2011 | Tardif | |
| 2013/0038458 A1* | 2/2013 | Toivola | H04R 1/1091 340/665 |
| 2013/0074002 A1 | 3/2013 | Markovic et al. | |
| 2013/0159939 A1 | 6/2013 | Krishnamurthi | |
| 2013/0174205 A1* | 7/2013 | Jacobsen | G06F 3/011 725/81 |
| 2013/0231930 A1 | 9/2013 | Sanso | |
| 2013/0278501 A1 | 10/2013 | Bulzacki | |
| 2014/0222436 A1 | 8/2014 | Binder et al. | |
| 2014/0278435 A1 | 9/2014 | Ganong, III et al. | |
| 2015/0221307 A1 | 8/2015 | Shah et al. | |
| 2015/0279366 A1 | 10/2015 | Krestnikov et al. | |
| 2016/0098983 A1* | 4/2016 | Lehmann | H04M 1/04 455/575.1 |
| 2016/0253149 A1 | 9/2016 | Iyer et al. | |
| 2017/0004293 A1* | 1/2017 | Mantri | G06F 1/1694 |
| 2017/0148444 A1 | 5/2017 | Bocklet et al. | |
| 2017/0180984 A1* | 6/2017 | Thomas | H04M 1/667 |
| 2017/0280223 A1* | 9/2017 | Cavarra | G06F 1/1694 |
| 2018/0324518 A1* | 11/2018 | Dusan | G10L 25/06 |
| 2018/0329512 A1* | 11/2018 | Liao | G10L 15/265 |
| 2019/0043466 A1 | 2/2019 | Masterson et al. | |
| 2019/0043471 A1 | 2/2019 | Maziewski et al. | |
| 2019/0074002 A1 | 3/2019 | Christopher | |
| 2019/0147173 A1 | 5/2019 | Mai | |
| 2019/0147847 A1 | 5/2019 | Mai | |
| 2019/0147848 A1 | 5/2019 | Mai | |
| 2019/0147874 A1 | 5/2019 | Mai | |
| 2019/0147905 A1 | 5/2019 | Mai | |
| 2019/0174306 A1 | 6/2019 | Mai | |
| 2019/0287529 A1 | 9/2019 | Christopher et al. | |
| 2019/0377381 A1* | 12/2019 | Tuttle | G06F 1/1647 |
| 2020/0196141 A1* | 6/2020 | Baker | G06F 3/0488 |

OTHER PUBLICATIONS

"Alexa Privacy." Amazon.com, https://www.amazon.com/b/ref-dp_zr_faq?node=19149155011#microphone_controls. Retrieved Feb. 7, 2020. 2 pages.
Bjorn Karmann. Project Alias 2.0 GitHub. https://github.com/bjoernkarmann/project_alias Retrieved Feb. 7, 2020. 5 pages.
Shannon Liao. "This Project hacks Amazon Echo and Google Home to protect your privacy." The Verge. Jan. 15, 2019. 2 pages, https://www.theverge.com/circuitbreaker/2019/1/15/18182214/amazon-echo-google-home-privacy-protection-project-white-noise.
Gra.In. https://www.gra.in/ Retrieved. Feb. 7, 2020. 7 pages.
Ashley Carman. "John McAfee's 'hack-proof' phone is doomed to fail." The Verge. Apr. 28, 2017. 2 pages. https://www.theverge.com/circuitbreaker/2017/4/28/15459314/john-mcafee-privacy-phone-announce/2 pages.
Apr. 24, 2020, International Search Report of PCT/CA2020/050171.
Feb. 1, 2021, U.S., Final Office Action of U.S. Appl. No. 16/785,176.
Feb. 1, 2017, Wagoner, Ara "How to mute Google Home's Microphones (and why you need to)" https://www.androidcentral.com/how-mute-google-home-microphone-and-why-you-need.

* cited by examiner

PRIVACY DEVICE FOR MOBILE DEVICES

CROSS-REFERENCE TO RELATED APPLICATIONS

This application claims priority to U.S. Provisional Application No. 62/802,628, filed on Feb. 7, 2019 and entitled "Privacy Device For Smart Speakers," and U.S. Provisional Application No. 62/958,305, filed on Jan. 7, 2020 and entitled "Privacy Device for Smart Speakers," the entireties of which are herein incorporated by reference in their entireties.

This application is related to U.S. application Ser. No. 16/785,176, filed on Feb. 7, 2020 and entitled Privacy Device For Smart Speakers, the entirety of which is herein incorporated by reference in its entirety.

BACKGROUND

Computer devices using microphones for voice control are increasingly prevalent, including devices that are constantly listening and processing audio to allow spontaneous voice commands to be processed at any time. Many of these devices send commands and other data to computer servers which store a massive amount of data in perpetuity.

This poses numerous privacy risks to the public. In many cases, the value presented by perpetually listening computing devices makes it an undesirable trade-off to refrain from using the devices to preserve privacy. In other cases, a person may be unaware they are being listened to. Therefore, systems that protect privacy but allow the listening devices to still provide their intended value are valuable.

SUMMARY

The following summary presents a simplified summary of certain features. The summary is not an extensive overview and is not intended to identify key or critical elements.

Systems, apparatuses, and methods are described for blocking input data from reaching a listening device. A listening device may be configured with one or more microphones or one or more cameras which, in response to a first trigger (e.g., a "wake word"), perform one or more actions. For example, the listening device may be a smart speaker. A blocker, which may be a computing device, may be configured to prevent the listening device from receiving such input data (e.g., via the one or more microphones or the one or more cameras) until a second trigger (which may be the same or similar to the first trigger) has been received. For example, the blocker may intercept audio data or video data, as collected from one or more microphones and/or one or more cameras, from being received by a listening device. As another example, the blocker may play one or more sounds (e.g., white noise, falsified ambient noise that include one or more ambient sounds, noise configured to obfuscate speech, false conversation data) using a speaker directed toward the one or more microphones of the listening device, or the like. The blocker may be configured with one or more second microphones and/or one or more second cameras which retrieve audio and/or video data and monitor such data for the second trigger. The blocker may use the one or more microphones and/or the one or more cameras of the listening device to monitor for the second trigger. For example, the blocker may be a module physically installed in the listening device which intercepts communications from the one or more microphones and/or the one or more cameras. The second trigger may be, e.g., a gesture, spoken command that includes one or more spoken words, or the like, and may be defined by a user (e.g., using a configuration tool associated with the blocker). The blocker may be configured to ignore audio and/or video originating from the listening device such that, for example, the listening device cannot attempt to bypass the blocker. Upon determining the presence of the second trigger, the blocker may permit audio and/or video data to be received by the listening device, e.g., for a predetermined period of time. The blocker may modify such audio and/or video data before transmitting such data to the listening device. For example, the blocker may receive a command, use a language recognition algorithm on the command, use a text-to-speech algorithm to reproduce the command, and output the text-to-speech command via a speaker directed at the one or more microphones of the listening device. The blocker may wait a predetermined period of time before transmitting such data to the listening device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
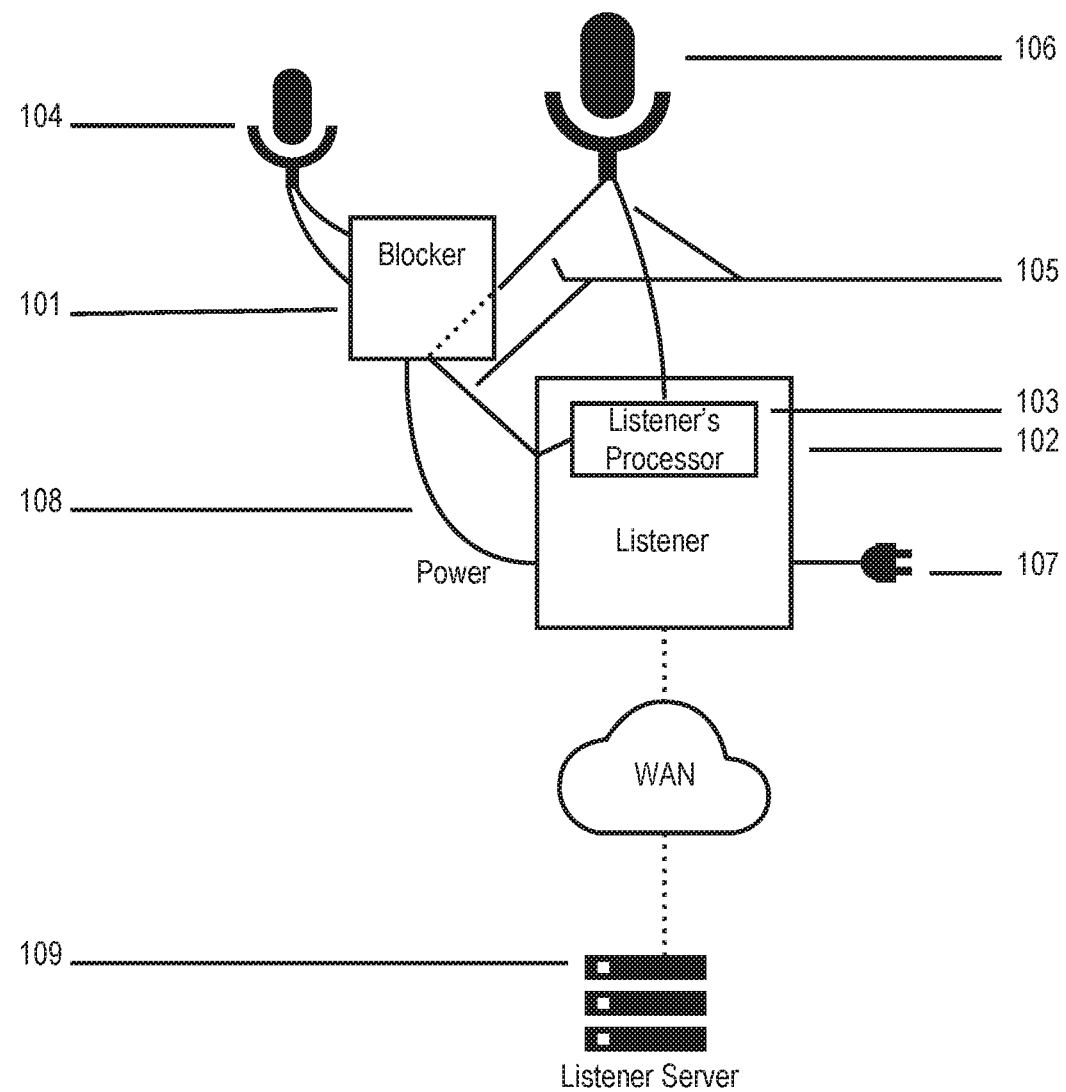
FIG. 1 shows an example of a privacy blocker integrated into a listening device according to one or more aspects of the disclosure.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "include" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning, and engaging.

Listening devices may be a wide variety of devices (e.g., computing devices), including but not limited to home assistants, home automation assistants, music players, televisions, gaming systems, smart phones, smart watches, computer monitors, laptops, computer tablets, physical-security systems, motor vehicles, headphones, alarm clocks, and kitchen appliances. Non-limiting examples may include the Echo listening device by Amazon.com, Inc. of Seattle, Wash.; the Home device by Google Inc. of Menlo Park, Calif., and the HomePod system by Apple, Inc. of Cupertino, Calif. Listening devices may be referred to interchangeably within this description as listening device, listener device, and/or listener.

Non-Integrated System

The system described herein may be implemented in a primarily non-integrated manner, wherein a blocker is added to a listening device without intercepting communications transmitted by input devices of the listening device. A blocker device (301) may be a device, such as a computing device, placed in a location covering and/or near one or more microphones (306) (which may be part of the blocker device and/or external from it) of the listening device (302) and limits the ability for the listening device to listen to the sound in the environment.

In some embodiments, the blocker device (301) may include a microphone (304), a speaker (305), processor, and power supply (308). In other embodiments, the blocker may comprise circuitry, such as one or more integrated circuits, configured to perform the steps handled by the processor. In still others, combinations of circuitry and one or more processors may be used The blocker device (301) may use its microphone (304) to receive information (e.g., sound data) about the sound in the environment. The microphone (304) may be configured to receive environmental audio that includes one or more sounds such as, for example, spoken words, music, and the like. The microphone need not be any particular type of microphone, and may be any device configured to receive audio and/or transmit audio data. The microphone may send such received audio, as sound data, to the blocker's processor. The processor may process the sound to determine if trigger sounds have occurred. If trigger sounds are determined to have occurred, the blocker device may switch from a blocking mode to a pass-through mode, whereby the blocker may permit the sound from the environment to be received by the listening device (302). The blocker may perform passive blocking, whereby the blocker has a sound-proof seal around the listening device's microphone (306) and provides sound insulation such that the listening device cannot eavesdrop. In passive blocking, when the pass-through mode is entered, the blocker may play back through its speaker (305) the sounds it hears from its microphone (304) such that the listening device is able to eavesdrop without the blocker being physically removed. Additionally and/or alternatively, the blocker may perform active blocking, whereby the blocker may play jamming sounds from its speaker (305) while in blocking mode such that the listening device (305) cannot eavesdrop and/or enable eavesdropping for human eavesdroppers nor automated eavesdroppers with or without machine learning algorithms, and in the pass-through mode the blocker may play either no sound from its speaker and/or may play the sounds it hears from its microphone to amplify them, so that the listening device can readily eavesdrop.

Integrated System

The system described herein may be implemented in an integrated manner, wherein a blocker is added to a listening device and is configured to intercept communications transmitted by input devices of the listening device. A blocker device (101) may be integrated to a listening device (102). The blocker may be physically affixed and/or mounted to the listening device permanently, temporarily clipped on with a clip (204), and/or screwed in and/or otherwise temporarily mounted, loosely connected with cables, and/or may have no physical connection to the listening device. The listening device may have a physical switch which controls whether the blocker is used or is bypassed.

The blocker device (101) may include a processor and may include a separate microphone the listening device does not use (104), or it may integrate to the same microphone the listening device uses (106), or both. While a blocker is installed, the listening device may have access to receive sound information through the blocker's processor and may be incapable of receiving sound information from the one or more microphones directly. In some implementations, if the microphone is trusted, such as when it is not part of the untrusted listening device, then, alternatively, the microphone may send sound information directly to the listening device when the blocker has indicated to the trusted microphone that the blocker is in pass-through mode and, in blocking mode, the listening device may be incapable of receiving sound from the microphones. If, within the system that is a combination of the blocker and listening device, there is only one microphone or array of microphones, that microphone may be used for both trigger detection while in blocking mode, as well as for providing the listening device's processor (103) with sound data via the blocker's processor in pass-through mode. Any of the microphones described herein may be located within the blocker, the listening device, or separately from both. If within the combined system there are two separate microphones or arrays of microphones, either microphone may be used for trigger detection while in blocking mode, while the other microphone may be used to provide the listening device's processor with sound data via the blocker's processor in pass-through mode.

The integration of the blocker device (101) to the listening device (102) may be in the form of having connected electrical circuits, having a wireless connection, or a combination of both. The connections from the blocker to the one or more microphones may also be in the form of having connected electrical circuits, having a wireless connection, or a combination of both, and need not be the same form as the integration to the listening device. For example, one or more of the microphones may be a wireless microphone, and/or a wireless device that includes one or more microphones. The connections from the blocker to the one or more speakers may also be in the form of having connected electrical circuits, having a wireless connection, or a combination of both, and do not necessarily need to be the same form as the integration to the listening device or the connection to the microphones. In any integrations, connected electrical circuits may include power supply wires, traditional sound transmitting wires such as analog aux cables, various digital data transmitting wires such as a Universal Serial Bus (USB) interface, or any combination of multiple such connected electrical circuits. In any integrations, wireless connections may use a standard protocol, such as Wi-Fi or Bluetooth, and/or a proprietary protocol.

The blocker device (101) may have no capability to connect directly to a wide area network (WAN), and/or the device it connects to in order to reach the WAN may have methods to significantly restrict the blocker device such that the blocker device's access to microphones does not pose an eavesdropping risk outside of the information it sends to the listening device. The blocker may also have either no or limited ability to accept instructions from the listening device through any of the integrations to reduce the risk of the listening device being capable of compelling the blocker into entering pass-through mode for unauthorized eavesdropping.

Power-Flow System

A blocker device may be plugged into a power source, and the listening device's power cable may be plugged into the blocker's power socket. The blocker device may comprise of a processor, a microphone, a power cable, and a power socket. While the blocker is in blocking mode, the power to the listening device may be turned off, and while the blocker is in pass-through mode power may be available to the listening device.

The power source of the blocker and the power source of the listening device need not be connected. The blocker may additionally and/or alternatively receive power from other sources. For example, blocker may receive power from the listening device, may be battery powered, may be powered through a wall socket, and/or may receive power from another device (e.g., a nearby laptop). Any variety of methods of powering the blocker may be used. To conserve power, the blocker may be configured to operate in a low-power state when no or little audio and/or motion is detected.

Processor

The blocker's processor may be part of a more general computing device that is capable of executing software (e.g., as stored in memory), whereby the software provides the instructions for processing and determining if triggers have occurred. Alternatively and/or additionally, the processor may comprise a circuit board that is specifically designed to process sound, such that minimal or no software may be required to determine if triggers have occurred. If both approaches are used, the circuit board may do initial processing to determine if a trigger is even a possibility or likely at any given time, and upon determining that a trigger has some reasonable level of likelihood, it may wake up and/or otherwise activate the general computing portion of the processor to use software to confirm with higher confidence whether a trigger has actually occurred. This approach may afford a number of benefits, including, but not limited to, conserving power and/or providing the extra privacy assurance that even the blocker's software has access to the environment's sound a smaller proportion of the time.

Multitude of Microphones

In all cases throughout this document, microphone and microphones are used interchangeably; for example, in any case where a singular microphone is referred to, the singular may be substituted for multiple microphones. All microphones may also be substituted for a microphone array and/or intermediary device that provides data from a microphone.

Active Blocking

Active blocking may be particularly useful in non-integrated implementations. The blocker may employ one or any combination of a variety of active blocking methods that are effective at preventing eavesdropping by devices using language recognition, artificial intelligence systems, and/or humans. The blocker may generate random static noise. The blocker may determine the ongoing volume of the environment's sounds, measured in real-time and/or as a maximum of some number of seconds into the past, and adjust the generated noise volume based on the environmental volume determined, such that the generated volume is more assured to prevent eavesdropping while not disturbing people when ambient volume decreases. The blocker may generate noise with profiles that differ from white noise, such as brown noise, and/or profiles that are specifically known to make it more difficult to understand human speech. The blocker may determine other characteristics of the environment's sounds similar to the volume determination, such as the presence and/or volume of specific frequency ranges, the types of sound waveforms, duration of frequencies, and/or to what degree human speech is present, and use such determinations to vary the generated noise's volume, profile, mix and/or duration of frequencies, volume of individual frequencies, and/or other characteristics. For example, the blocker may determine that the ambient general volume is 50 db and that a male voice is talking at 80 db in short bursts, then generate noise which is 60 db generally but having frequent short bursts of 90 db with a frequency typical of the male voice.

The blocker may store multiple recordings of the environment's sounds of varying lengths, ranging, for example, from less than 5 ms to longer than a minute, and incorporate one or multiple simultaneous recordings into the generated noise. The blocker may periodically record the sounds while in blocking mode, during recent pass-through modes, and/or both. For example, the blocker may perform three 20 ms recordings every 15 seconds while in any mode, two 150 ms recordings every 5 minutes while in any mode, and three 4 second recordings from the two most recent pass-through mode events, and may loop each of them repeatedly, combine them all together, and/or combine them with noise, and generate the resulting noise through the blocker's speaker. The result is generated noise that may be more difficult for a listening device and/or associated servers to filter out to allow eavesdropping. Alternatively and/or additionally, before using any given recordings in generating noise, a recording may be modified for obfuscation, and/or converted to a formula that can be used to later generate sound that may approximate one or more characteristics of the recorded sound but without having to store the recordings. The blocker may store the recordings in such a way as to make it inaccessible to the blocker's software, impossible to have transmitted out of the blocker to a network, and/or the blocker may intentionally lack the capability to connect to a network to transmit the recordings; all these alternatives providing a high degree of assurance of the recordings not being a privacy risk.

The blocker may also employ common noise cancelling techniques in the determination of what noise to generate. The blocker may analyze one or more characteristics of the environmental sound and build a profile of metadata about the sound which would be used to select one or more noise profiles from a dictionary of noise profiles and/or noise recordings which have been determined in advance to be very effective in jamming the type of environmental sound that is occurring during any given period of time. Additionally and/or alternatively, the dictionary may contain a definition of sound modifiers that should be applied to the environmental sound to generate one of the layers of noise.

The blocker may employ directional speakers in jamming the listener's speakers. The directional speakers may reduce the noise disturbance to nearby users. Directional speakers may include the types and techniques typical for zoned audio systems, including parametric loudspeakers, but on a smaller scale.

The blocker may have multiple jamming speakers for one or more of the listener's microphones. The jamming speakers may each separately and/or collectively be able to be positioned by the user independent of the blocker, which may allow the blocker to be compatible with a greater variety of listener shapes. For example, the blocker may have multiple flexible or rigid tentacles that extend from the blocker and out to various positions around the listener. Each tentacle may have one or more jamming speakers.

The blocker may have a jamming test mode, and the blocker and/or a separate device may emit specific signals that are intended to be jammed and which would normally cause expected behaviors from the listening device. The blocker may measure if the jamming has been successful. Additionally or alternatively, the blocker may request that the user indicate to the blocker if the jamming was successful and/or if the audio is disturbing the user. The blocker may test multiple times at different intensities of jamming to determine the optimal intensity needed for balancing user privacy, while minimizing disturbance to the user.

The blocker may use non-audible jamming to affect the microphones. Non-audible jamming may include multiple ultrasonic sound waves (e.g., including those used in parametric loudspeakers), single ultrasonic sound waves, and/or jamming that is not sound at all. Non-sound jamming may include magnetic interference of the listener's microphones and/or their associated circuits, infrared based temperature interference, electromagnetic interference, electric interference in the form of electric fields, quantum interference, vibration, non-coherent light at sufficiently close proximity or from a distance where the listener and/or microphone are susceptible to interference by light, as well as lasers. For example, it has been demonstrated that microphones may interpret a pattern of pulses from a light (e.g., light emitting diode (LED), laser, etc.), even from a great distance, as being equivalent to sound waves being received by the microphone, which may be useful for light-based (e.g., laser-based) audio injection attacks on voice-controllable systems. For example, a light (e.g., LED) may be high-intensity light in close proximity (e.g., <30 cm) to the microphone. The further the light source, the light source may be more focused to concentrate the intensity of the light on the microphone. The light may cause the microphone to interpret the light as interference (e.g., white noise). In some embodiments, the blocker may use this phenomenon to instead jam, at close proximity or from a distance, the microphones of the listener while in blocking mode. The use of non-sound based jamming may allow blocking of one microphone while permitting another microphone in close proximity to receive signals (e.g., not impacted by the non-sound based jamming). The blocker may use the techniques described for sound-based jamming, non-sound jamming, and/or any combination thereof for added privacy assurance. The blocker may provide insulation and/or covers to isolate non-sound based jamming to the space between the listener's microphone and the jamming source.

Electromagnetic jamming or interference considers the full electromagnetic spectrum, which includes ionizing radiation, visible and invisible light, microwaves and radio waves. Light may be non-coherent, such as the light created by the sun or a regular bulb, or coherent, such as a laser light source. For any electromagnetic jamming technique, the jamming signal may be comprised of specific frequencies and/or a combination of them. For example, white light and/or a combination of blue and infrared light. These frequencies, or carrier signals, are modulated to produce the desired jamming effect. The modulating signal may be digital or analog, or a combination of both. The modulating signal may emulate different noise profiles and/or audio signals, such as a coffee shop conversation, or any other signal profile that is used with the intent to jam the microphone. The modulated carrier signal may be used to alter the status of the microphone in such a way that it will output a signal with the desired jamming properties. For linear processes, the output signal of the microphone may have a high correlation to the modulated carrier signal, but for nonlinear interactions the output signal of the microphone may not have such correlation.

Noise profiles to modulate the carrier signal described above may include, but are not limited to, white noise, pink noise, Brownian noise and so on. Other noise profiles may be used, such as waveforms whose frequency profile may induce noise levels on the microphone that allow the masking effect. For example, a sinusoidal wave whose phase and/or frequency change either randomly or at specified intervals.

Electromagnetic signals outside the boundaries of the light spectrum may be produced with antennas, coils, or by other means. Electric fields may be created with flat conductive plates or other methods. Quantum interference embodiments may include, but are not limited to, the use of principles, such as quantum entanglement. An example of a device that can be used to generate vibration of different frequencies may be an electromagnetic motor that has an unbalanced load attached to it, and whose rotating frequency is controlled by the modulated carrier signal. Other devices that generate vibrations that can be interpreted by the microphone as sound signals can be used as well.

Non-coherent light sources for the carrier signal can be generated with light emitting diodes (LEDs) or other technologies, such as, but not limited to, fluorescent or filament bulbs. Optical artifacts, such as optic fiber and lens, may be used to focus the light beam on the microphone's membrane. LEDs may produce ultraviolet, visible or infrared light, and any combination of these may be used as a carrier signal. The LED may be mounted in close proximity to the microphone, and a lens may be used to focus the light on the microphone's membrane surface. Or the LED may be mounted away from the microphone and optic fiber may be used to direct the beam to the microphone sound port opening. For devices that have more than one microphone, a single LED with enough power and an optic fiber network may be used to distribute the modulated light signal to all the microphones. Or, more LEDs may be used to increase the light power and/or to generate distinct modulated signals, one per LED, in such a way that the microphones receive different, or slightly different, sound jamming profiles. Similar principles apply to other jamming techniques as well.

Coherent light sources may be generated with laser diodes or by other means, and may use optical artifacts such as optic fiber and lenses to focus the light beam on the microphone's membrane. The principles for the use of coherent light sources remain the same as those described for non-coherent light sources.

Carrier signals may be modulated with the use of digital or analog systems, or a combination of both. These systems may be passive or active. Passive jamming systems have a fixed profile, while active jamming systems adapt to the environment to increase the effectiveness of the jamming signal. An example of this would be a passive system that generates white noise with constant power, versus an active system that can change the noise profile, and/or the noise power, according to the sound environment.

Non-audible jamming technologies and techniques should be designed in such a way that they do not cause physical harm to the listener device and its microphones, such as heat damage. At the same time, the non-audible jamming technique should create enough disturbance in the microphone in such a way that the ambient sound is effectively masked. For example, increasing noise levels perceived by the microphone by an amount of decibels that may vary depending on the audio profile that is to be blocked. Furthermore, one or several non-audible jamming techniques can be used in combination with audible jamming techniques to increase sound masking effectiveness. Other means of increasing the masking efficiency of the jamming technique may use algorithms such as, but not limited to, noise cancelling to decrease the power of the ambient sound that is captured by the microphone.

Passive Blocking

Passive blocking may find particular use in non-integrated implementations. The blocker may have a compressible material, such as foam, to form a sound-insulted seal when physically attached to the listening device. The rigid or compressible portion of the blocker that attaches to the listening device may consist of interchangeable adaptors to other shapes that are designed for a variety of listening devices, and the interchangeable adaptors may be 3D printed from a catalog of possible designs. The blocker may use a variety of sound-insulating materials and sound-insulating techniques. The sound-insulating materials need not block all sound from reaching the listening device, but may instead insulate a particular amount or range of sounds from reaching the listening device. For example, sound-insulating foam on the blocker may permit extremely loud sounds (e.g., explosions) to reach the listening device, but may deaden sounds associated with speech from reaching the listening device.

As an example of passive blocking, the listening device may be shaped like a hockey puck with a microphone on the top of the listening device, and the blocker may comprise a circular foam element which attaches to the top of the listening device and thereby blocks sound waves from reaching the microphone. As another example of passive blocking, the listening device may be shaped like a cylinder, and the blocker may comprise an insulated sheath that, when slid onto the cylinder, blocks substantially all sound from reaching one or more microphones dispersed around the cylinder.

Interception of Signals

The blocker may be configured to intercept audio data and/or video data before it reaches the listening device and/or a component of the listening device (e.g., a processor in the listening device). For example, the blocker may be configured to receive and process audio data and/or video data from one or more microphones and/or one or more cameras of a listening device, rather than allowing such data to be received by the listening device. Such interception may comprise interrupting, shorting, or otherwise modifying one or more transmission paths associated with an input device. For example, a wire for a microphone may be cut, and the two ends of the cut wire may be inserted into the blocker.

Interception need not require a physical connection between input devices and the listening device. For example, the listening device may be configured to receive audio data and/or video data from one or more wireless microphones and/or one or more wireless cameras. Interception of such signals may comprise the blocker establishing a connection with the one or more wireless microphones and/or the one or more wireless cameras, then presenting the blocker to the listening device as if it were the one or more wireless microphones and/or one or more wireless cameras. In this manner, the listening device need not know it is communicatively connected to the blocker. The blocker may additionally and/or alternatively employ a jamming signal or other method to prevent transmission of audio data and/or video data directly from the one or more wireless microphones and/or the one or more wireless cameras to the listening device.

Triggers

The blocker may await and/or detect a variety of triggers to determine that blocking mode should be changed to pass-through mode. The blocker may use the sound information from one or more of the microphones in determining if a trigger has occurred. The blocker may use the volume of the ambient sound; for example, a >=50 db sound for at least 0.5 seconds, could be a trigger. The blocker may use a particular frequency and/or shape of sound wave, combination of frequencies and/or shape of sound waves, and/or a general pattern of frequencies; for example, frequencies and waveforms that are typical of an adult female voice speaking syllables, but without attempting to determine what words are specifically being said, and/or a person whistling, could be a trigger. The blocker may use a variety of speech recognition techniques and/or language recognition techniques (e.g., recognizing words of a particular language rather than recognizing speech sounds without mapping them to words), to convert the sound information to text, and then determine if a specific word or phrase has been said; for example, the word "command," could be a trigger. The blocker may determine if a specific pattern of frequencies and waveforms has occurred that is indicative of a higher likelihood that a specific word or phrase has been spoken, but without generally converting the sound information to text; for example, the blocker may determine simply whether the word "command" has or has not been spoken, if so, it could be a trigger and if not, then no speech analysis is needed.

The blocker may use sources of information other than any microphones in determining if a trigger has occurred. The blocker may have a physical button that a user presses as the trigger. The blocker may have the capability to have a connection, for example a Bluetooth and/or wifi connection, to a nearby cell phone and/or wearable smartwatch with an application installed that has a software button, and the pressing of that software button causes a signal to be sent to the blocker through the connection, and such a signal could be a trigger.

The blocker may have the capability to have a connection to a portable device which can detect movement gestures such as turning of the wrist, and the portable device may determine that it has a connection to a blocker device and that a gesture has occurred, and then may cause a signal to be sent to the blocker, and such signal could be a trigger. Such movement gestures may correspond to, for example, accelerometer data received from a different computing device, such as a smartphone, portable device, motion controller, and/or the like.

The blocker may integrate to other devices, either directly and/or through an intermediary device such as a server and/or router, with signals from the other devices being considered a trigger. For example, a garage door opener may send a signal to the blocker through a Wi-Fi network, and the opening of the garage door may be considered a trigger. Another example is the presence of a particular smartwatch, detected by various means such as the presence of a Bluetooth connection and/or presence of the device on a Wi-Fi network, which may indicate to the blocker that a designated person, such as a parent, is nearby where a particular person or parent's presence could be a trigger, and said trigger may prevent the eavesdropping by the listening device of children or other individuals without the parent's presence. Such an implementation may prevent children or other individuals issuing commands to the listening device without the parent's or designated person's presence.

The blocker may use time and date based information, such as the time of day and/or day of week, in determining if a trigger has occurred. For example, the time being between 5 pm and 9 pm on Monday to Friday or between 11 am and 9 pm on Saturday, could be a trigger, such that the blocker is in prolonged pass-through mode during those blocks of time.

The blocker may have and/or integrate with proximity sensors, motion sensors, infrared sensors, and/or light sensors to determine if a trigger has occurred. For example, an infrared motion sensor similar to those found in automatic hand dryers, which detects that someone has waved their hand near the blocker and/or listening device, could be a trigger. Another example is a light sensor detecting that the living room lights are on, which could be a trigger.

The blocker may comprise one or more cameras or integrate with one or more cameras (e.g., over a network and/or inside the listening device). The blocker and/or the camera may perform a variety of processing of the visual data or perform visual recognition to determine if a trigger has occurred. For example, the blocker may use a camera and visual processing to determine that it is likely that someone is waving their hand back and forth above their head, and such waving and/or other gesture could be a trigger. Another example is that the blocker may integrate to a camera that is able to count the number of people and the blocker may poll the camera periodically to determine the number of people in the room, with having only a single person in the room being a trigger. Another example is the blocker having both direction-detecting microphones and a built-in camera, that together are able to determine that at least one person located in the determined direction of the source of speaking is also looking towards the listening device, with such looking at the listening device by a speaker and/or someone near the speaker being a trigger.

A trigger may consist of one or more of the above individual triggers, including combinations thereof. Such combinations may include Boolean logic, a point system whereby each individual trigger and/or particular Boolean combination of individual triggers may have a particular number of points attributed to it, and a trigger may be associated with the combined total of the points reaching a threshold. Additionally and/or alternatively, one or more formulas may be used for combining individual triggers to determine if the probabilities of false positives and false negatives has reached one or more predetermined thresholds for the combined trigger to be deemed to have occurred, and/or the negative assertion that a particular individual trigger has not occurred. The length of time in between individual triggers may also be used in the formulas and may affect the determination of a combined trigger having occurred or not. For example, either pressing the physical button, and/or frequencies typical of a male voice plus sustained volume of 50 db sound for over 2 seconds but less than 5 seconds followed by a silence of at least 1 second but only between 6 pm and 9 pm and only if the front door has not been opened within the past 4 hours as demonstrated by a lack of signal from the front door sensor, and/or recognizing the words "command" have been spoken, and/or recognizing the more common words "hello" followed by the words "send" within 5 seconds, could be the requirements logic for the blocker to determine that a single trigger has occurred.

The speech recognition techniques, language recognition techniques, and/or the other mentioned triggers may include the use of machine learning techniques and approaches, such as convolutional neural networks (CNN) and recurrent neural networks (RNN) or models and/or algorithms that are generated from them. When application of such machine learning models by the blocker requires significant processing power, preliminary determinations of the occurrence of a trigger may be made using methods that may require less processing power but result in lower accuracy. This may result in a very brief pass-through state until the non-real-time processing for the more reliable trigger determination is able to be completed. The more reliable results may be used to end the pass-through state and/or permit the pass-through state to be extended beyond the brief window which may have allowed the user to begin communicating with the listening device without a delay.

The blocker may use increases in the volume of the environment in determining if a trigger has occurred. This may afford advantages in terms of improved accuracy in detecting intention to speak a comment, improved accuracy in detecting the start of a word, and/or decreased power consumption while in blocking mode and/or increased processing response times during trigger detection by awaiting a volume increase as the preferred start of a time window of sound data to test for a voice trigger. The increase in volume may be compared to milliseconds before, such as with the start of most spoken words. Additionally or alternatively, the increase in volume may be compared to the ambient volume of a longer period of time, such as with background music playing and/or the user speaking a voice trigger louder than the background music.

The blocker may use input devices connected to the blocker by electrical circuits, or remotely having a wireless connection, or a combination of both. According to some aspects, the input devices need not be the same form as the integration to the listening device nor the connection of the listening device to its input devices. The blocker may use the detection and/or receipt of a specific Wi-Fi, Bluetooth, basic RF, or other wireless signal as a trigger. The blocker may confirm the proximity of the signal, for example, based on signal strength. Additionally or alternatively, the blocker may confirm the source of the signal, for example, by checking a broadcast ID and/or confirming the validity of a PGP signature transmitted by the signal. The blocker may compare the source of a signal versus a whitelist and/or blacklist of approved sources. For example, the blocker may use these capabilities to have geofencing based triggers or to determine that the blocker is on top of or within a predetermined distance (e.g., 10 cm) of a particular electronics pad on a table. Alternatively or additionally, the blocker may also use a GPS sensor, dedicated to the blocker or shared with the listening device, to provide geofencing based triggers. This may have benefits such as having a corporate board room emitting a signed signal whereby all compatible blockers within the board room remain in blocking mode throughout the course of a meeting, and whereby the board room beacon may provide feedback to the users, via a mounted screen and/or otherwise, containing how many and/or a list of which devices have signaled a confirmation back to the beacon that they have entered blocking mode.

The blocker may detect high-frequency sound that is outside the spectrum of hearing, including ultra-sound, UV light, or other such signals that are less noticeable by users. The high-frequency sound may be used in determining if a trigger has occurred. The blocker may process and analyze the less-noticeable, high-frequency signals using one or more of the methods described herein for detecting sound-based triggers and non-sound-based triggers. For example, the detection of ultra-sound beacons or proximity to particular other electronic devices may be used in determining if a trigger occurred.

The blocker may detect the listening device is in a vacant room, in a pocket, and/or in a carrying case, in determining if a trigger has occurred. For example, the listening device may detect the vacant room by detecting the amount and/or other characteristics of light (e.g., visible and/or non-visible frequencies) and/or using proximity sensors, motion sensors, and/or accelerometers. The blocker may remain in blocking mode while the listening device is in a pocket, for example, if the listening device is not intended to be listening to the environment while in the user's pocket. The input sensors of the blocker may be shared with the host device and/or independent of the listening device.

The blocker may detect that an external microphone has been plugged in to itself or the listener, such as to an audio AUX-IN socket, in determining if a trigger has occurred. For example, the blocker may enable pass-through mode based on an external microphone being plugged-in. The blocker and/or listen may emit one or more specific tones, when first plugged in and/or periodically, to signal to other components that it is a privacy respecting component.

Additional Details Related to Word Trigger Detection

The blocker may be configured to be more false positive tolerant during audio trigger determination as the ambient volume of the environment increases. This may prevent false negatives, missed triggers, from increasing as the environment gets noisier. The blocker may determine if the ambient noise is caused by human speech or by non-speech noises, and the blocker may use this determination in determining the impact of the ambient volume on trigger detection tolerance. The blocker may accept configuration such as user preferences in determining the impact of ambient volume on trigger detection tolerance.

The blocker may accept a whistle and/or clap as part of the audio trigger, in isolation and/or in combination with a spoken trigger word. The blocker may also require the whistle and/or clap or it may be optional but increases the confidence of a trigger occurring. This may be a fall-back audio trigger and may assist with detection in loud environments or other environments where it is hard to detect just the spoken trigger word.

The blocker may accept repetition of the spoken trigger word, for example as a required phrase or an optional input that increases the confidence of a trigger occurring. The blocker may use each repetition of the trigger word in determining if each is, by itself, a trigger, and such repetition may intrinsically increase the likelihood that at least one of the repetitions will be successfully detected, and/or the blocker may evaluate whether any word is being repeated at all and may combine the fact that repetition is occurring with the detection of the trigger word on each repetition, to increase the accuracy of detection. The blocker may use the same and/or different detection algorithms for detecting repetition as compared to detecting a word, which may be aided, for example, by the repetition having intrinsically similar ambient noise as well as being the same speaker. The blocker may determine if the time between repetitions is appropriate to indicate a repeat attempt; for example, the blocker may require the repetition to be 250 ms apart which may indicate intentional repetition, or the blocker may require the repetition to be within 6 seconds with a maximum of 5 spoken words in between, which may indicate the user spoke the trigger word once and after waiting and failing to see feedback the user attempted again. This may allow the blocker to have increased accuracy in detecting the trigger word on reattempts after a failed attempt by the user.

Additional Triggers, Such as Those Originating from the Listening Device

The blocker may use the listening device's behavior to determine if a trigger has occurred. Triggers may include initial triggers that result in pass-through mode, as well as subsequent triggers and/or confirmations that indicate the initial trigger was a true positive. The blocker may require a confirmation trigger to maintain pass-through mode beyond a period of time limited to what is required to detect the listening device's behavior. Additionally or alternatively, the confirmation trigger may be used to extend pass-through mode by additional time. The behavior detected may be based on the usage of the listening device, such as a phone ringing in response to receiving a call. The behavior detected may be performed by the listening device as part of its communications with the blocker. The behavior detected may be the user configuring the listening device to perform the behavior for compatibility and/or improved performance of the blocker.

For example, the blocker may enter pass-through mode for a listening device (such as a smart speaker) upon the blocker detecting the trigger word "command." Additionally or alternatively, the blocker may observe whether the home speaker behaves in a way that suggests the listening device itself detected its wake word (e.g., such as in addition to the blocker detecting the user said the smart speaker's wake word) and has informed the user of its processing. Such observation may involve the blocker's microphone listening for the listening device's output audio to indicate to the user a successful command. For example, a smart speaker may emit a first tone (e.g. 589 Hz) for a first predetermined amount of time (e.g., 75 ms), followed by a second tone (e.g., 1169 Hz) tone for a second predetermined amount of time (e.g., 160 ms). The second tone may emitted for the second predetermined amount of time with a decay. Additionally or alternatively, the smart speaker may emit a third tone (e.g., 350 hz) tone preceded by a ring. In general, the smart speaker may emit any tones that are audible and/or an octave apart. In some instances, the smart speaker may speak in a voice with predictable characteristics that may be detected as belonging to the listening device. Additionally or alternatively, the observation may involve the blocker having a light sensor (e.g., photoreceptor) that is positioned to detect that the listening device has made use of its user feedback lights to indicate to the user it is processing a request. The light sensor may be located within the listening device and/or external to but facing (e.g., pointed at) the listening device. Detecting the listening device's behavior (e.g., as a confirmation) may have several benefits, including shortening the time in pass-through mode for false detection of triggers by the blocker, allowing the blocker to be more false positive tolerant in trigger detection as compared to the listener device's detection of its wake word due to the limited duration of the false positives, and/or increasing the user's awareness of the blocking device and/or listening device's pass-through mode. This may result in improved user privacy, for example. Additionally, detecting the listening device's behavior may be used to extend pass-through mode. For example, a smart speaker in conversation mode may turn on its user feedback lights after it has detected each additional question that the user holds. The feedback lights of the listening device may be sufficient for the user to be aware that the listening device is continuing to listen for longer. This may allow the blocker to extend pass-through mode repeatedly without the user having to explicitly repeat a trigger word.

The blocker may detect the behavior of a listening device (such as a phone or tablet) based on the listening device's pixel-based screen being active and sufficiently brightly lit. Such detection may use many of the methods previously described for detecting the lights (such as, LED lights) found on a smart speaker. The blocker may include a sensor placed inside the phone, outside the phone along the edge of the screen, built-in to the protective case around the phone, and/or built-in to a transparent screen protector. Additionally or alternatively, the blocker may observe the power consumption of the screen, for example, if the screen is trusted to not be able to increase power consumption while having minimal visible light that the user could observe. The blocker may allow for variable positioning of the sensor by the user and/or have the one or more sensors detect the average brightness of a broad area of the screen. By detecting a broad area of the screen, it may be more difficult for the device (e.g., phone, tablet, etc.) to illuminate a portion of the screen to trick the blocker into entering pass-through mode, but without sufficient light from the screen to alert the user. The blocker may factor in time of day and/or ambient light levels to determine what amount of light is sufficient to alert the user.

The listening device may signal to the blocker that pass-through mode may be safely ended early. Additionally or alternatively, the listening device may signal to the blocker that the listening device has a low probability of being used. For example, the listening device may detect that its input device (such as microphone) has become available to provide information, analyze that its own wakeword or other requirements are not met, and that the pass-through mode is not required. The blocker may receive this signal to stop pass-through mode sooner than it otherwise would have. In another example, the listening device may be aware of its own unique usage parameters and/or anticipated upcoming usages, perhaps because usage by a user is typically responsive to signals provided by the device (e.g., a warning alert). The listening device may transmit a signal to the blocker that indicates a higher confidence threshold for triggers to cause pass-through mode. The listening device may provide one or more signals (e.g., explicit signals) to improve the user experience, demonstrate concern for user privacy, and/or conserve power, especially in the case of battery powered listening devices. Such signals may be transmitted through dedicated integration circuits, as an additional use of other integration circuits, and/or by the listening device outputting through its output devices, such as a quiet but detectable tone through its speaker.

The blocker may detect listening device's behavior directly with one or more sensors and/or by intercepting a signal to a listening device's component. The detecting may occur indirectly. For example, the blocker may detect a change to the electrical consumption of the listening device and/or its processor, changes to electrical patterns within the listening device's circuitry, changes to electromagnetic interference from the listening device, and/or other similar effects indicating the listening device may be using one or more of its input devices.

The blocker may use the intercepted listener device's signals being sent (e.g., transmitted) to the listener's output devices, for example, in determining if a trigger has occurred. Additionally or alternatively, the blocker may use the detected output of the listener device's output devices, for example, in determining if a trigger has occurred. For example, if a phone begins ringing due to an incoming call, the blocker may detect the ringing is at a sufficient volume and enter pass-through mode so that the user may answer the call without any further trigger being required. Additionally or alternatively, the phone's loudspeaker may emit a sound of sufficient volume and/or characteristics (e.g., matching a voice), during the course of the phone call, that the blocker may enter and/or extend pass-through mode for the duration of the call. This may be due, in part, to the user's awareness of pass-through mode being implicit. For higher assurance, the blocker may combine the phone's use of its loudspeaker with detection of intermittent speaking by the user to further suggest that the user is having a conversation with the phone.

As an example of combining a plurality of behaviors for incremental certainty as pass-through length increase, the blocker may detect the word "command" to begin pass-through mode for a first time (e.g., 1 second), require detection of the user saying the listening device's wakeword to extend pass-through a second time (e.g., 1 second), require detection of a host's lights blinking to extend pass-through mode a third time (e.g., 5 seconds), and/or require detection of the host's voice (at a volume that is determined to be user-detectable given the known environmental circumstances such as ambient noise level or time of day, for a sufficient length of time, and/or within a few seconds of the wakeword) to extend pass-through mode by a fourth time (e.g., 20 seconds).

The blocker may use the behavior of a numerous types of listening devices, such as an appliance turning off or not, lighting in the house turning on or off due to home automation, and/or the sound of a garage door opening. These behaviors may be directly intended or by-products of a successful command, either originating from the listening device or something the listening device communicates with or controls, or any combination of multiple behaviors.

The listener may send, and the blocker may receive, a signal to explicitly request pass-through mode. This may allow the blocker to log such requests, perform throttling of request approvals, perform logic to determine whether the request should be approved, provide feedback to the user to inform the user, and/or provide increased feedback relative to more trusted triggers.

The listener, any cloud computers, microprocessors more powerful than the blocker, and/or any general computing systems may provide trigger detection that does not require the blocked input device. Trigger detection may or may not be complex and/or time consuming and/or power consuming and which may or may not be able to be performed by the blocker ongoing and/or real-time. The blocker may then receive indication, trusted or untrusted, that the trigger has been found and may receive meta-information about the trigger events. The blocker may then validate the trigger using the meta-information that has been provided and using information that the blocker obtains directly. For example, a blocker may be configured (e.g., setup) to block a microphone signal from reaching a smart speaker until a particular portable device is detected to be nearby (for example, based on Bluetooth presence). The blocker may remain in low-power mode without scanning for Bluetooth signals until a listener which scans for Bluetooth signals detects the portable device and signals to the blocker that it has been detected and the identifier. Upon receiving the signal, the blocker may perform its own Bluetooth scan. This may allow for ongoing readiness of the system as a whole but without requiring the blocker to perform ongoing and/or real-time analysis.

The blocker may receive from the listener and/or a third device, configuration preferences for trigger selection and/or trigger detection. The preferences may be from a set of possibilities that are all treated by the blocker as sufficiently trustable, in isolation or in combination with other triggers. The preferences may include which language, which trigger words, a selection of machine learning models to apply against sensor input for trigger detection, and/or the definitions of models and/or parameters which may be cryptographically signed to be trusted as approved. For example, the preferences may indicate if the word "command" or the word "hello" is the trigger word, or may include an updated signed voice model. The blocker may also enter a training and/or validation mode where the user confirms the validity of any untrusted parameters received.

Additional Triggers, Such as Those Originating from User Handling

The blocker may use the user's handling of the listening device in determining if a trigger has occurred. This may include initial triggers that result in pass-through mode, as well as subsequent triggers and/or confirmations that indicate the initial trigger was a true positive. The handling detected may be based on the usage of the listening device. For example, a user putting a phone to their ear during a phone call and/or a user touching the screen of a GPS to request directions. The trigger may be detected based on actions performed by the user to communicate with the blocker, for example, by pushing a button on the blocker and/or on the listening device. In some examples, the trigger may be detected based on a modified variation of a behavior inherent to the usage of a listening device. For example, the orientation of the listening device if the user intends for it to remain inactive or any combination of multiple handlings. User handling applies to many portable devices, such as phones, tablets, and biometric wearables, that are portable in nature and therefore have significant movement and/or positioning characteristics. User handling may also apply to a plurality of devices that are stationary, such as smart fridge displays, smart microwaves, and smart thermostats, and have haptic (e.g., touch) and/or manipulation handling. Some devices may only be used when the user is handling them, and other devices are used either primarily or occasionally by a user at a distance, such as a smart speaker.

Like other triggers described herein, user handling may be detected, for example, in response to handling events and/or the absence of handling events for a period of time. For example, a trigger may be detected in response to a change in an accelerometer of a phone. Another trigger may be detected in response to a phone being in motion for several minutes, or has not been stationary for a sufficient period of time. Similarly, a trigger may be detected when a phone has not moved for a period of time (e.g., several minutes), for example, because the phone has been left on a table. A trigger may be detected, for example, in response to the presence of a detectable object, such as an NFC tag. Alternatively, a trigger may be detected in response to the absence of the detectable object.

The blocker may use fingerprint scanners, touchscreens, and/or any other touch-detectable components of the listening device and/or the blocker, to determine if a trigger has occurred. For example, the blocker may determine that a trigger has occurred, for example, if a touchscreen has been touched by a user's finger. The determination may be made in isolation or in combination with one or more triggers that the user is interacting with the device and the probability of the user desiring pass-through mode may be increased in response to the determination that the user is interacting with the device. Therefore, the blocker may require a lower threshold of certainty when evaluating the presence of a voice-based and/or motion-based trigger. Additionally or alternatively, the blocker may treat alternate triggers as sufficient.

The blocker may detect tapping on a phone. The tapping may be detected by detecting vibrations, movements, touch, etc. As with many types of handling triggers, the detection may simply require the event to occur one or more times. Additionally or alternatively, the detection may require the events to have specific timing and/or duration.

The blocker may detect if the listening device has been covered by the user. For example, a smart watch may end pass-through mode when the user's hand covers the watch. Similarly, the smart watch may begin pass-through mode when covering and uncovering twice. For example, the user's hand moving in one direction and then abruptly in the other direction may start pass-through mode. Pass-through mode on a smart watch may start, for example, in response to the wrist rotating from vertical to the horizontal rapidly, a hand moving from right-to-left over top of the smart watch, a hand shaking the smart watch, and/or the user lifting their hand high up after being in a resting position.

The blocker may detect that the listening device was placed in a moving vehicle. For example, the blocker may use one or more accelerometers and/or other motion and/or position sensors to detect vibrations of a motor vehicle. Similarly, the blocker may use one or more sensors to detect the typical sounds of either a motor vehicle, the user's particular vehicle, and/or traffic. In some embodiments, the blocker may detect that the user is near a short-distance beacon and/or detectable object (e.g., an NFC tag) located inside the vehicle. The blocker may detect a trigger using a GPS sensor to detect high speed travel.

The blocker may detect that the listening device was placed into, taken out of, and/or is currently located inside a pocket and/or carrying case. For example, a user putting a phone in a pocket may involve detecting that the phone is being held and/or is not touching any objects other than a hand, followed by the phone detecting a fabric. Additionally or alternatively, the phone may detect a downward movement that matches a reasonable depth of a pocket. In some embodiments, a light sensor may indicate darkness associated with being located in a pocket and/or a carrying case.

The blocker may detect the vibration mode of a listening device and may only consider the vibration a sufficient trigger if the phone is also detected as actively being handled.

The listening device and/or its case may be touch sensitive. The blocker may detect the user's touch and/or grip. The user's touch and/or grip may be used to indicate how the user intends to use the listening device. The indication may inform the blocker about whether or not to enter pass-through mode.

The blocker may detect the orientation of the device as a gesture trigger. For example, a blocker for a phone may detect that the orientation of the phone is level to the ground and the orientation has been maintained for a sufficient period of time. This orientation may indicate that the phone has been left idle on a fairly level surface. Accordingly, a trigger word of "command" may be required before entering pass-through mode for both the phone's microphone and/or the phone's GPS sensor, and/or a physical override switch may need to be toggled by the user, disregarding any behavior by the phone may be disregarded. If the same phone is moved sufficiently after being idle on the level surface, the blocker may require a lower threshold of listener behavior detection in order to enter pass-through mode. The lower threshold of listener behavior detection may be indicative of the listener informing the user that it is active. If the user wishes for pass-through mode to be maintained even when on a surface, then the user can place the phone on top of an object and/or cradle the phone such that it rests at an angle rather than level. The different positions and/or orientations (e.g., holding the phone vertically as in the case of a phone call versus holding the phone horizontally as in the case of a video conference or loudspeaker call) may have different effects on entering pass-through mode. For example, pass-through mode may be entered without any further behavior by the phone being a requirement nor any trigger word being spoken by the user. A trigger may be detected by the blocker may be detected if the listening device is charging. The trigger may be detected, for example, if other devices, such as the blocker, are also charging. The trigger may be detected based on proximity to other devices, such as a charging cradle, by observing the effects of charging on the listening device's circuitry and/or battery.

The blocker may detect that the user is walking, using any suitable method and/or technique, such as those employed by pedometers, to detect a user's steps to determine if a trigger has occurred.

The blocker may detect intentionally modified variants of implied gestures to determine if a trigger has occurred. For example, the blocker may detect that it is upside down while in a pocket and remain only in blocking mode, whereas being right side up while in a pocket may also be in blocking mode, but the blocker may enter pass-through mode when other triggers are encountered. Additionally or alternatively, the blocker may detect that it is upside down while in a car and remain in blocking mode. The blocker may disregard one or more other triggers for entering pass-through mode while in the car. If the device allows for rotating of interfaces based on an upside orientation (e.g., the device's screen is still readable and/or touchable), this may allow the user to treat upside down (versus right side up) as a toggle for sensors that at times is implicit, such as a phone call never having the phone upside down unless laying down, and sometime explicit, such as putting the phone into a cradle upside down. Similarly, the blocker may detect landscape versus portrait or landscape left versus portrait right, and/or any other orientation or combination of orientation changes, and use that detection as a trigger.

The blocker may use very intentional gestures as triggers. For example, spinning the phone while it is on a table, flipping it over front to back one or more times while on a table, flipping the phone front to back in one direction and flipping it back in a specific direction, spinning it one way and then back the other way, and/or any other intentional gestures which may have low probability of occurring except when the user is intentionally communicating with the blocker and may be readily detectable by the blocker.

The blocker may detect the particular combination of flat orientation, lack of movement, and/or absence and/or presence of a pad (e.g., charging pad). With a combination of triggers, the pad may be a "silence pad" that forces blocking mode regardless of the other present and/or configured triggers. Alternatively, the pad can be a "listening pad" that forces pass-through mode regardless of the other present and/or configured triggers. In some embodiments, the pad may be a "modified mode pad" that changes what triggers are required when detected in combination with the orientation and/or the lack of movement.

The blocker may detect the user shaking the listening device in determining if a trigger has occurred.

The blocker's input sensors for trigger detection, such as an accelerometer, may be on the same electrical circuit as the listener's microphone and/or other input devices, and may or may not require a microprocessor for the input sensor's trigger to disable the signals of the listener's input devise to the listener's processor.

The techniques and examples for gestures affecting listener input device may also be implemented without requiring a blocker. The techniques and examples for gestures affecting listener input device may be used directly by a listener and/or a listener's processor, implemented in hardware and/or software, as an input gesture. For example, a phone's orientation such as being flipped upside down and/or being stationary on an approximately level surface, may be detected by a phone operating system and used to affect whether an input component is enabled and/or whether a phone's software selects to process data from the input component.

Lower Trigger Accuracy

Unlike a button being pressed, for many of the types of triggers, there may be a complex determination as to whether a trigger has occurred; for example, in determining whether the user said "command" or not. The blocker may use lower accuracy methods and algorithms in sound-based triggers than the listening device. Such lower accuracy may allow the blocker processor to be less powerful than the listening device's processor, because of the limited number of audio triggers and limited number of potential resultant actions. The blocker may allow a greater number of false positives for trigger detection than false negatives, because the impact of a false positive may have no detrimental effect on the user experience other than a nominal decrease in the percentage of sound that is blocked.

Ending Pass-Through Mode

The blocker may use a variety of indicators to determine when to end pass-through mode and therefore change back from a pass-through mode to a blocking mode, and these indicators may be referred to as ending indicators. The blocker may use the elapsed time since entering pass-through mode as an ending indicator; for example, pass-through mode may be limited to 15 seconds and then the blocker may return to blocking mode. For example, the blocker may cease the pass-through mode after a predetermined period of time. The blocker may use any of the types of triggers described in this description as the ending indicator. For example, an ending indicator may be that it is both after 9 pm and a female voice is detected. The blocker may use metadata about the trigger that triggered the pass-through mode to determine what type of ending indicators and/or parameters for those ending indicators are needed; for example, if the trigger was the time of day reaching 4 pm, then the blocker may determine that the only ending indicator is the time of day reaching 5 pm, whereas if the trigger was the word "command" being spoken, then the blocker may determine the ending indicator can be either 15 seconds elapsing or detecting that a different person has begun speaking based, for instance, on the frequencies or other characteristics of the voice. The blocker may receive additional metadata from the user during triggering that may affect the ending indicator; for example, if the word "command" is spoken as a trigger then the ending indicator may be defaulted to 15 seconds elapsing, but if the phrases "command 1 hour" and/or "command long" are spoken as a trigger then the ending indicator may be one hour elapsing since the trigger.

The blocker may determine that a child is speaking, based on characteristics of the sound such as frequencies, tone, waveforms, etc., and may consider any child speaking as an ending indicator. This may be particularly beneficial in protecting the privacy of children, and/or in the prevention of children issuing commands to the listening device. The blocker may determine that a particular designated individual is speaking using voice recognition techniques, and may consider this person speaking as an ending indicator. This may be particularly beneficial in protecting the privacy of particular vulnerable adults and/or in preventing certain adults from issuing commands to the listening device.

The listening device may have a reserved word and/or phrase and/or other sound which the listening device detects and the user may say and/or cause as a way for the user to indicate to the listening device that a verbal command is to follow; such a word and/or phrase may be referred to as a "wake word" even though it need not be a single word and/or a word at all. While the blocker is in pass-through mode, the blocker may monitor sound from the microphones, and based on detecting a wake word in such sound, extend the pass-through mode for an additional period of time; for example, the user may say "command, hey listener, what time is it? . . . hey listener, play a song." and each time the wake word of "hey listener" is used and presumably the listening device takes action on, a 15 second time limit on the pass-through mode is extended an additional 15 seconds, such that the user does not need to say "command" repeatedly to avoid a conversation with the listening device being cut off by the blocker. While the blocker is in a pass-through mode and monitoring the sound from the microphones, the blocker may extend the pass-through mode for an additional period of time based on determining that a user is engaging in ongoing conversation with the listening device. The determination of ongoing conversation may be based on detecting that a user and the listening device are taking turns; that is, a user has spoken, the user has stopped speaking approximately shortly before the listening device has used its speaker to provide a response back to the user, and the user has once again started speaking approximately after the listening device has completed its response. For example, if the user said "command, hey listener, what time is it?", the listener responded "9 pm", and then the user said "what day is it?", and the listener responded "Friday", the blocker may extend the pass-through mode for additional periods of time until the conversation is determined to have ended 5 minutes later, even though the trigger and wake word were not spoken and the blocker was configured to return to blocking mode after 15 seconds. In the detection of ongoing conversations, the blocker may use the integration to the listening device's speakers, as described in this document.

Pass-Through Pre-Processing

When the blocker is in a pass-through mode, it may pass-through all sound from the microphones, and/or it may pre-process and/or modify the sound from the microphones before passing it on to the listening device. The blocker may filter the sounds to only some frequencies, such as those of human speech; for example, if a person is speaking while the microwave is running and/or the sound of footsteps is heard, the blocker may modify the sound from the microphones by filtering it such that the listening device only receives the sound of the human speaking. Although this may result in improved accuracy of the listening device's language recognition, it may also result in increased privacy by reducing the ability for the listening device to eavesdrop on activities occurring during pass-through mode. The blocker may additionally and/or alternatively filter all sound during a period of time where a particular volume threshold hasn't been reached, such that sounds that are considered very quiet and therefore are determined to be unlikely to be commands intended for the listening device may be filtered; for example, ongoing background movement noises and/or whispers during pass-through mode may be removed from the sound before passing them on to the listening device.

The blocker may also filter out any voices that are not those of the person who performed the trigger using speaker recognition; for example, the blocker in blocking mode may detect a person using the trigger word "command" at a house party, and switch to pass-through mode for 15 seconds, and during pass-through mode filter out all voices of the guests at the house party except for the person who issued the trigger command so that the guests have reduced privacy impact. In order to do this, the blocker may use a variety of beamforming, source localization, and other similar techniques; the blocker may also use such techniques during trigger detection to improve the accuracy of trigger detection. The blocker may also have a training mode, during which users train the blocker with their voice much like dictation software improves accuracy by having training modes, and where the training data is used for speaker recognition to restrict what voices pass through to the listening device.

As part of the pre-processing of sound from the microphones, the blocker may use speaker detection followed by audio filtering, and/or alternatively may use synthetic reconstruction of sound, and/or a combination of both. Synthetic reconstruction may involve the blocker receiving the sound from a microphone, the blocker's processor performing language recognition to convert the sound to text words, the blocker's processor generating a sound that is a synthetic voice speaking said text, and then the blocker sending the listening device only the generated synthetic sound. For example, the blocker may determine one or more words spoken by a user, convert such words to text, and, using a text-to-speech algorithm, output text-to-speech audio.

Alternatively and/or in addition to language recognition converting the sound to text words, the speech recognition may convert the sound on a phonetic basis and/or otherwise syllable by syllable basis without needing to process the speech into specific words. Alternatively, the speech recognition may convert the sound to an intermediary form that is even more granular by detecting each component of a syllable, such as a phoneme and/or linguistic segment, as is sometimes done as part of the steps needed for language recognition. The syllables, phonemes, and/or segments may then be used to produce sound with a synthetic voice with more exactness to the original speech than language recognition, and/or they may be delivered to the listening device as digital data, such as a stream of symbols representing the various possible segments, without converting them back to sound waves. Whether converting back to sound waves with a synthetic voice or not, these alternatives to language recognition allow the listening device to retain the ability to make use of their own proprietary language recognition capabilities and allow for less computing power being required by the blocker device which would not need to do higher-level language recognition, while allowing for increased privacy benefits, such as the removal of some characteristics of speech that would indicate emotions and/or levels of stress and/or other metadata that the speaker would not desire the listening device to have access to and/or maintain a long-term history of.

The blocker may pass along all or a portion of the trigger itself to the listening device, and/or the blocker may use the trigger but not provide the listening device with access to the trigger itself; for example, if the sound of the word "command" is a trigger, the sound of that word need not be passed on to the listener device but only all of the audio that follows. The blocker may have memory storage and the ability to store both trigger information (e.g., one or more sounds associated with a trigger, user-specified time periods which the trigger is to be active) as well as pass-through sound to allow the listening device to receive the trigger after a delay, as opposed to real-time, such the user does not need to wait before speaking in a pass-through mode that follows; for example, the blocker may detect the user speaking "command" and enter pass-through mode, and simultaneous to the user saying "turn on the lights" the blocker still needs to pass on the user saying "command" followed by the "turn on the lights", which would be delayed approximately 250 milliseconds because the blocker didn't determine "command" was spoken until the word was finished being spoken. This delayed communication to the listener device by the blocker may be particularly useful if the trigger is the same phrase that the listening device uses as a wake word, which provides the user with convenience of not having to speak extra words as a trigger before beginning to speak the words the listener device requires as a prefix to commands. The blocker may play additional pre-determined sound before passing on pass-through sound, at any point in the middle of pass-through sound, when silence is detected in pass-through sound, or at the end of pass-through mode. For example, the blocker may insert a sound that the listening device would detect as its wake word. Delayed communication to the listener device by the blocker may also be useful in this case of inserting wake words, as it may provide the user with convenience of not having to wait after the trigger and before speaking to the listening device while the blocker plays the pre-determined wake word. In the particular case of non-integrated active blocking, the blocker may perform the delayed replay of the trigger and pass-through audio through its speaker with a volume level such that the real-time sound simultaneously occurring does not interfere with the listener device's ability to analyze the delayed replay; the blocker may use noise cancelling to prevent real-time audio from interfering with the listener device's ability to analyze the delayed replay; the blocker may continue producing noise not only during blocking mode (including the trigger) but also during pass-through mode until it is determined that the user is done speaking a command and only begin the replay after the full command has been received and/or an ending indicator has been detected. In some instances, the replay of the trigger may be generated by a predetermined pattern of light pulses. The predetermined light pulses may relay the trigger to the microphone.

If the listening device risks misbehaving and/or has undesirable behaviors when it receives no audio from its microphones, the blocker may simulate the microphone by sending ambient noise, simulated ambient sound, pre-recorded ambient sound, and/or a combination of such sounds as is required to prevent the listening device from detecting that it is not receiving sound from the microphones.

The blocker may replay information it receives from the input device at a faster speed. For example, if the trigger word is the same as the listener's wake word and/or the blocker passes along the trigger word to the listener upon entering pass-through mode, then it may do so at a higher speed to reduce any delay the user may require before speaking the command that follows. The blocker may also use a trigger as an alias for the listener's wake word and/or a command to the listener. For example, the trigger word "command" may translate to "hello brand, what is the weather." The blocker may make use of aliases at any time, including both when in blocking mode as well as when already in pass-through mode. Such pre-processing may additionally and/or alternatively result in the blocker using alternate communication channels to inform the listener that it is now in pass-through mode. The listener may also detect an input device signal is being received, compared to when in blocking mode, and bypass its own requirement for a wake word.

The blocker may replay information previously obtained by that blocker, by other blockers, and/or from a library of commands. This may enable the blocker to disrupt the listener from detecting usage patterns. The replay may be an exact duplicate of the information previously obtained, an obfuscated version, and/or a modified version of the information previously obtained, including making use of any of the pass-through pre-processing described herein. The user may configure the blocker by indicating which commands may be replayed and/or which commands may not. This may allow the blocker to avoid commands that have costs and/or implications, such as ordering pizza.

Blocker Configurability and Logging

The blocker may be configurable by users in order to affect the blocker in a variety of ways. The blocker may accept configuration information from the user that is used by the blocker to determine which type or types of triggers should be used by the blocker to determine that blocking mode should be changed to pass-through mode; for example, configuration information may include a list including garage door opens, female voice speaking, the word "command", the word "privacy", all of the wifi devices to detect, and whether each one is or is not an enabled trigger. The blocker may accept configuration parameters for triggers; for example, configuration information may include multiple start times and end times which form a schedule for the time and date schedule triggers. The blocker may have storage to record a variety of logging data about the usage of the blocker and/or the listening device; examples of what the logs may contain include the date, time, and type of each trigger as well as who triggered it, a transcription of the words spoken in pass-through mode, and a recording of the first 10 seconds of each pass-through mode. Additional non-limiting examples of configurable aspects of the blocker include default lengths of time to stay in pass-through mode after any given trigger, minimum volume levels for triggers, length of a silence before automatically returning to blocking mode, number of entries to record in the log, tolerance and/or minimum required probability of a trigger having occurred, selections of what information to log, instructions for how to connect to wifi, whether or not the wifi electronics within the blocker should be enabled, which languages the blocker should use, setting the current time on the blocker's clock, and/or the maximum length of pass-through modes as an limiting override for other configuration.

The blocker may use one or more of a variety of mechanisms to receive the configuration information and provide logging data. The blocker may act as a Hypertext Transfer Protocol (HTTP) server end-point on a local wifi network; for example, visiting the blocker's assigned Internet Protocol (IP) address using a browser pointed to https://192.168.0.5 may offer the user a web browser interface that allows the user to interact in a manner similar to configuration systems for network printers. The blocker may allow configuration and provide logging through a Bluetooth connection to a Bluetooth-compatible device running a configuration application; for example, the blocker may allow configuration using a smartphone with a proprietary application designed to send configuration information to the blocker. The blocker may have a USB connector to receive configuration information and send logs; for example, the blocker may behave as a portable file storage drive when plugged into a computer and allow the computer to send a configuration file to the blocker which would then be parsed by the blocker to extra configuration information.

The blocker may have a type of trigger reserved for changing from blocking mode to a configuration mode and/or a logging mode rather than to pass-through mode; for example, saying "command configuration" may cause the blocker to enter configuration mode and/or pressing a physical button may enter configuration mode. In configuration mode, the blocker may use language recognition to receive configuration information; for example, saying "disable word hello" may cause saying the word "hello" to no longer be considered a trigger. The blocker may use a speaker to communicate to the user the existing communication information, configuration instructions, and/or the logging data. The blocker may integrate to the listening device's speaker to play sound, either through the listening device's processor and/or directly to the listening device's speaker. The blocker may use audio processing that is simpler than language recognition; for example, the blocker may use a speaker to communicate to the user "say something if you want the word hello to be a trigger, stay silent otherwise", and then determine if any sound over 50 db has occurred in the following 2 seconds whereby the presence of a sound would enable the word hello to be a trigger and the absence of a sound would indicate to disable that trigger. Rather than entering configuration mode, a trigger may be assigned a specific configuration change; for example, a physical button may be used to toggle Bluetooth capability of the blocker.

The blocker may also be configurable by other automated systems; for example, multiple blockers in a home may all receive configuration information to their individual application programming interfaces (APIs) from a centralized configuration server that automatically coordinates and/or synchronizes settings across multiple blockers and other devices.

The blocker may be trained to recognize a voice trigger. The voice trigger may be initialized by a voice training mode. The voice training mode may be trained to recognize the voice trigger based on an initial predetermined number of uses upon first use. The voice training mode may be retrained in response to receiving a signal from the user. The voice training mode may also use any of the listening device response detection methods, as described herein, to flag voice trigger occurrences from user's usages of the blocker as true positives or false positives. The voice training mode may provide additional data along with the trigger sound data, for example, as training data to the voice trigger detection systems and/or to have such data affect the trigger configuration.

Limits on the maximum impact of the voice training may be placed. For example, after prolonged use of the blocker with numerous triggers having occurred, the system may either stop making use of newer occurrence for training, stop making use of newer occurrence until retraining mode is indicated by the user, and/or the new occurrence will form a rolling window of training data that continues training the blocker but without cumulatively exceeding a determined threshold of deviation from the untrained trigger model and/or parameters.

The blocker may detect its own trigger detection quality in terms of false negatives (e.g., missed triggers) by identifying trigger attempts that did not cause pass-through mode. The false negatives may have preceded and/or had similarities to successful trigger attempts. For example, if a user attempts to say the trigger word "command" but it is not successfully detected by the blocker, the user may try repeating the trigger command until successful. The successful attempt may have been barely detected, but may be reliably the same user attempt as moments before. The blocker may use this detection quality information, with or without accompanying sound data, to further train the blocker and/or to signal to the user that additional training is recommended.

The blocker may have a training mode to be trained on what listening device behavior is to be expected and/or required after entering pass-through mode, which may allow the blocker to be compatible with a broader range of listening devices and/or to adapt to changes in the listening device's behavior.

The blocker's time of day and/or date based triggers may be not only configurable, but may be trainable. The blocker's time of day and/or date based trigger may be trained either explicitly or automatically based on usage trends. For example, the blocker may detect typical usage times and/or user preferences using any the same methods and/or techniques used by smart home thermostats and/or learning water heaters. The blocker may use the time, date, and/or similar information to modify the parameters, increase error tolerance of other triggers, and/or decrease error tolerance of other triggers rather than being a direct trigger for pass-through mode.

The blocker may have very limited user interface capabilities, such as lacking a screen and/or button. The blocker may use gestures to enter training mode and may use gestures to change configurations, where such gestures can be one or more of the trigger methods. For example, the blocker may enter training mode when a user flips the listening device's orientation a certain number of times, which may be a gesture that is unlikely to occur in regular usage of the listening device and therefore unlikely to have false positives during detection. The blocker may then count the number of gestures (such as flipping or spinning the listening device) and such count may correspond to a mode and/or other numerical parameter value. As an example, the blocker may consider the counted number of flips as corresponding to which orientation (such as upside down or counter-clockwise landscape) of a phone should be the orientation to indicate blocking mode. The blocker may or may not require a processor for this as more basic circuitry can detect a training mode as well as store a value which is later compared to triggers.

Whether or not the blocker has indicators, the listening device may provide feedback to the user indicating whether the blocker is in blocking mode. This feedback may assist with user feedback during testing. For example, a software application on a mobile phone may indicate whether the microphone is receiving any audio, so that a user can test a blocker integrated on a phone and/or with no blocker feedback indicators. The listening device may also monitor its input devices and/or use its output components to provide instruction and/or feedback to the user during gesture based configuration and/or training. For example, a software application on a mobile phone may enable the user to choose from a list of configurations the user would like to perform, it may then provide instructions for what gestures the user should perform to achieve that configuration, and it may then provide feedback on the success of each gesture being performed and guidance on each next step (such as, a phone flip has been placed in the correct direction (e.g., counter-clockwise) and 3 more flips are required). This may or may not involve any communication by the listener to the blocker and may or may not require any separate feedback to the user directly from the blocker.

Preventing the Listener Device being the Trigger (Self-Triggering)

The blocker may employ one or more methods to prevent the listener device itself, and/or other unauthorized electronics, from triggering the blocker entering pass-through mode; for example, the listening device would be prevented from using its speaker to instruct the blocker with "command 1 hour" to perform unauthorized eavesdropping. The blocker may use direction-detecting microphones and disregard any sound triggers that come from the direction of the listening device. Additionally and/or alternatively, the blocker may use an additional microphone that is placed in close proximity and/or focused on the listening device, such that instead of more complex general direction detection, the blocker may able to detect if the listening device is outputting audio (e.g., via one or more speakers of the listening device) and/or attempts to trigger. This additional microphone may be a traditional air microphone, and/or it may be a vibration sensor that serves as a microphone for sound traveling through solid objects, and the vibration sensor may be affixed to the listening device directly or indirectly by being affixed to the blocker which is touching the listening device. The blocker may also detect whether trigger sounds are produced by an actual person and/or an artificial speaker; for example, the blocker may do spectral analysis of the trigger sound and determine that there is a lack of expected high frequencies and therefore the trigger should be ignored as it was generated by unauthorized electronics. The blocker may also make use of other types of triggers as a required combination trigger to ensure that there is at least a witness in the case that unauthorized electronics and/or the listener device itself issues a command; for example, the blocker may permit an artificial speaker being the source of a trigger, but only if a motion detector has detected that people have been in the same room as the blocker within the past 2 seconds.

The blocker may use more integrated methods of detecting what sound the listening device is producing in order to prevent self-triggering; for example, the blocker may be an intermediary between the listening device's processor and the listening device's speaker such that the blocker is able to accurately monitor the sound information being sent by the listener's processor to the listening device's speaker.

The noise cancelling of the listening device's output sound, from the sound input that the blocker processes for listening for a trigger, to reduce the risk of self-activation or to reduce the impact of noise on trigger detection, may not require the involvement of a processor. Instead, the noise cancelling of the listening device's output sound may be implemented using circuitry that combines the sound input of the blocker with an inverted version of the signal from the intercepted listener's signal to its speaker. The sound input of the blocker, with or without the inverted signal being combined, may be applied after a brief time delay to account for the travel time of the sound from the listener's speaker to the blocker's microphone.

Any of the methods of preventing the self-triggering may also be used to provide the blocker additional sound information to assist with noise cancelling or to distinguish user triggers from other sound being produced by the listening device.

Feedback to Users

The blocker may have a variety of ways of indicating to users the ongoing status of the blocker, other state information, and/or activity information. The blocker may have a one or more lights that indicate the mode of the blocker and/or other information to the user; for example, the blocker may have one small LED light that is unlit when in blocking mode, blinking when in pass-through mode for up to 15 seconds, and lit continuously when in pass-through mode for longer than 15 seconds. The blocker may use a speaker to provide feedback to users. For example, the blocker may cause a speaker to beep for 200 ms after a trigger is detected that puts the blocker in pass-through mode. As another example, the blocker may say "blocking mode resumed" when pass-through mode has ended or say "still listening" every hour in pass-through mode. The blocker may send a signal to another device, which in turn notifies the user; for example, the blocker may send a wifi and/or Bluetooth message to a smartphone every time pass-through mode is entered and the smartphone would vibrate upon receiving such a message as well as provide the user a visible log of the date and time of the most recent messages.

Feedback to users, also referred to as indicators and/or blocker feedback, may involve an entire component and/or one or more specific portions and/or specific behaviours of a component, which may collectively be referred to as indicator components.

The blocker may use indicator components which are dedicated for the purpose of indicating to the user that a listener's input device is active and/or able to be active. The blocker may also use indicator components that have a purpose shared between the listener's operation and/or blocker feedback, but which the listener cannot disable the blocker from successfully providing feedback to the user.

The blocker may have indicator components on the same electrical circuit as the listening device's input devices, such that it may be impossible for the listening device to make use of its input devices without activating the feedback indicator. For example, a light (e.g., an LED light) may be on the same circuit as a listener's microphone and may make it impossible for the listener to use the microphone without the LED light indicating its usage to the user.

The blocker may detect an initial indicator, dedicated for this purpose or implicit to the listener's usage, of the usage of a listener's input device, and may trigger one or more similar or different secondary feedback indicators to the user. The blocker may pre-process the initial indicator, for example—by evaluating various characteristics, determining if other triggers have occurred, and/or determining the likelihood of the user already being aware of the listener's input device usage, in order to determine whether or not and what type of secondary feedback to provide the user. For example, if the blocker determines that the user is on a phone call and the phone has indicated such to the user by making sound, then visual feedback (e.g., an LED light) may be sufficient. However, if the blocker determines that the phone has been sitting flat, then the blocker may additionally select an audible beep as feedback to the user.

The blocker may also provide feedback to the user by way of a vibration of the listener device.

The blocker may have an output port and/or connector, dedicated or shared in purpose, which the blocker uses to send a signal to whichever compatible device is plugged-in. That signal may contain information about whether the blocker is in pass-through mode. The compatible device may be as simple as an LED bulb or as complex as a cloud-enabled device, such as a phone. The compatible device may provide feedback to the user directly, or allow the blocker to indirectly communicate with another device and/or form of feedback. For example, the compatible device may comprise an RF transmitter that transmits to the lights (e.g., light bulbs) in a house such that the lights (e.g., lightbulbs) change color whenever a microphone, GPS, and/or other listening device is active. The output port and/or connector may be limited to very low bandwidth communications to reduce privacy risks associated with data being sent (e.g. transmitted) by the blocker. The listener may itself be a compatible feedback device, which may be useful where feedback to the user does not need to be trusted. For example, the blocker may select from one or more indicators to provide feedback, directly or indirectly, based on a number of properties of the indicator. The properties of the indicator may include a presence of the indicator, a distance of the indicator from the listening device, and/or one or more configuration parameters that the indicator communicates to the blocker. For example, the blocker may select the nearest wearable device that was previously paired with the blocker to provide the feedback to the user for an event, and such proximity may indicate which user is most likely to be able to confirm whether the event was intended or unintended eavesdropping.

The blocker may also provide feedback when not in pass-through mode. This may have the additional advantage of power loss defaulting to feedback that notifies the user that privacy is not assured This may in turn ensure that a blocker that depends on a listener for power may not be bypassed by the listener turning off power to the blocker. The blocker may also have a small amount of energy storage capacity, sufficient for providing feedback to the user of a power interruption to the blocker.

The indicator may be a light designed to appear as the shape of a "P", indicating to the user that the light pertains to privacy.

In place of feedback as to the mode of the blocker, the blocker may have indicators that are related to the length of time that the blocker has been in pass-through mode and/or the length of time since the last time the blocker has been in pass-through mode. For example, the indicator component may be a light slider that increases (e.g., appears longer) as the length of time increases.

Containers for Blocker

The physical separation and/or combination of the blocker, listening device, and either's various components, may vary. The blocker may be located inside the listener, the listener inside the blocker, or they may be separate. The microphone that the listener uses may be physically located inside the listener, in the blocker, in the bypass and privacy modules which may be located inside the listener while installed, and/or a separate object. The speaker that the listener uses may be physically located inside the listener, in the blocker, in the bypass and privacy modules which may be located inside the listener while installed, and/or a separate object. The microphone and speakers that the listener uses may be physically located in the same components and/or may be both located together but separate from the blocker and listener.

For example, the listener may have a permanently installed speaker, no permanently installed microphone, and may be provided with a bypass module installed with a microphone but not a speaker. In this example, to make use of a blocker, the bypass module may be uninstalled and a privacy module containing a microphone, but no speaker, may be installed, and the listener may then begin using this privacy microphone through the blocker that also resides in the privacy module. Continuing this example, the privacy module may be uninstalled and a second privacy module containing no microphone nor speaker but containing a Bluetooth-compatible system capable of connecting to a stand-alone Bluetooth microphone, may be installed; the listener may then begin using this stand-alone microphone through the privacy module's blocker.

As another example, the listener may have a permanently installed speaker, but the listener may have the capability to connect to a stand-alone Bluetooth microphone and speaker, and the blocker may have no permanently installed microphone nor speaker but is able to not only connect to one or more stand-alone Bluetooth microphones as input and speakers as output, but may also able to act as if it was a Bluetooth microphone and/or speaker. In this example, the listener may connect to the blocker as if it was a microphone and/or speaker, and the blocker may proceed to allow or disallow sound information to pass through, dependent on what mode the blocker is in and as outlined throughout this document.

The blocker may be provided separately and may be installed, by the user, into the listening device. The initial separation of the blocker and the listening device, particularly in the case of the blocker being a different seller and/or even a different manufacturer than the listening device, in many cases allows for increased trust and privacy assurance of the combined system. The blocker may also have a tamper resistant and/or tamper detecting processor, and/or the blocker may be contained in a tamper resistant and/or tamper evidencing object; this may provide increased assurance that the blocker is an untampered component produced by a different manufacturer, even when the blocker is packaged and sold together with the listening device. Tamper-related features include breakage upon detection of penetration of security encapsulation, zeroising data, tamper evident labels, tamper evident packaging intended to be opened only by the end user, and/or other similar methods.

Any number of components in the blocker may be part of the module, and vice versa. The module may be removable, the blocker may be removable from the module, both, or neither. A module may support multiple blockers with different input device capabilities, and/or a listener may support multiple modules with different capabilities. Different capabilities may include differences in types of triggers, types of input sensors, levels of processing power, and/or levels of tamper-proofing.

The blocker may be contained within a SIM card and/or match the shape of a removable memory card. This may allow the blocker to fit inside of a device, such as a phone, without impacting its external shape.

The blocker may be contained within a protective case around the device, such as a phone cover. The case with blocker may have a battery that serves as additional battery power for the phone. Additionally or alternatively, the case with blocker may plug into the listening device it encloses to obtain power from the listening device.

Additional Integration Points Available on the Listening Device

The listening device may have an additional interface that either is intended to be integrated with and/or is intended for humans but is able to be integrated with. The listening device may have a mute button and/or switch and may have a command button and/or switch. The blocker may have one or more robotic button pushers, similar to those commonly found in "smart buttons," where the blocker switching modes between blocking mode and pass-through mode causes the button pusher to push the listening device's mute and/or action buttons, thereby activating a mute functionality and/or a different functionality. Additionally and/or alternatively, the blocker may connect to the electrical circuit between the listening device's mute/action buttons and the listening device's processor and cause a bypass of the circuit (signal sent to listening device) whenever the blocker switches modes. Additionally and/or alternatively, the blocker may serve as an intermediate device between the listening device's buttons and the listening device's processor and/or replace the button component entirely with the blocker and/or a replacement component that is integrated to the blocker, such that the listening device's processor receives a signal equivalent to the button being pushed whenever the blocker switches modes. The integration with a button capable of muting the microphone may be a replacement to the blocker being an intermediary between the listening device's processor and the listening device's microphone.

The blocker may integrate to other physical interface components of the listening device, such as buttons, switches, fingerprint scanners, touch-screen interfaces, gyroscopes, motion sensors, or the like, that are not intended to be directly related to muting a microphone. The blocker may integrate to these other interface components by intercepting and/or detecting the electrical circuits between the other interface components and the listening device's processor, and/or the blocker may be an intermediary. In combination with the blocker being integrated to the microphones by being an intermediary between the microphones and listening device's processor, the blocker's integration to the other interface components may allow the blocker to detect that the component has been used by the user, switch from blocking mode to pass-through mode (therefore begin permitting the microphone to send sound information to the listening device's processor), and switch back to blocking mode after an ending indicator. The blocker's integration to other interface components may only perform partial processing of the information from the component; for example, integration to a fingerprint scanner may involve only monitoring whether the scanner was used at all or not, and not data about what was scanned and/or whether the fingerprint was correct.

As an example of the listening device being a smart watch, the smart watch has a built-in microphone and built-in accelerometer, the blocker may be located inside the smart watch, the blocker may consist of a clock and fairly simple circuitry without any of the complexity of general computing processors, the blocker may be integrated to passively monitor (without interference and/or modification) signals of the accelerometer to the watch's processor, and the blocker is integrated as an intermediary between the microphone and the watch's processor. In this example, the blocker may allow only sound information to travel from the microphone to the watch's processor for 30 seconds after the accelerometer detects the rotation of the user's wrist, and otherwise the microphone may be effectively muted. An alternate example, where the blocker uses its own dedicated accelerometer rather than the smart watch's built-in accelerometer, is also possible, but the above example may have the advantage of requiring fewer components due to increased sharing of components in a configuration that prevents the processor of the listening device from overriding or bypassing the blocker's control over when to enable or disable the flow of sound information from the microphone. In both of these examples, the blocker and the listening device need not share any CPUs, complex logic circuitry, software, and/or other general computing components; such separation of the blocker's processing and the listening device's processing may greatly reduce the risk of the listening device being able to interfere with the blocker's logic to perform unauthorized eavesdropping.

The listening device may also have intentional integration points and/or circuitry that may conveniently allow an external device, such as the blocker, to reliably intercept, restrict, and/or toggle, the signal between the listening device's microphones and the listening device's processor; preferably, but not necessarily, using circuitry that would not allow the listening device's processor to change the effects of the blocker switching modes. For example, the listening device may have the ability to receive signals from a blocker using a simple USB port and/or Bluetooth connection, where the signals would indicate to the listening device to stop processing sound information from its microphones and/or to wake up.

Blocker as a Power Supply

The blocker may contain a battery which provides the listening device or a component of the listening device with power. The listener device may have this blocker with battery permanently installed, or the listener device may allow interchangeable blockers with batteries; for example, some cell phones have the ability to swap batteries, and the blocker with battery may be similarly swappable.

Cameras Instead of or in Addition to Microphones

The listening device may actually be a watching device, with cameras in place of microphones, or both a listening and watching device, where an integrated blocker may function very similarly within the context of the watching device, as it does with a the listening device; such systems may be referred to as a watching system. Watching systems may share many characteristics with listening systems, and many of the techniques described throughout this description for listening systems may be equally applied to watching systems. The sections of this description relating to self-triggering and pass-through pre-processing are examples of sections that need not be applied to such watching systems. More specifically, for watching systems, the blocker may have the same physical integrations as is outlined throughout this description but, in place of sound data through the connections, it may be video data, visual data, and/or audiovisual data. The components of the blocker and the location of components may be the same as is outlined throughout this description, but with cameras in place of microphones. The sections of this description about the blocker's processor, types of triggers, ability to use lower accuracy trigger detection, logic for ending pass-through mode, blocker configurability, blocker logging, feedback to users, containers, and additional integration points available on the listening device, may all remain applicable.

In a watching system, the blocking device may intercept video data transmitted from one or more cameras to one or more processors of a watching device, process such video data, and transmit the video data to the watching device based on the processing. For example, and as described in more detail below, the blocking device may obfuscate all or portions of the video data, may remove elements of the video data for privacy (e.g., portions of the video data which may depict minors), or the like.

Additionally and/or alternatively, in a watching system, in place of the blocking device acting as an intermediary between the camera and the watching device's processor, the blocking device may cause the lens to be closed and/or covered; for example, some cameras include the ability to signal whether the lens should be closed and/or the lens closes automatically when power is disconnected to the camera, in which case the blocking device may cause the camera to lose power during blocking mode.

When the blocker is in pass-through mode of a watching system, it may pass-through all video from the camera, and/or it may pre-process and/or modify the video images from the cameras before passing it on to the watching device. The blocker may filter the video to only some locations of the camera's field of view; for example, the blocker may modify the video stream to only show the top half of the field of view and/or only show the portions of the field of view that have had movement recently, such that the watching device only receives some of the data from the camera. This may result in increased privacy by reducing the ability for the watching device to spy on activities not intended to be seen by the watching device. The blocker may also filter all video during a period of time where a particular audio volume threshold hasn't been reached, such that if the user is not speaking then the watching device does not receive a video stream even though the blocker is in pass-through mode and the watching device is able to receive the sound information. The blocker may integrate with and/or incorporate commercially-available tools, such as the systems advertised on the website nudedetect.com, to detect nudity and/or other characteristics of the video, and upon determination that inappropriate content is present, restrict the video from being received by the watching device's processor. The blocker may perform such content appropriateness checks periodically, such as only one frame per 2 seconds. The blocker may delay the video stream reaching the watching system by short amounts of time, such as 3 seconds. For example, if the blocker checks for appropriateness every 2 seconds, and the video stream is delayed 3 seconds, then the blocker may require less computing power than checking every frame but the blocker would be able to block the video stream effective up to 3 seconds into the past due to the delay, allowing the blocker to reduce processing power without risking inappropriate content from reaching the watching system. The blocker may accept a higher degree of false positives (falsely flagged inappropriate) and a low degree of false negatives (missed inappropriate content), due to the potential importance of the censorship, and therefore the blocker may employ simpler strategies for inappropriate content detection than some commercially-available tools. As an example of a simpler strategy, the blocker may be configured and/or trained for what the user's skin tone typically is, it may determine in real-time the proportion of the frame that is determined to be of that skin tone, and if a threshold is reached it may censor either the entire frame and/or just all skin tone pixels together with all pixels within any given distance from any skin tone pixel.

Process for after-Market Modification of Listening Devices

A user may modify a listening device to interface with a blocker, and may be based the modification on instructions provided with a blocker. For example, a user may purchase a listening device, such as a commercially-available smart speaker, and open and/or otherwise modify one or more aspects of the listening device for use with a blocker by following instructions provided with the blocker. The user may thereby install an after-market blocker on a listening device that the user previously purchased. Instructions provided with the blocker may instruct the user regarding one or more steps to install the blocker on the listening device. For example, based on instructions (e.g., as provided with the blocker), a user may cut a wire leading to a microphone of a listening device and insert each cut end of the wire into a portion of a blocker. As another example, a user may, based on instructions, replace a portion of a listening device that includes a microphone with the blocker, which may contain its own microphone. As another example, a user may, based on instructions, replace a portion of a listening device that includes a camera with the blocker, which may contain its own camera. As another example, a user may be instructed to disable (e.g., physically destroy) a microphone of a listening device and connect the blocker to the listening device as an external microphone (e.g., such that the listening device may be forced to rely on the blocker).

The instructions may specify one or more steps to be taken by a user. For example, as indicated above, the instructions may instruct a user to cut a wire for a microphone and physically insert the ends of the cut wire into the blocker. Such one or more steps may be outlined in instructions provided by the blocker in paper, digitally, or the like. For example, the blocker may be configured to, when first turned on by a user, guide the user through one or more steps to attach the blocker to the listening device.

The instructions may instruct the user to replace, and/or modification of the listening device may comprise replacing, all or portions of a listening device with an interface configured to allow the listening device to communicate with the blocker. For example, the instructions may cause a user to install a network interface (e.g., an Ethernet port) on a listening device and use the network interface to connect the listening device to the blocker. As another example, the listening device may comprise one or more circuit boards, and the user may, in response to instructions, replace a preexisting circuit board with a new circuit board which causes the listening device to use the functionality of the blocker.

Modification of the listening device may comprise modifying and/or altering software executing on or with respect to the listening device. For example, a listening device may be flashed with new software which removes restrictions on using a blocker. As another example, a listening device may be configured to permit access, by the blocker, to functionality of the listening device. As another example, if the listening device is part of a controlled ecosystem (e.g., a family of products that only work with other products in the family sold by the same company), software on the listening device may be modified to trust the blocker and/or associate the blocker with a trusted part of the ecosystem. The modification and/or alteration of the software on the listening device may comprise physically connecting a blocker to the listening device, executing instructions on a second computing device connected to a network that the listening device is also connected on, or the like. For example, a user of the listening device with a smartphone may first install first software specific to the listening device on the smartphone, establish a connection with the listening device via the first software, and then execute second software that, via the connection, modifies third software executing on the listening device.

Additional Listener Input Devices and Listeners

The one or more input devices on the listener, which are blocked by the blocker, need not only be a microphone. The input devices may include components that are intended for the listener to receive information about the environment of the listener, such as a microphone, camera, GPS, accelerometer, proximity sensor, light sensor, or otherwise. The input devices may also include components that are not observing the environment, but rather are communication components, such as a Bluetooth chipset or wifi chipset, and/or a cellular SIM card, which may or may not indirectly provide the listener with information about the environment of the listener.

The blocker may determine modes selectively and/or specifically for each of multiple connected input devices, or multiple listeners entirely. The blocker may be selective in terms of which one or more input devices to enable, and may be selective in terms of which one of one or more listeners or components of the listeners is able to receive information from the one or more input devices. For example, the blocker may determine that the position of a phone is a trigger for a phone call and may only allow a microphone signal to go directly to a SIM card, whereas a different position of a phone is a different trigger and may allow the microphone signal to go to both the SIM card as well as the phone's primary microprocessor. This may allow the blocker to block the operating system on a smart phone from eavesdropping on phone calls.

The blocker may determine modes selectively for each capability of a protocol of an input device. For example, the blocker may allow a Bluetooth connection between a listener and Bluetooth endpoint to send sound out from the listener but not allow microphone information back to the listener. The blocker may do this by limiting the amount of data back from the Bluetooth endpoint to allow, for example, basic commands such as play and pause to be received but not microphone data, by limiting the characteristics of data back from the Bluetooth endpoint, and/or otherwise.

The listening devices may be kitchen cabinet-mounted tablets as well as mobile home assistant robots.

Multi-Blocker Management

Trigger detection may have methods of distinguishing which of the one or more listeners a user is intending to interact with. The blocker may have a multi-word trigger intended for multiple devices to differentiate which listener the user is intending to interact with. For example, a general trigger "command" may be followed by the trigger word "phone," which may indicate that only blockers attached to phones are to continue in pass-through mode. The blocker may enter pass-through mode upon a portion of the trigger being detected and then go back to blocking mode if another portion of the trigger is not detected, and a second portion may be simultaneously used by the blocker as a trigger but also used by the listener as a wakeword and/or a command. For example, "command hello brand A" may be an entire trigger and the word "command" allows all blockers to enter pass-through such that whichever device brand is ultimately desired, it was able to have receive "hello brand A" without the user repeating it twice and if the blockers for "brand B" go back to blocking mode then privacy implications may be minimized. A given blocker may default to remaining in pass-through mode, unless it affirmatively confirms that a different listener is intended alternate to negatively confirming that the given blocker is the one intended, and this may allow the blocker to reduce false negatives (e.g., missed triggers).

The blocker may also analyze the signals from the input device to the listener and determine that they are not compatible with the blocker's corresponding listener. The blocker may cause blocking mode to resume. For example, if the command "lights on" is detected, the blocker for a stereo that has no lights may go back to blocking mode.

Benefit of Permission Granularity

The blocker being in blocking mode and/or preventing the one or more listener's processors from accessing data from the listener's input devices may have the benefit of providing the user with more granular permissions for the listener and/or the listener's software applications, as compared to the configuration options the listener includes for the user. For example, the listener may have a single software permission setting for each application indicating whether the application can make use of a camera input device and/or the associated camera flashlight. However with the blocker, the user may be able to give a software application operating system defined permissions for the camera and flashlight pair, but the application would only be able to signal the flashlight to flash and not be able to access the camera while in blocking mode. As another example, a user would be able to enable location services on a phone's operating system for a software application that needs Bluetooth beacons to operate and which may be used to track positions of the user and therefore requires location services, and still block the application from using the GPS positioning.

Additional Examples of Combinations

The following are intended to be non-limiting examples that combine various embodiments and/or features as described herein.

As a first example, a stationary smart speaker with a microphone and a mute button, has a voice activated blocker. The blocker may be powered by USB, contains a microphone, has an LED light that is turned on anytime the blocker is in pass-through mode, automatically presses the smart speaker's mute button anytime the mode switches to pass-through mode as a result of the user saying a wakeword, automatically processes the smart speaker's mute button to switch back to blocking mode after a period of time has elapsed, and/or requires that a light sensor (which is positioned to detect whether the smart speaker has indicated to the user it has received a command) is activate and if not the blocker terminates pass-through mode sooner.

As a second example, a user-handled phone with input devices of microphone and/or GPS may have a voice activated blocker. The blocker may draw power from a circuit on the phone, intercept signals between the phone's input devices and the phone's processor while in blocking mode, monitor the microphone signal for a wakeword, switch to pass-through mode upon a user saying that wakeword, and go back to blocking mode upon a terminating trigger being spoken and/or a period of time having elapsed.

As a third example, a user-handled phone with a microphone and camera as input components may have a gesture activated blocker. The blocker may draw power from the phone's battery, have no microprocessor, intercept signals between the phone's input devices and the circuits that go to the phone's processing, and have at least an accelerometer.

The blocker may stay in blocking mode while the phone is stationary, is on an approximately level surface face up or down for a minimum of 2 seconds, while the phone is upside down whether stationary or moving, and/or while the phone was recently upside down but is now sideways and/or another position but has not (since being upside down) been at least within 10 degrees of right side up. As an extension of this example but with the blocker having a microprocessor, the blocker may also use the phone's microphone to determine if a voice trigger is overriding the gesture triggers, the blocker may detect a 2 second prolonged shake to force pass-through mode for a predetermined and/or predefined amount of time (e.g., 2 hours) from the time of each shake, and, if the phone is upside down, it is has a more sensitive threshold for each shake.

Inspection of a Listener Device

A listening device may undergo an inspection determine what privacy designation to associate with the listener. Such inspection may be through physical inspection of a listener and/or inspection of a listener's schematics. The steps of the inspection need not be performed in the order listed here. A inspector may inspect the listening design to determine if specific pins of a processor go to one or more input devices (sensors) directly and/or have a path to one or more sensors that can be examined the entire length and without unexamined gaps. An inspector may examine that the circuitry that is directly or indirectly connected to the sensors is sufficiently isolated such that certain components in between the sensor and processor cannot be bypassed. An inspector may examine that the certain in between components provide the user sufficient feedback at any point that the sensor is providing a signal to the processor. An inspector may examine that a blocker's microprocessor, separate to the listening device's primary processor, is unable to be reprogrammed or have software updated through any of the circuitry that is connected to the blocker's microprocessor. If all of the above are true, the listening device may be assigned a high privacy metric.

Miscellaneous

The robotic button pusher that may push a listening device's mute button, may also be a robotic toggle switcher, a camera-shutter slider, and/or a variety of equivalent physical manipulators that correspond to the manipulated controls on a listening device.

The blocker's processor and listener's processor both may or may not be on the same shared circuit board.

The blocker's processor and listener's processor may have other protections and/or separations to ensure the listener is not able to affect the blocker's operation.

DESCRIPTION OF FIGURES

FIGS. 1-6, as provided below, may be used to implement the features described above. FIG. 1 depicts an illustrative system where a blocker device 101 is integrated to the listening device 102. FIG. 1 may, for example, implement the features described above with respect to a device integrated into a listening device, and may implement the features described in other sections herein. The listening device 102 may include a processor 103, a power supply connection 107, one or more microphones 106, among other components. The processor 103, and other elements of the listening device 102, may be different than similar elements of the blocker device 101. For example, the listening device 102 and the blocker device 101 may both have processors, albeit different processors. The listening device may connect to a listening device server 109 via a WAN. The listening device 102 may provide the blocker device 101 with power through a power connection 108. The blocker may have one or more microphones 104, which may be used by the blocker while in both pass-through mode as well as in blocking mode. The one or more microphones 106 may have one or more connections 105 to the processor 103 through the blocker device 101 as an intermediary and which the processor 103 can only utilize when the blocker device 101 is in pass-through mode. The one or more microphones 106 may, e.g., be connected by two wires 105, and the blocker device 101 may only need to be in-line with one segment (the output segment, which may also be known as the signal wire) of the circuit between the processor 103 and the one or more microphones 106, while the other wire may go directly to the processor 103 but is not able to independently provide the processor 103 with sound information.

Figure 2:
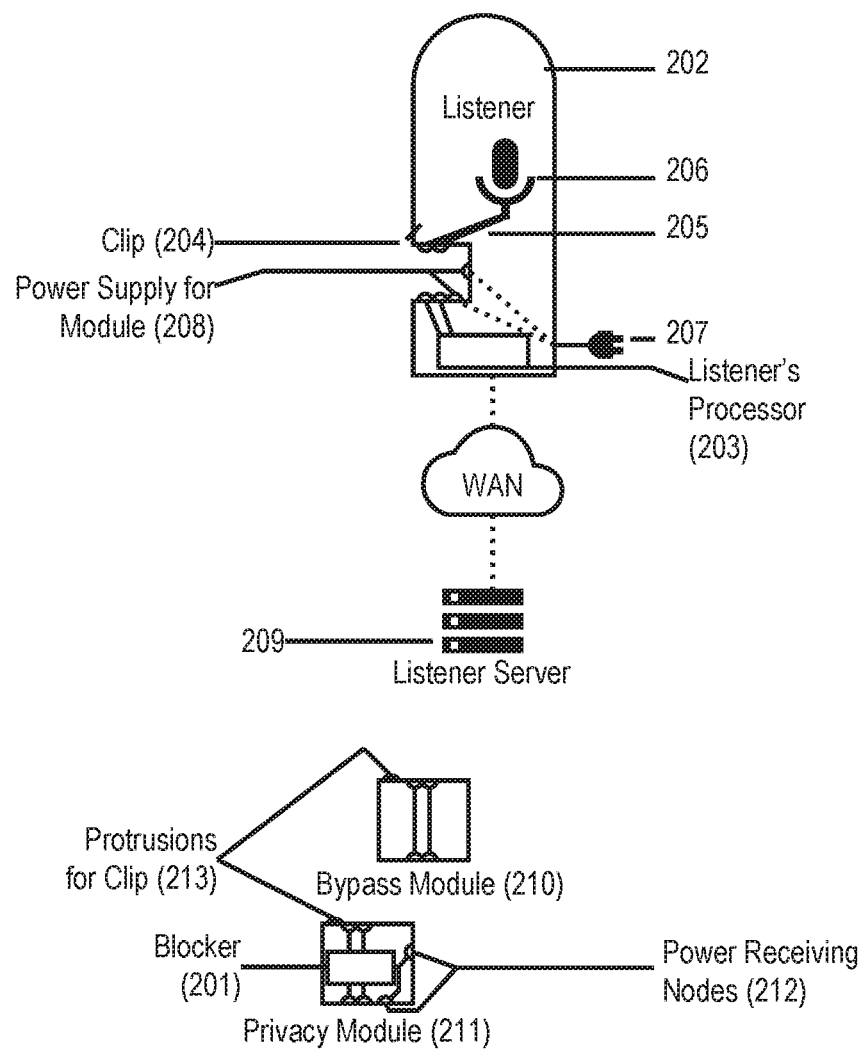
FIG. 2 shows a modularized privacy blocker capable of integration into a listening device in accordance with one or more aspects of the disclosure.

FIG. 2 depicts an illustrative system where a blocker 201 is able to be integrated with the listening device 202. The blocker 201 may generally correspond to integrated forms of the blocker, as discussed above, and may implement the features described in other sections herein. The listening device 202 may include a processor 203, a power supply connection 207, and one or more microphones 206 (e.g., a set of microphones), among other components. The listening device 202 may also have module socket that can accept a bypass module 210 and/or a privacy module 211. The listening device 202 may connect to a listening device server 209 via a WAN. The listening device 202 may provide the blocker 201 with power through power supply connectors 208 of the listening device 202 that connect to power receiving connectors 212 of the bypass module 210, which contains the blocker 201. The power supply connectors 208 may connect to nothing in the case that the privacy module 411 is installed. The one or more microphones 206 may have one or more connections 205, shown as two wires in FIG. 2, which may go to connectors of the module socket, which would connect to the respective connectors on the bypass module 210 and/or privacy module 211. The module socket may also have one or more additional connections between two more connectors of the module socket to the processor 203. The bypass module 210 and privacy module 211 may have protrusions 213 which may aid a clip 204 in fastening the module into the module socket of the listening device 202. If the bypass module 210 is installed in the module socket, then the one or more microphones 206 and listening device's processor 203 may be connected to each other without any intermediary. If the privacy module 211 is installed in the module socket, then both of the wires from the one or more microphones 206 have the blocker 201 as an intermediary to their connection to the listening device's processor 203.

Figure 3:
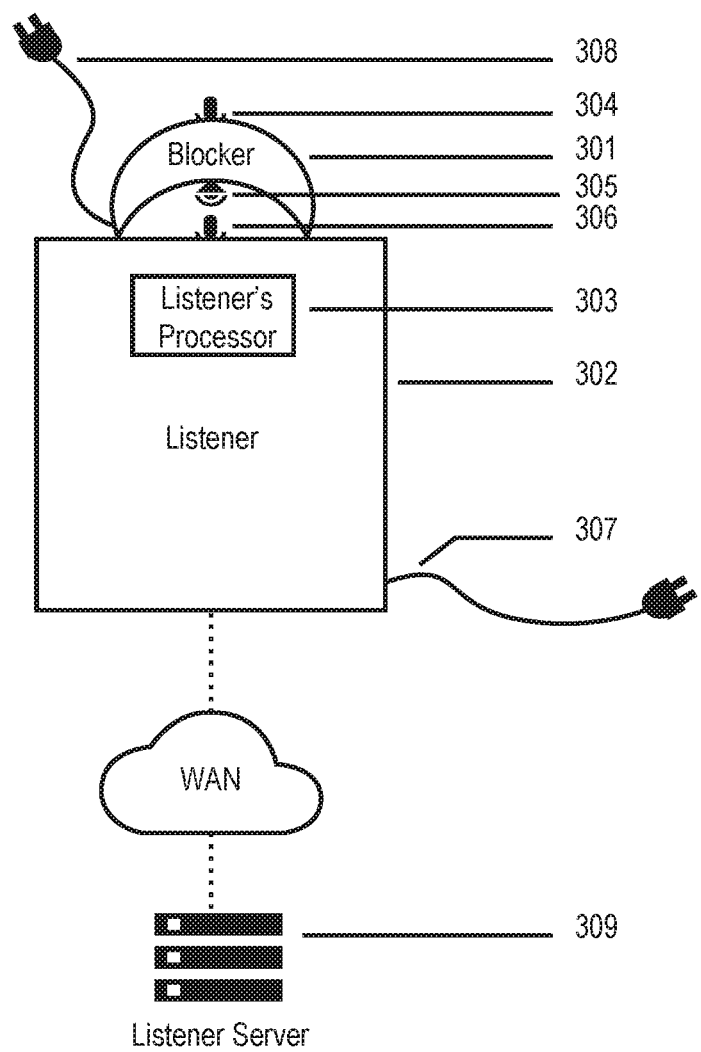
FIG. 3 shows an example of a privacy blocker operating with respect to a listening device according to one or more aspects of the disclosure.

FIG. 3 depicts an illustrative system where a blocker device 301 is not tightly integrated with the listening device 302. The blocker 301 may generally correspond to non-integrated forms of the blocker, discussed above, and may implement the features described in other sections herein. The listening device 302 may include a processor 303, a power supply connection 307, and one or more microphones 306, among other components. The listening device 302 may connect to a listening device server 309 via a wide area network. The blocker device may include one or more microphones 304, which may be set of microphones or the like, one or more speakers 305, and a power supply 308. The blocker device 301 may play noise through its speaker 305 to jam the one or more microphones 306 from receiving sound from the environment, and may stop playing noise when it detects a trigger using the one or more microphones 304.

Figure 4:
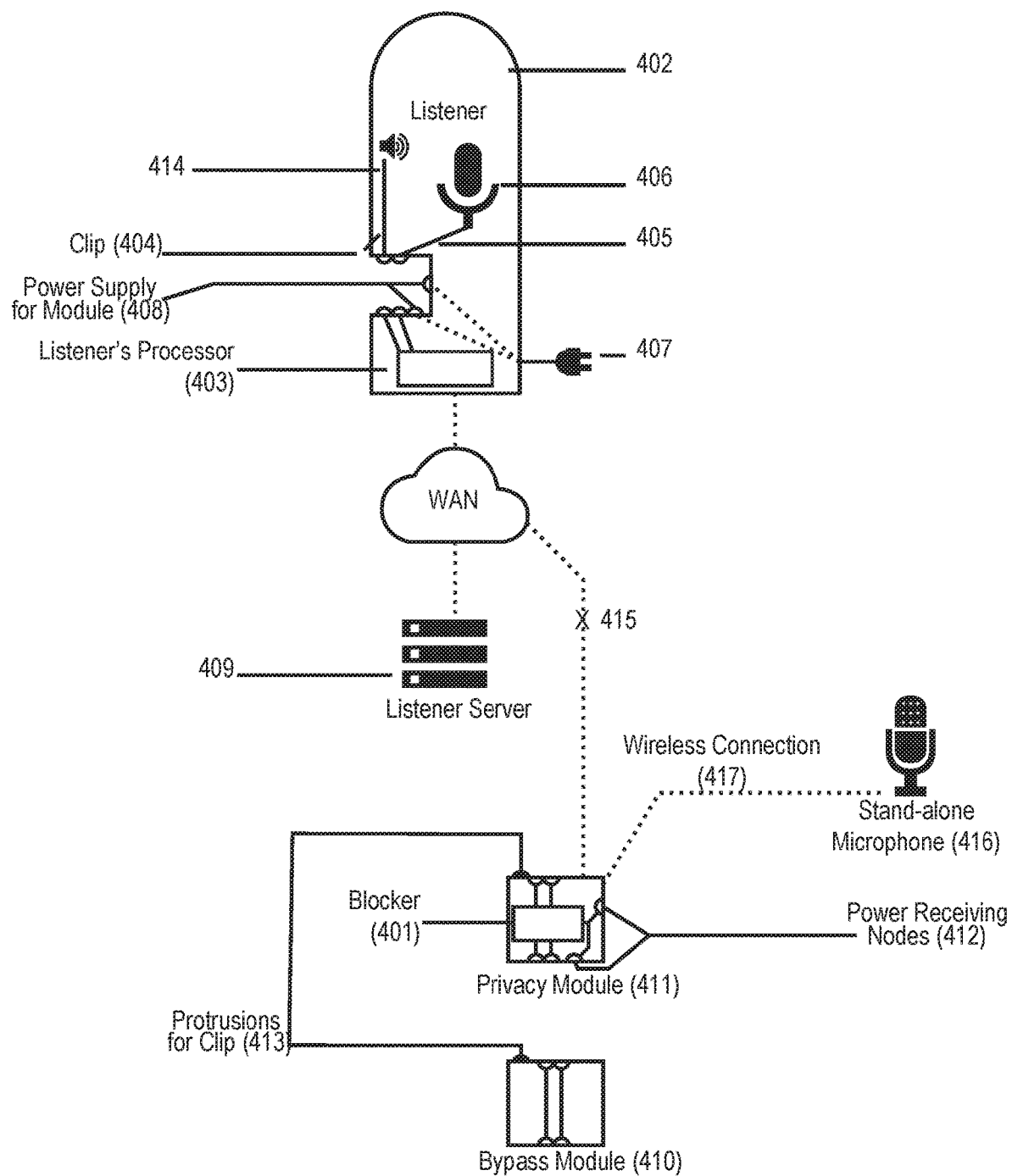
FIG. 4 shows an example of a privacy blocker capable of integration into a listening device, and with additional components, according to one or more aspects of the disclosure

FIG. 4 shows a different way in which a blocker 401 may be integrated to a listening device 402. The blocker 401 may generally correspond to integrated forms of the blocker, discussed above, and may implement the features described in other sections herein. The listening device 402 may include a processor 403, a power supply connection 407, and one or more microphones 406, among other components. The listening device may also have module socket that can accept a bypass module 410 and/or a privacy module 411. The listening device 402 may connect to a listening device server 409 via a WAN. The listening device 402 may provide the blocker 401 with power through the power supply connectors 408 of the listening device 402 that connect to power receiving connectors 412 of the privacy module 411, which contains the blocker 401. The power supply connectors 408 may connect to nothing in the case that the bypass module 410 is installed. The one or more microphones 406 may have one or more connections 405, in this case a one wire connection, which go to a connector of the module socket and connect to the respective connector on the bypass module 410 and/or the privacy module 411. One or more speakers of the listening device 402 may have a connection 414, in this case shown as a one wire connection, which goes to a connector of the module socket, which would connect to the respective connector on the bypass module 410 and/or privacy module 411. The module socket may also have connections between two more connectors of the module socket to the processor 403. The bypass module 410 and privacy module 411 may have protrusions 413 which may, in conjunction with the clip 404, fasten the module into the module socket of the listening device 402. If the bypass module 410 is installed in the module socket, then the one or more microphones 406 and speakers may be connected to the listening device's processor 403 without any intermediary. If the privacy module 411 is installed in the module socket, then both the one or more microphones 406 and speakers have the blocker 401 as an intermediary to their connection to the listening device's processor 403. The privacy module 411, and/or the blocker 401 within it, may connect via a wireless connection 417, such a Bluetooth connection, to the one or more microphones 416; the one or more microphones 416 may assist with trigger detection while the blocker is in blocking mode, and/or alternatively the privacy module may use its connection to the one or more microphones 416 to replace the need to connect to the listening device's one or more microphones 406. The privacy module 411 and/or the blocker 401 may lack the ability to connect 415 to a WAN.

Figure 5:
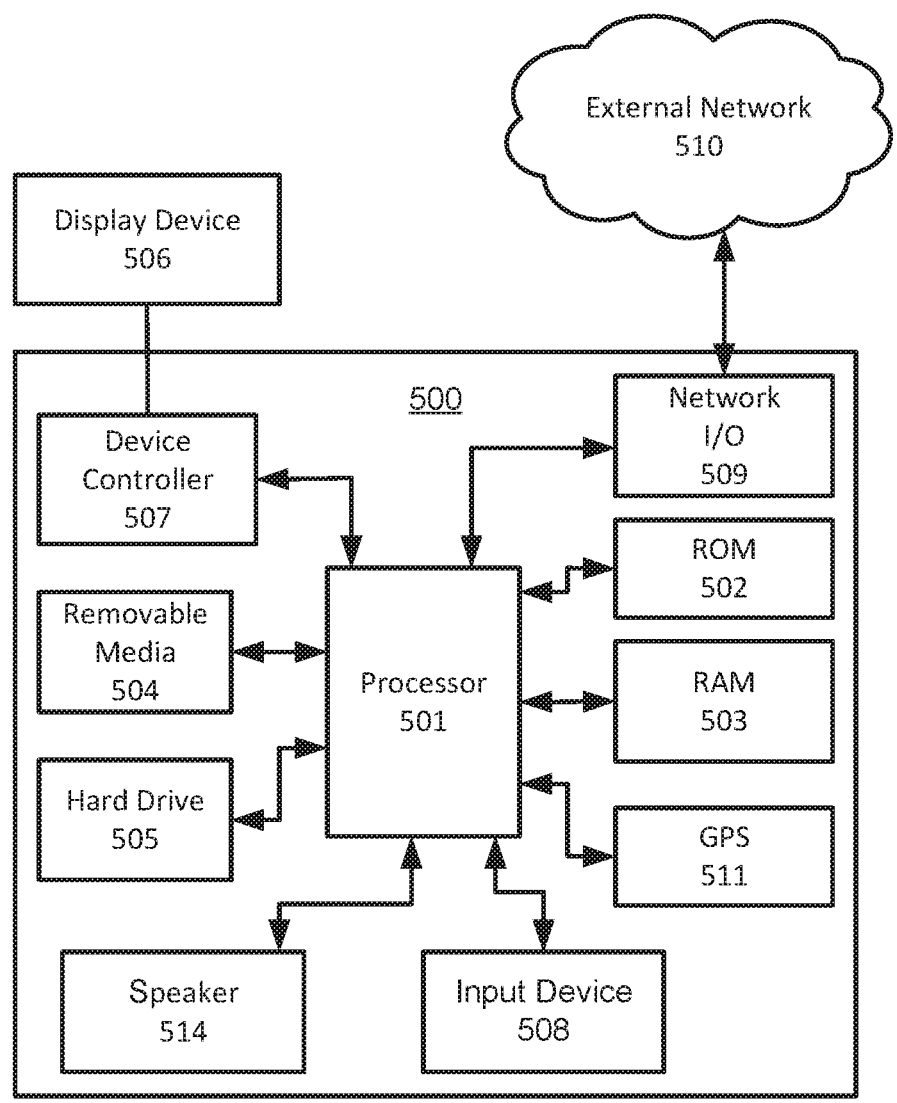
FIG. 5 shows an example of hardware elements of a computing device according to one or more aspects of the disclosure.

FIG. 5 shows hardware elements of a computing device 500 that may be used to implement any of the devices shown in FIGS. 1-4. For example, a listening device may, but need not, comprise a computing device. Similarly, the blocker may, but need not, be implemented as a computing device, such that the processors discussed above with respect to the blocker may be the same or similar as processors described with respect to FIG. 5, and/or the blocker's processor as shown in FIGS. 1-4 may be, but need not, comprise a computer device. The computing device 500 may comprise one or more processors 501, which may execute instructions of a computer program to perform any of the functions described herein. The instructions may be stored in a read-only memory (ROM) 502, random access memory (RAM) 503, removable media 504 (e.g., a USB drive, a compact disk (CD), a digital versatile disk (DVD)), and/or in any other type of computer-readable medium or memory. Instructions may also be stored in an attached (or internal) hard drive 505 and/or other types of storage media. The computing device 500 may comprise one or more output devices, such as a display device 506 (e.g., an external television and/or other external or internal display device) and a speaker 514, and may comprise one or more output device controllers 507, such as a video processor. One or more user input devices 508 may comprise a remote control, a keyboard, a mouse, a touch screen (which may be integrated with the display device 506), microphone, etc. The computing device 500 may also comprise one or more network interfaces, such as a network input/output (I/O) interface 510 (e.g., a network card) to communicate with an external network 509. The network I/O interface 510 may be a wired interface (e.g., electrical, radio frequency (RF), optical (via fiber)), a wireless interface, or a combination of the two. The network I/O interface 510 may comprise a modem configured to communicate via the external network 509. The external network 509 may comprise communication links to, e.g., the external network 509, an in-home network, a network provider's wireless, coaxial, fiber, or hybrid fiber/coaxial distribution system, or any other desired network. The computing device 500 may comprise a location-detecting device, such as a global positioning system (GPS) microprocessor 511, which may be configured to receive and process global positioning signals and determine, with possible assistance from an external server and antenna, a geographic position of the computing device 500.

Although FIG. 5 shows an example hardware configuration, one or more of the elements of the computing device 500 may be implemented as software or a combination of hardware and software. Modifications may be made to add, remove, combine, divide, etc. components of the computing device 500. Additionally, the elements shown in FIGS. 1-4 may be implemented using basic computing devices and components that have been configured to perform operations such as are described herein. For example, a memory of the computing device 500 may store computer-executable instructions that, when executed by the processor 501 and/or one or more other processors of the computing device 500, cause the computing device 500 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Additionally or alternatively, the blocker device may be implemented using circuitry (e.g., special-purpose circuitry) configured to perform the features described herein. For example, the blocker may comprise an Application-Specific Integrated Circuit (ASIC) specially configured to detect and process one or more sounds. As another example, the blocker may comprise low-level circuitry configured to detect the presence of sounds. The blocker may be configured without memory in order to prevent modification of the memory by, for example, unauthorized parties. In other words, while FIG. 5 depicts a computing device, neither the blocker device nor the listening device need be a computing device. For example, the blocker device may be entirely configured using circuitry such that users of the blocker device are reassured that the blocker device cannot store and transmit audio data to third parties.

Figure 6:
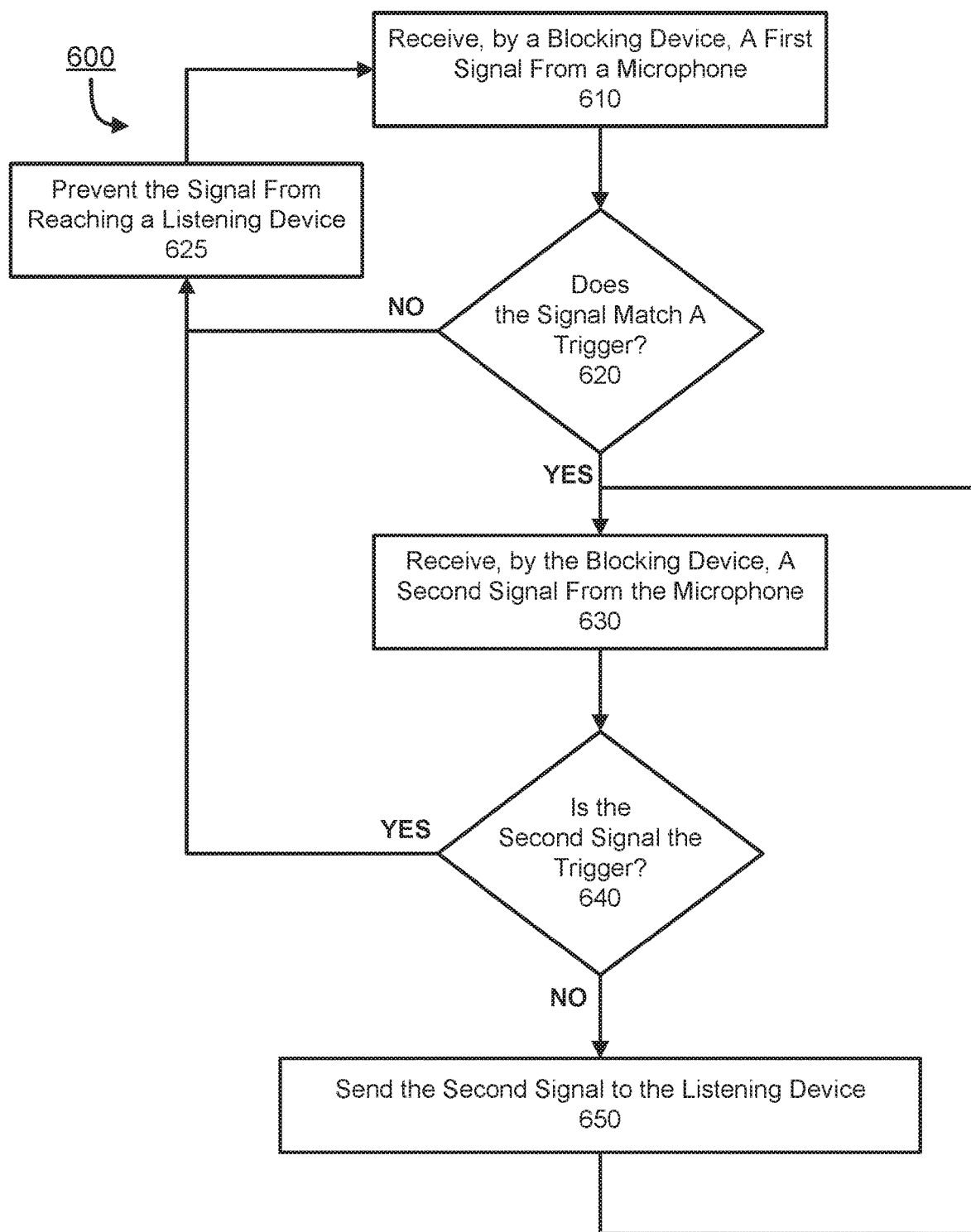
FIG. 6 shows an example of a flowchart for intercepting signals intended for a listening device according to one or more aspects of the disclosure.

As noted above, a blocking device may be installed to prevent communications (e.g., signals) from reaching a listening device. FIG. 6 shows a flow chart of a process 600 for intercepting signals intended for a listening device. Some or all of the steps of process 600 may be performed using one or more computing devices described herein, such as blocking device 101.

In step 610, a blocking device, such as blocking device 101, may receive a first signal. The first signal may be audio data, video data, or some other communication received from a microphone. The microphone may be part of a module installed in the listening device. In some instances, the module may be a blocking device installed between the microphone and a processor of the listening device. Additionally or alternatively, the microphone may be part of the listening device. Alternatively, the microphone may be a microphone of the blocking device configured intercept the signal intended for the listening device. In this regard, the microphone may replace a microphone associated with the blocking device. Intercepting the signal intended for the listening device may include preventing one or more signals from the first microphone from being received by the listening device. In this regard, the blocking device may be configured to intercept the signals by interrupting one or more wires of the listening device.

In step 620, the blocking device may determine whether the signal matches a trigger. As noted above, the trigger may be an audio command recognized by the blocking device. The trigger may be used to activate a blocking mode of the blocking device, which may prevent signals from reaching the listening device. Similarly, the trigger may be used to deactivate the blocking mode. With the blocking mode deactivated, the blocking device may permit signals to pass-through the blocking device and on to the listening device. Determining whether the signal matches the trigger may comprise detecting one or more sounds associated with an audio trigger using one or more of the techniques described above. In some instances, the audio trigger corresponds to a command for the listening device. In preferred embodiments, the command may be one or more spoken words. If the signal does not match the trigger, the blocking device may prevent the signal from reaching a listening device in step 625. The blocking device may use any of the blocking techniques described above, such as active blocking, passive blocking, etc. In some instances, preventing the signal from reaching the listening device may comprise preventing the listening device from receiving the entire signal. In this regard, the blocking device may be configured to remove a portion of the one or more signals from the first microphone before transmitting the one or more signals to the listening device. When the signal does match the trigger, the blocking device may deactivate the blocking mode.

In step 630, the blocking device may receive a second signal from the microphone. The second signal may be received after the blocking device has been deactivated. Much like the first signal, the second signal may be audio data, video data, and/or some other communication received from the microphone. In step 640, the blocking device may determine whether the second signal matches the trigger. If so, the computing device may re-activate the blocking mode and return to step 625. Accordingly, the second signal may be prevented, in whole or in part, from reaching the listening device. The blocking device may begin monitoring for the trigger again.

However, when the second signal does not match the trigger, the blocking device may send the second signal to the listening device in step 650. Sending the second signal to the listening device may comprise permitting one or more second signals to be received by the listening device. As shown in FIG. 6, process 600 may continue to allow signals to pass to the listening device until the blocking device receives the trigger to reactivate blocking mode. In some examples, the blocking device may permit one or more second signals to be received by the listening device for a temporary period of time. At the conclusion of the period of time, the blocking device may reactivate blocking mode to intercept and prevent any signals from reaching the listening device.

Figure 7:
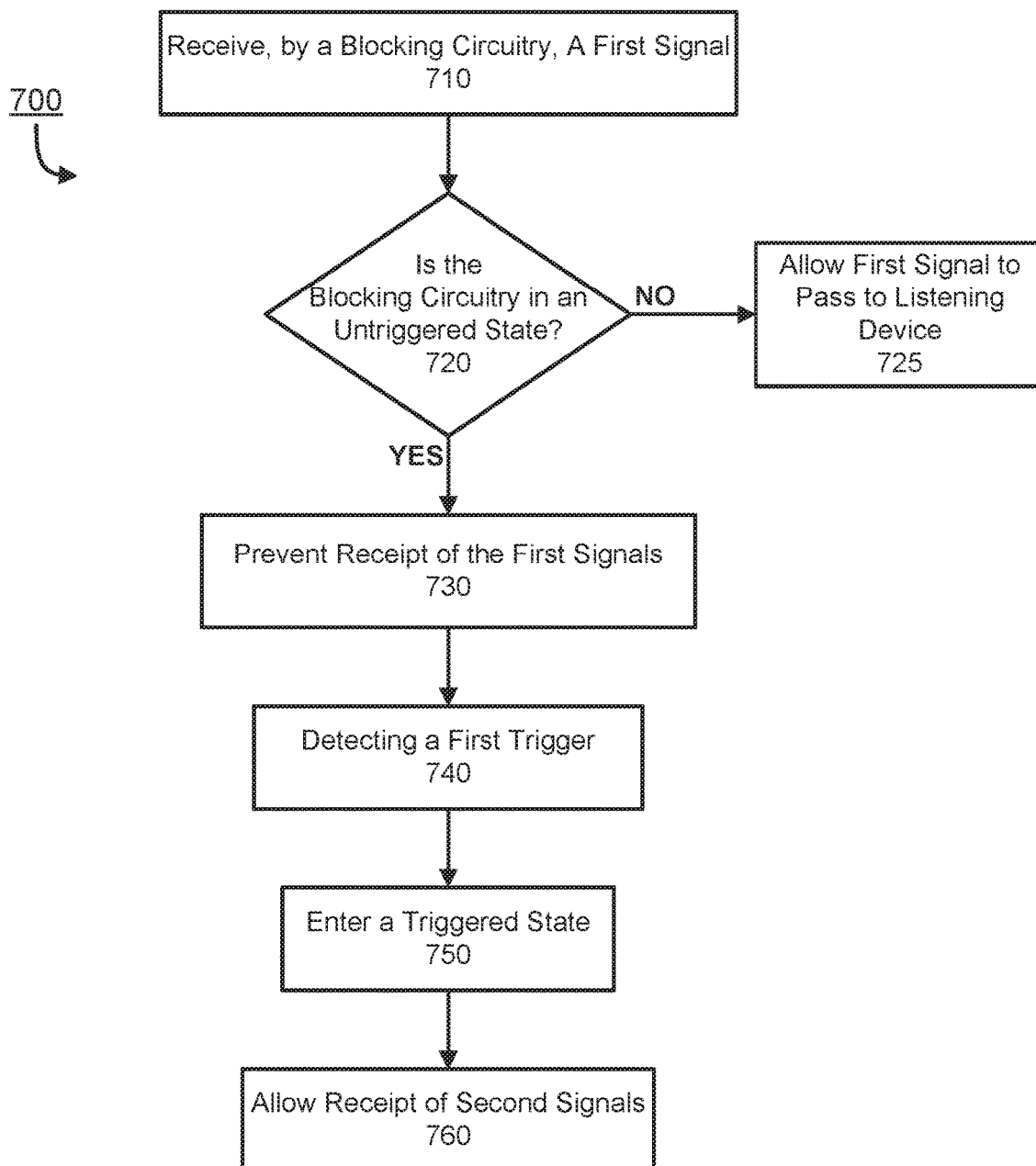
FIG. 7 shows an example of a flowchart for intercepting signals intended for a listening device according to one or more aspects of the disclosure.

FIG. 7 shows an example for intercepting signals intended for a listening device. Some or all of the steps of process 700 may be performed using one or more computing devices described herein, such as blocking device 101.

In step 710, blocking circuitry may receive a first signal. The blocking circuitry may be located in the same housing as one or more processors of a smart device. The blocking circuitry may ground each communication path between at least one microphone and the one or more processors of the smart device while in an untriggered state. In some embodiments, the blocking circuitry may indicate when electrical activity associated with the at least one microphone is detected. Additionally or alternatively, the blocking circuitry may indicate when the blocking circuitry is in the triggered state. The block circuitry may be incapable of communication over a network used by the smart device. In other embodiments, the blocking circuitry may be a removable device adapted to connect to the smart device via one or more interfaces. The first signal first signal may be generated by at least one microphone of a smart device. As discussed above, the first signal may include may be audio data, video data, or some other communication received from a microphone that is part of a blocking module installed in the listening device and/or part of the module installed in the listening device. The blocking circuitry may be between the at least one microphone and the one or more processors of a smart device.

In step 720, blocking circuitry may determine whether it is in an untriggered state. When the blocking circuitry is not in an untriggered state, the blocking circuitry may allow the first signal to pass to the listening device in step 725. However, the blocking circuitry may prevent the first signals from being received by one or more processors of the smart device in step 730. Preventing receipt of the first signal may comprise grounding at least a portion of a circuit associated with the at least one microphone. Additionally or alternatively, preventing receipt of the first signal may comprise outputting third signal to the one or more processors of the smart device. The third signal may comprise one or more first sounds configured to emulate one or more second sounds from an environment associated with the smart device. A first volume of the one or more first sounds may be based on a second volume of the one or more second sounds. The blocking circuitry may determine the one or more first sounds by recording, for a period of time in the untriggered state, the one or more second sounds.

In step 740, the blocking circuitry may detect a first trigger associated with activating the blocking circuitry. The first trigger may be detected using an input device of the blocking circuitry. The first trigger may be different from a second trigger associated with activating the smart device. The first trigger may be an audio trigger received from at least one microphone. The audio trigger may be a command spoken by a user. The command may be spoken within a predetermined distance of the smart device. The first trigger may be configurable by a user. The smart device may comprise the at least one microphone. The blocking circuitry may process the audio trigger, for example, using a speech recognition algorithm. The blocking circuitry may determine that one or more words in the audio trigger are associated with the triggered state, for example, based on the processing. In some embodiments, the first trigger may correspond to a movement detected by an optical sensor of the blocking circuitry. Additionally or alternatively, the first trigger may correspond to a movement detected by a wearable device.

In step 750, the blocking circuitry may temporarily enter a triggered state based on detecting the first trigger. The blocking circuitry may be configured to temporarily enter the triggered state and allow receipt of the second signals by determining that the smart device did not output the first trigger, for example, based on processing the first trigger to determine an origin of the first trigger. The blocking circuitry may be configured to temporarily enter the triggered state and allow receipt of the second signals by processing the second signal to obscure an identity of at least one user, and outputting the processed second signals to the one or more processors of the smart device. In step 760, the blocking circuitry may allow one or more processors of the smart device to receive the second signals generated by the at least one microphone. After a time period associated with the triggered state has elapsed, the blocking circuitry may return to the untriggered state.

Figure 8:
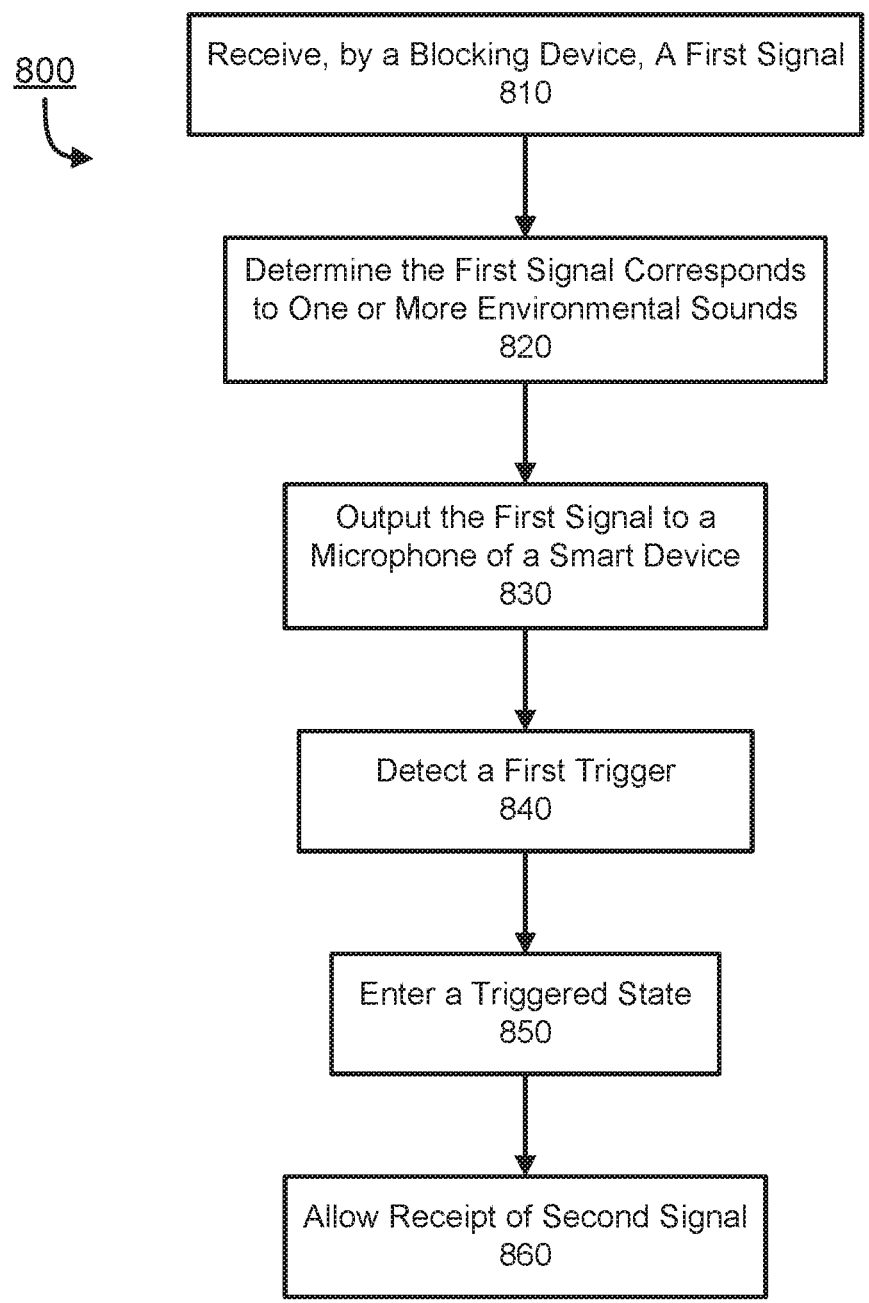
FIG. 8 shows an example of a flowchart for intercepting signals intended for a listening device according to one or more aspects of the disclosure.

FIG. 8 shows an example for intercepting signals intended for a listening device. Some or all of the steps of process 800 may be performed using one or more computing devices described herein, such as blocking device 101.

In step 810, a blocking device may receive a first signal. The first signal may be received via at least one first microphone of a blocking device. The blocking device may ground each communication path between at least one microphone and the one or more processors of the smart device while in an untriggered state. In some embodiments, the blocking circuitry may indicate when electrical activity associated with the at least one microphone is detected. Additionally or alternatively, the blocking circuitry may indicate when the blocking circuitry is in the triggered state. The block circuitry may be incapable of communication over a network used by the smart device. In other embodiments, the blocking circuitry may be a removable device adapted to connect to the smart device via one or more interfaces. The first signal first signal may be generated by at least one microphone of a smart device.

In step 820, the blocking device may determine that the first signal corresponds to one or more sounds of an environment associated with a smart device. A first volume of the o configured to be greater than the volume of the one or more sounds. The blocking device may record the first signal for a period of time, for example, if the blocking device is in an untriggered state.

In step 830, the blocking device may output the first signal to at least one second microphone of the smart device. The blocking device may output the first signal using an output device of the blocking device. A first volume of the first outputted signal may be configured to be greater than the volume of the one or more environmental sounds. The blocking may select the one or more first signals to output based on the volume of the one or more first signals satisfying a threshold. The first signal may be based on the one or more sounds of the environment associated with the smart device. In some embodiments, the first outputted signal may be configured to emulate speech by one or more users of the smart device. The first signal may be configured to impede receipt, by the at least one second microphone, of environmental audio while the blocking device is in an untriggered state. Impeding receipt of the environmental audio may comprise shielding at least a portion of the at least one first microphone.

In step 840, the blocking device may detect a first trigger associated with activating the blocking device. The first trigger may be detected using an input device of the blocking device. The first trigger may be different from a second trigger associated with activating the smart device. The first trigger may be an audio trigger received from at least one microphone. The audio trigger may be a command spoken by a user. The command may be spoken within a predetermined distance of the smart device. The first trigger may be configurable by a user. The smart device may comprise at least one microphone. The blocking device may process the audio trigger, for example, using a speech recognition algorithm. The blocking device may determine that one or more words in the audio trigger are associated with the triggered state, for example, based on the processing. In some embodiments, the first trigger may correspond to a movement detected by an optical sensor of the blocking circuitry. Additionally or alternatively, the first trigger may correspond to a movement detected by a wearable device.

In step 850, the blocking device may temporarily enter a triggered state based on detecting the first trigger. The blocking device may be configured to temporarily enter the triggered state and allow receipt of the second signals by determining that the smart device did not output the first trigger, for example, based on processing the first trigger to determine an origin of the first trigger. The blocking device may be configured to temporarily enter the triggered state and allow receipt of the second signals by processing the second signal to obscure an identity of at least one user, and outputting the processed second signals to the one or more processors of the smart device. In step 860, the blocking device may allow one or more processors of the smart device to receive the second signals generated by the at least one microphone. After a time period associated with the triggered state has elapsed, the blocking circuitry may return to the untriggered state.

Figure 9:
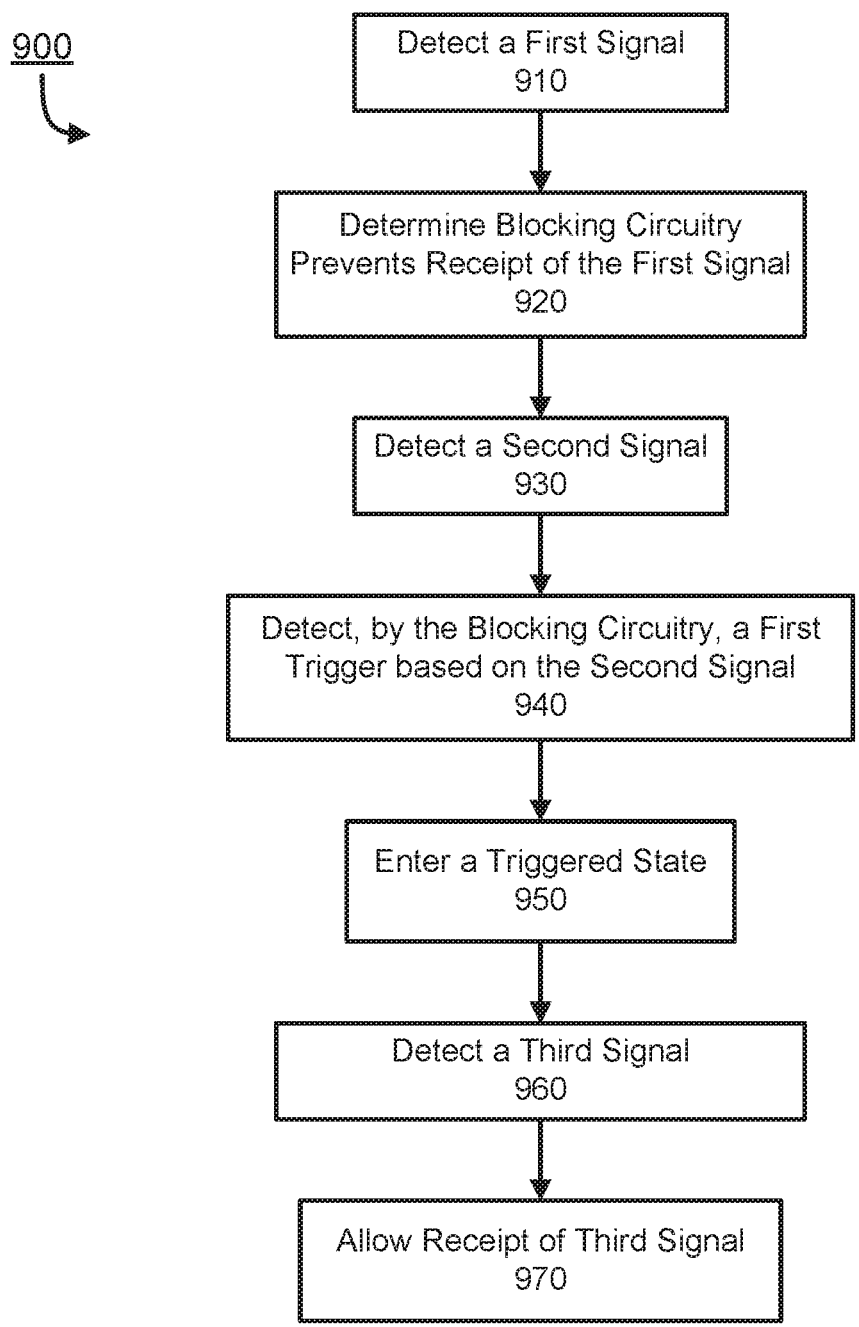
FIG. 9 shows an example of a flowchart for intercepting signals intended for a listening device according to one or more aspects of the disclosure.

FIG. 9 shows an example for intercepting signals intended for a listening device. Some or all of the steps of process 900 may be performed using one or more computing devices described herein, such as blocking device 101.

In step 910, a blocking device may detect a first signal. Detecting the first signal may comprise detecting first electrical signals associated with a communications path between at least one microphone of a smart device and one or more processors of the smart device. Additionally or alternatively, detecting the first signal may comprise monitoring one or more circuits of the smart device. In some embodiments, detecting the first signal may comprise monitoring a power use of the smart device.

In step 920, the block device may determine that blocking circuitry prevents receipt of first signal while the blocking circuitry is in an untriggered state. Preventing receipt of the first signal may comprise each communication path between the at least one microphone and the one or more processors being conducted via the blocking circuitry. Preventing receipt of the first signal may comprise grounding at least a portion of a circuit associated with the at least one microphone.

In step 930, the blocking device may detect a second signal. The second signal may be one or more electrical signals associated with the communications path between the at least one microphone of the smart device and the one or more processors of the smart device.

In step 940, the blocking device may detect a first trigger based on the second signal. Detecting the first trigger based on the second signal may comprise determining that the blocking circuitry detects a first trigger, for example, based on the second signal. The second signals may be detected using an input device of the blocking circuitry. The first trigger may be associated with activating the blocking circuitry. The first trigger may be different from a second trigger associated with activating the smart device. The first trigger may comprise an audio trigger received from at least one second microphone, an optical sensor of the blocking circuitry, and/or a movement detected by a wearable device.

In step 950, the blocking device may enter a triggered state based on detecting the first trigger. The blocking device may be configured to temporarily enter the triggered state. The blocking device may be configured to temporarily enter the triggered state and allow receipt of the second signals by processing the second signal to obscure an identity of at least one user, and outputting the processed second signals to the one or more processors of the smart device. In step 960, the blocking device may receive a third signal. In step 970, the blocking device may allow one or more processors of the smart device to receive the third signal. In some instances, the blocking device may assign, a privacy level to the blocking circuitry, for example, based on the first signal, the second signal, and/or the third signal. After a time period associated with the triggered state has elapsed, the blocking may resume and process 900 may start over again.

Figure 10:
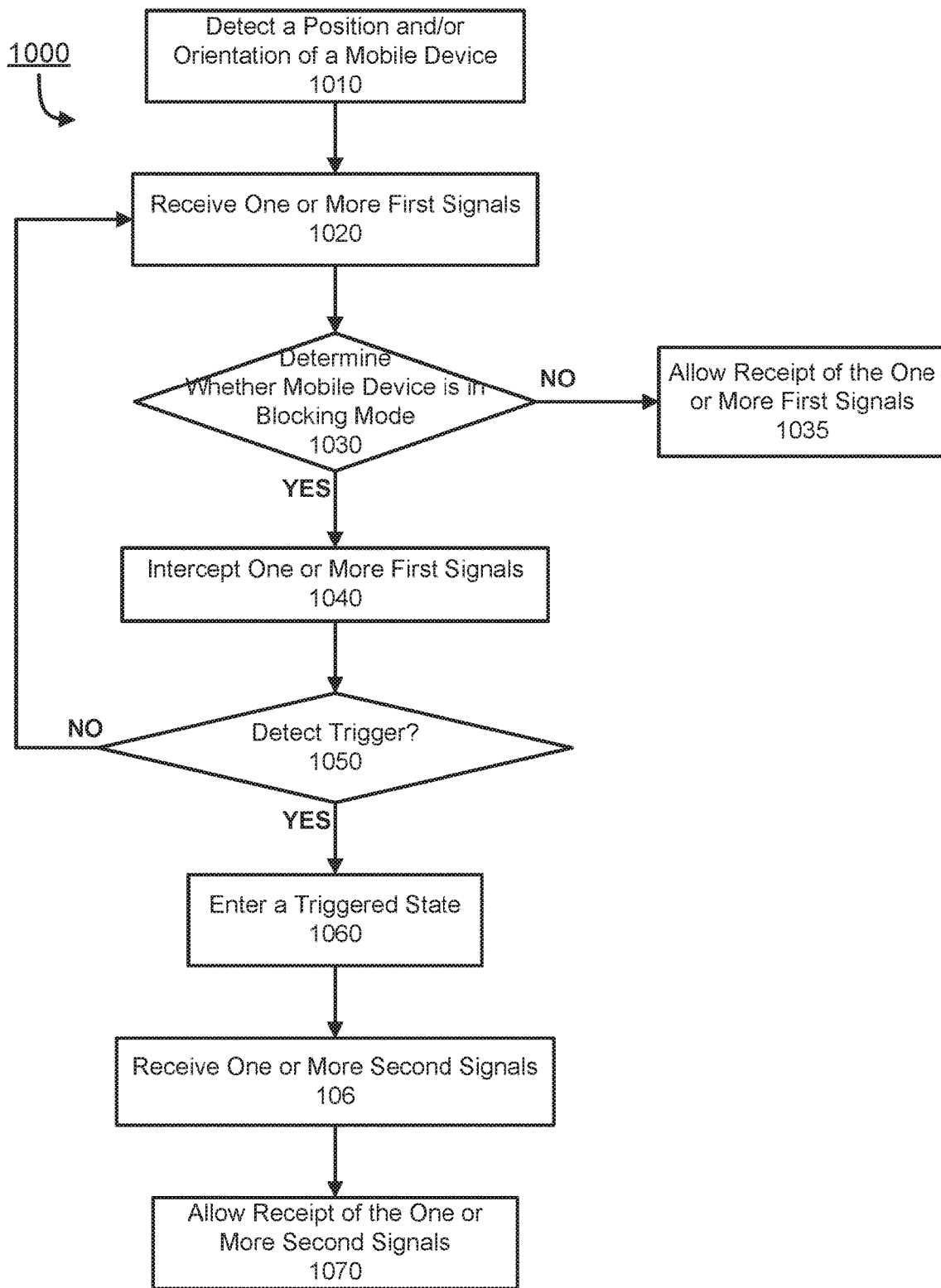
FIG. 10 shows an example of a flowchart for intercepting signals intended for a mobile device according to one or more aspects of the disclosure.

FIG. 10 shows an example for intercepting signals intended for a mobile device. Some or all of the steps of process 1000 may be performed using one or more computing devices described herein, such as blocking device 101 and/or device 500.

In step 1010, a device, such as blocking device 101, may detect a position and/or orientation of a device, such as a mobile device (e.g., smart phone, cellular phone, tablet, laptop, etc.). As discussed above, the position and/or orientation of the device may be determined using one or more sensors, such as an accelerometer located on the device. In some instances, detecting the position and/or orientation of the device may include determining whether the device has been stationary for a predetermined amount of time and/or which way the device is facing (e.g., face up, face down, on its side, at an angle, etc.). In further examples, detecting a position and/or orientation of the device may include determining a first orientation and a second orientation of the device. The device may determine whether the second orientation of the mobile device satisfies a threshold, such as the device being held at a predetermined angle (e.g., >10 degrees). If the second orientation does not satisfy the threshold, the device may remain in blocking mode. However, if the second orientation does satisfy the threshold, the device may enter a triggered state, such as a pass-through mode.

In step 1020, the device (e.g., blocking device 101) may receive one or more first signals. The one or more first signals may be received via at least one first microphone of a blocking device. Additionally or alternatively, the one or more first signals may be received via a microphone of a device, such as device 500 (e.g., a mobile device). In some instances, the one or more first signals may be obtained by an image capture device of the mobile device. In step 1030, the device (e.g., block device 101) may determine whether the device is in a blocking mode. As discussed above, the blocking mode may be a default operation of the blocking device. Additionally or alternatively, the blocking mode may be entered in response to one or more user inputs. If the device (e.g., blocking device 101) is not in blocking mode, the blocking device may allow the one or more signals to be received by a processor of the mobile device in step 1035.

However, when the blocking device is in a blocking mode, the blocking device may intercept the one or more first signals in step 1040. Intercepting the one or more signals may include preventing receipt of the one or more first signals by one or more processors of the mobile device. The one or more signals may be prevented from reaching the one or more processors by interrupting a transmission medium of the mobile device, interrupting one or more wires of the mobile device, and/or grounding at least a portion of a circuit associated with the via one or more inputs of the mobile device. In some embodiments, the blocking circuitry may indicate when electrical activity associated with the at least one microphone is detected.

In step 1050, the blocking device may detect a trigger associated with a triggered state. The trigger may comprise a gesture input, such as a shaking movement and/or other repetitive motions. Additionally or alternatively, the gesture input may be a series and/or sequence of positions and/or orientations of the mobile device. In further examples, the trigger may also comprise an audio trigger. The audio trigger may be received via one or more inputs of the blocking device and/or the mobile device. The audio trigger may comprise a command spoken by a user within a predetermined distance of the mobile device. In some instances, the audio trigger may override one or more of the gesture inputs. If not trigger is detected in step 1050, process 1000 may return to step 1020. However, when a trigger is detected in step 1050, process 1000 may proceed to step 1060.

In step 1060, the blocking device may enter a triggered state. As mentioned above, the triggered state may be a pass-through mode that allows one or more signals to be transmitted to one or more processors of the mobile device. In some instances, the blocking device may be configured to temporarily enter the triggered state to allow receipt of one or more second signals. In step 1060, the blocking device may receive one or more second signals. Much like the one or more first signals discussed above, the one or more second signals may be received via at least one microphone of the blocking device and/or the mobile device. Additionally or alternatively, the one or more second signals may be obtained by an image capture device of the mobile device. In step 1070, the blocking device may allow one or more processors of the mobile device to receive the one or more second signals received via one or more inputs. After a time period associated with the triggered state has elapsed, the blocking device may return to the untriggered state and processing may begin again at step 1010.

By using the devices, processes, and techniques discussed herein, a greater level of privacy may be obtained from in-home listening devices, such as smart speakers, personal assistants, and the like.

While the term "blocking device," "listening device," processors thereof, and microphones thereof have been described herein such that, e.g., the blocking device is described as having a processor and the listening device is also described as having a different processor, the devices described herein may be modified. For example, phrases herein relating to the blocker's processor may relate to the blocking device as a whole, or vice versa. Similarly, as another example, phrases herein relating to the listening device's processor may relate to the listening device as a whole, and vice versa. The one or more microphones and/or the one or more cameras described herein may be inside, attached to, or remote from any of the devices herein. For example, as noted above, one or more of the microphones may be wireless.

Example Embodiments

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1. A blocking device comprising intercept circuitry configured to prevent environmental audio from being transmitted from a microphone to a listening device; listening circuitry configured to determine, using the microphone, an audio trigger in the environmental audio; and output circuitry configured to allow, based on the audio trigger, second environmental audio to be received by the listening device.

Clause 2. The blocking device of clause 1, wherein the intercept circuitry is configured to prevent the environmental audio from being transmitted from the microphone to the listening device by intercepting a signal from the microphone to the listening device.

Clause 3. The blocking device of any one of clauses 1-2, wherein intercepting the signal comprises interrupting a transmission medium of the listening device.

Clause 4. The blocking device of any one of clauses 1-3, wherein the device is configured to, when installed in the second computing device, prevent the environmental audio from being transmitted from the microphone to the listening device.

Clause 5. The blocking device of any one of clauses 1-4, wherein the intercept circuitry is further configured to prevent, after a predetermined time period and after allowing the second environmental audio to be received by the listening device, third environmental audio from being received by the listening device.

Clause 6. The blocking device of any one of clauses 1-5, wherein the listening device is connected to a network, and wherein the blocking device is not connected to the network.

Clause 7. The blocking device of any one of clauses 1-6, wherein the listening circuitry is configured to ignore audio originating from the listening device.

Clause 8. The blocking device of any one of clauses 1-7, wherein the audio trigger comprises a spoken command.

Clause 9. The blocking device of any one of clauses 1-8, wherein the listening circuitry is configured to use a speech recognition algorithm on the spoken command to determine the audio trigger.

Clause 10. A computing device comprising one or more processors and memory storing instructions that, when executed by the one or more processors, cause the computing device to prevent one or more sounds from being transmitted from a microphone to a second computing device; monitor the one or more sounds via the microphone; determine that the one or more sounds are associated with an audio trigger; and allow, based on the audio trigger, one or more second sounds to be received by the second computing device via the microphone.

Clause 11. The computing device of clause 10, wherein the instructions, when executed by the one or more processors, cause the computing device to monitor the one or more sounds via the microphone by intercepting signals transmitted from the microphone to the second computing device.

Clause 12. The computing device of any one of clauses 10-11, wherein the computing device is connected to the second computing device via a wireless network, and wherein the computing device is configured to appear, to the second computing device, as a second microphone.

Clause 13. The computing device of any one of clauses 10-12, wherein the computing device is a module installed into the second computing device.

Clause 14. The computing device of any one of clauses 10-13, wherein the instructions, when executed by the one or more processors, further cause the computing device to: ignore, based on determining that one or more second sounds originated from the second computing device, the one or more second sounds.

Clause 15. The computing device of any one of clauses 10-14, wherein the instructions, when executed by the one or more processors, cause the computing device to allow the one or more second sounds to be received by the second computing device by causing the computing device to: transmit, via one or more speakers, the one or more second sounds to a second microphone associated with the second computing device.

Clause 16. The computing device of any one of clauses 10-15, wherein the instructions, when executed by the one or more processors, cause the computing device to allow the one or more second sounds to be received after one or more third sounds are received by the microphone.

Clause 17. The computing device of any one of clauses 10-16, wherein the instructions, when executed by the one or more processors, cause the computing device to allow the one or more second sounds to be received by the second computing device by transmitting, based on the one or more second sounds, one or more third sounds to the second computing device.

Clause 18. The computing device of any one of clauses 10-17, wherein the one or more third sounds comprise text-to-speech data generated based on the one or more second sounds.

Clause 19. The computing device of any one of clauses 10-18, wherein the instructions, when executed by the one or more processors, cause the computing device to allow the one or more second sounds to be received by the second computing device by excluding a portion of the one or more second sounds associated with the audio trigger.

Clause 20. A system comprising: a first computing device comprising a first microphone; one or more first processors; and first memory storing instructions that, when executed by the one or more first processors, cause the first computing device to receive audio content via the first microphone; and a second computing device comprising: a second microphone; one or more second processors; and second memory storing instructions that, when executed by the one or more second processors, cause the second computing device to: intercept signals from the first microphone to the first computing device; detect, using the second microphone, one or more second sounds associated with an audio trigger; and permit, based on the audio trigger, the first computing device to receive one or more third sounds.

Clause 21. The system of clause 20, wherein permitting the first computing device to receive the one or more third sounds comprises: generating, based on the one or more second sounds, the one or more third sounds.

Clause 22. The system of any one of clauses 20-21, wherein the second computing device is installed into the first computing device, and wherein the first microphone and the second microphone are the same.

Clause 23. The system of any one of clauses 20-22, wherein intercepting the signals from the first microphone to the first computing device comprises: transmitting, to the first computing device, one or more fourth sounds.

Clause 24. The system of any one of clauses 20-23, wherein the one or more fourth sounds are based on sounds recorded by the second computing device.

Clause 25. The system of any one of clauses 20-24, wherein intercepting the signals from the first microphone to the first computing device comprises: activating a mute functionality of the first computing device.

Clause 26. The system of any one of clauses 20-25, wherein the one or more second sounds are spoken by a user, and wherein the audio trigger is defined by the user.

Clause 27. The system of any one of clauses 20-26, wherein permitting the first computing device to receive the one or more third sounds is based on determining that the one or more third sounds did not originate from a speaker associated with the first computing device.

Clause 28. The system of any one of clauses 20-27, wherein intercepting the signals from the first microphone to the first computing device comprises disabling the first microphone.

Clause 29. A method comprising intercepting, by a blocking device, communications between a first microphone and a listening device, wherein the blocking device is configured intercept the communications by preventing one or more signals from the first microphone from being received by the listening device; detecting, using the first microphone and by the blocking device, one or more sounds associated with an audio trigger; and permitting, based on detecting the one or more sounds associated with the audio trigger, one or more second signals to be received by the listening device.

Clause 30. The method of clause 29, wherein the blocking device and the first microphone are part of a module installed in the listening device.

Clause 31. The method of any one of clauses 29-30, wherein a user is instructed to install the module in the listening device via instructions accompanying the blocking device.

Clause 32. The method of any one of clauses 29-31, wherein the permitting the one or more second signals to be received by the listening device is for a temporary period of time.

Clause 33. The method of any one of clauses 29-32, wherein the blocking device is configured to intercept the communications by interrupting one or more wires of the listening device.

Clause 34. The method of any one of clauses 29-33, wherein the first microphone replaces a second microphone associated with the listening device.

Clause 35. The method of any one of clauses 29-34, further comprising: preventing communications between the second microphone and the listening device.

Clause 36. The method of any one of clauses 29-35, wherein the audio trigger corresponds to a command for the listening device.

Clause 37. The method of any one of clauses 29-36, wherein the command is one or more spoken words.

Clause 38. The method of any one of clauses 29-37, wherein the blocking device comprises circuitry configured to detect the one or more sounds.

Clause 39. The method of any one of clauses 29-38, wherein the blocking device is configured to remove a portion of the one or more signals from the first microphone before transmitting the one or more signals to the listening device.

Clause 40. The method of any one of clauses 29-30, wherein the blocking device is installed via an interface of the listening device.

Clause 41. A smart device comprising: at least one microphone; one or more processors; and blocking circuitry configured to: prevent receipt, by the one or more processors, of first signals generated by the at least one microphone while the blocking circuitry is in an untriggered state, wherein each communication path between the at least one microphone and the one or more processors is conducted via the blocking circuitry; detect, using an input device of the blocking circuitry, a first trigger associated with activating the blocking circuitry, wherein the first trigger is different from a second trigger associated with activating the smart device; and based on detecting the first trigger, temporarily enter a triggered state and allow receipt, by the one or more processors, of second signals generated by the at least one microphone.

Clause 42. The smart device of clause 41, wherein the first trigger comprises an audio trigger received from at least one second microphone.

Clause 43. The smart device of any one of clauses 41-42, wherein the audio trigger comprises a command spoken by a user within a predetermined distance of the smart device.

Clause 44. The smart device of any one of clauses 41-43 claim 2, wherein the blocking circuitry further comprises the at least one second microphone.

Clause 45. The smart device of any one of clauses 41-44, wherein the blocking circuitry is configured to detect the first trigger associated with activating the blocking circuitry by: processing, using a speech recognition algorithm, the audio trigger; and determining, based on the processing, that one or more words in the audio trigger are associated with the triggered state.

Clause 46. The smart device of any one of clauses 41-45, wherein the first trigger corresponds to a movement detected by an optical sensor of the blocking circuitry.

Clause 47. The smart device of any one of clauses 41-46, wherein the first trigger corresponds to a movement detected by a wearable device.

Clause 48. The smart device of any one of clauses 41-47, wherein preventing receipt of the first signals comprises grounding at least a portion of a circuit associated with the at least one microphone.

Clause 49. The smart device of any one of clauses 41-48, further comprising: returning, based on determining that a time period associated with the triggered state has elapsed, to the untriggered state.

Clause 50. The smart device of any one of clauses 41-49, wherein the blocking circuitry is configured to temporarily enter the triggered state and allow receipt of the second signals by: determining, based on processing the first trigger to determine an origin of the first trigger, that the smart device did not output the first trigger.

Clause 51. The smart device of any one of clauses 41-50, wherein preventing receipt of signals from the at least one microphone comprises outputting, to the one or more processors, third signals comprising one or more first sounds configured to emulate one or more second sounds from an environment associated with the smart device.

Clause 52. The smart device of any one of clauses 41-51, wherein a first volume of the one or more first sounds is based on a second volume of the one or more second sounds.

Clause 53. The smart device of any one of clauses 41-52, further comprising: determining the one or more first sounds by recording, for a period of time while the blocking circuitry is in the untriggered state, the one or more second sounds.

Clause 54. The smart device of any one of clauses 41-53, wherein the blocking circuitry is configured to temporarily enter the triggered state and allow receipt of the second signals by: processing the second signals to obscure an identity of at least one user; and outputting, to the one or more processors, the processed second signals.

Clause 55. The smart device of any one of clauses 41-54, wherein the blocking circuitry and the one or more processors are located within the same housing.

Clause 56. The smart device of any one of clauses 51-55, wherein, when the blocking circuitry is in the untriggered state, each communication path between the at least one microphone and the one or more processors is grounded.

Clause 57. The smart device of any one of clauses 51-56, wherein the blocking circuitry is further configured to indicate when electrical activity associated with the at least one microphone is detected.

Clause 58. The smart device of any one of clauses 51-57, wherein the blocking circuitry is further configured to indicate when the blocking circuitry is in the triggered state.

Clause 59. The smart device of any one of clauses 51-58, wherein the blocking circuitry is incapable of communication over a network used by the smart device.

Clause 60. The smart device of any one of clauses 51-59, wherein the first trigger is configurable by a user.

Clause 61. A method comprising: preventing, by blocking circuitry, receipt, by one or more processors of a smart device, of first signals generated by at least one microphone of the smart device while the blocking circuitry is in an untriggered state, wherein each communication path between the at least one microphone and the one or more processors is conducted via the blocking circuitry; detecting, by the blocking circuitry and using an input device of the blocking circuitry, a first trigger associated with activating the blocking circuitry, wherein the first trigger is different from a second trigger associated with activating the smart device; and based on detecting the first trigger, temporarily entering, by the blocking device, a triggered state and allowing receipt, by the one or more processors, of second signals generated by the at least one microphone.

Clause 62. The method of clause 61, wherein the first trigger comprises an audio trigger received from at least one second microphone.

Clause 63. The method of any one of clauses 61-62, wherein the audio trigger comprises a command spoken by a user within a predetermined distance of the smart device.

Clause 64. The method of any one of clauses 61-63, wherein the smart device further comprises the at least one second microphone.

Clause 65. The method of any one of clauses 61-64, wherein detecting the first trigger comprises: processing, using a speech recognition algorithm, the audio trigger; and determining, based on the processing, that one or more words in the audio trigger are associated with the triggered state.

Clause 66. Blocking circuitry comprising an input device, wherein the blocking circuitry is configured to: prevent receipt, by one or more processors of a smart device, of first signals generated by at least one microphone of the smart device while the blocking circuitry is in an untriggered state, wherein each communication path between the at least one microphone and the one or more processors is conducted via the blocking circuitry; detect, using the input device of the blocking circuitry, a first trigger associated with activating the blocking circuitry, wherein the first trigger is different from a second trigger associated with activating the smart device; and based on detecting the trigger, temporarily enter a triggered state and allow receipt, by the one or more processors, of second signals generated by the at least one microphone.

Clause 67. The blocking circuitry of clause 66, wherein the first trigger comprises an audio trigger received from at least one second microphone.

Clause 68. The blocking circuitry of any one of clauses 66-67, wherein the audio trigger comprises a command spoken by a user within a predetermined distance of the smart device.

Clause 69. The blocking circuitry of any one of clauses 66-68, wherein the smart device further comprises the at least one second microphone.

Clause 70. The blocking circuitry of any one of clauses 66-69, wherein the blocking circuitry is configured to detect the first trigger associated with activating the blocking circuitry by: processing, using a speech recognition algorithm, the audio trigger; and determining, based on the processing, that one or more words in the audio trigger are associated with the triggered state.

Clause 71. A system comprising: a smart device comprising: at least one microphone; one or more processors; and a blocking module interface; and a removable blocking device adapted to connect to the smart device via the blocking module interface; wherein the removable blocking device is configured to, when connected to the blocking module interface: prevent receipt, by the one or more processors, of first signals generated by the at least one microphone while the removable blocking device is in an untriggered state, wherein each communication path between the at least one microphone and the one or more processors is conducted via the blocking module interface; detect, using an input device of the removable blocking device, a first trigger associated with activating the removable blocking device, wherein the first trigger is different from a second trigger associated with activating the smart device; and based on detecting the first trigger, temporarily enter a triggered state and allow receipt, by the one or more processors and via the blocking module interface, of second signals generated by the at least one microphone.

Clause 72. The system of clause 71, wherein, when the removable blocking device is disconnected from the blocking module interface, the one or more processors receive third signals from the at least one microphone and via the blocking module interface.

Clause 73. The system of any one of clauses 71-72, wherein connection of the removable blocking device to the blocking module interface prevents the one or more processors from receiving the third signals.

Clause 74. The system of any one of clauses 71-73, wherein the first trigger comprises an audio trigger received from at least one second microphone.

Clause 75. The system of any one of clauses 71-74, wherein the audio trigger comprises a command spoken by a user within a predetermined distance of the smart device.

Clause 76. The system of any one of clauses 71-75, wherein the removable blocking device comprises the at least one second microphone.

Clause 77. The system of any one of clauses 71-76, wherein the removable blocking device is configured to detect the first trigger associated with activating the removable blocking device by: determining, based on processing, using a speech recognition algorithm, the audio trigger, that one or more words in the audio trigger are associated with the triggered state.

Clause 78. The system of any one of clauses 71-77, wherein the first trigger corresponds to a movement detected by an optical sensor of the removable blocking device.

Clause 79. The system of any one of clauses 71-78, wherein the first trigger corresponds to a movement detected by a wearable device.

Clause 80. The system of any one of clauses 71-79, wherein preventing receipt of the first signals comprises grounding at least a portion of a circuit associated with the at least one microphone.

Clause 81. The system of any one of clauses 71-80, wherein the removable blocking device is further configured to: return, based on determining that a time period associated with the triggered state has elapsed, to the untriggered state.

Clause 82. The system of any one of clauses 71-81, wherein the removable blocking device is configured to temporarily enter the triggered state and allow receipt of the second signals by: determining, based on processing the first trigger to determine an origin of the first trigger, that the smart device did not output the first trigger.

Clause 83. The system of any one of clauses 71-82, wherein preventing receipt of signals from the at least one microphone comprises outputting, to the one or more processors, third signals comprising one or more first sounds configured to emulate one or more second sounds from an environment associated with the smart device.

Clause 84. The system of any one of clauses 71-83, wherein a first volume of the one or more first sounds is based on a second volume of the one or more second sounds.

Clause 85. The system of any one of clauses 71-84 claim 1, wherein the removable blocking device is configured to temporarily enter the triggered state and allow receipt of the second signals by: processing the second signals to obscure an identity of at least one user; and output, to the one or more processors, the processed second signals.

Clause 86. The system of any one of clauses 71-85, wherein, when the removable blocking device is in the untriggered state, each communication path between the at least one microphone and the one or more processors is grounded.

Clause 87. The system of any one of clauses 71-86, wherein the removable blocking device is further configured to indicate when electrical activity associated with the at least one microphone is detected.

Clause 88. The system of any one of clauses 71-87, wherein the removable blocking device is further configured to indicate when the removable blocking device is in the triggered state.

Clause 89. The system of any one of clauses 71-88, wherein the removable blocking device is incapable of communication over a network used by the smart device.

Clause 90. The system of any one of clauses 71-89, wherein the first trigger is configurable by a user.

Clause 91. A method comprising: preventing, by a removable blocking device physically connected to a blocking module interface of a smart device, receipt, by one or more processors of the smart device, of first signals generated by at least one microphone of the smart device while the removable blocking device is in an untriggered state, wherein each communication path between the at least one microphone and the one or more processors is conducted via the blocking module interface; detecting, using an input device of the removable blocking device, a first trigger associated with activating the removable blocking device, wherein the first trigger is different from a second trigger associated with activating the smart device; and based on detecting the first trigger, temporarily entering, by the removable blocking device, a triggered state and allowing receipt, by the one or more processors and via the blocking module interface, of second signals generated by the at least one microphone.

Clause 92. The method of clause 91, further comprising: connecting, via the blocking module interface, the removable blocking device to the smart device, wherein connecting the removable blocking device prevents receipt, by the one or more processors, of third signals from the at least one microphone.

Clause 93. The method of any one of clauses 91-92, further comprising: disconnecting, via the blocking module interface, the removable blocking device from the smart device, wherein disconnecting the removable blocking device allows receipt, by the one or more processors, of third signals from the at least one microphone.

Clause 94. The method of any one of clauses 91-93, wherein the first trigger comprises an audio trigger received from at least one second microphone.

Clause 95. The method of any one of clauses 91-94, wherein the removable blocking device is configured to detect the first trigger associated with activating the removable blocking device by: determining, based on processing, using a speech recognition algorithm, the audio trigger, that one or more words in the audio trigger are associated with the triggered state.

Clause 96. A removable blocking device, wherein the removable blocking device is configured to, when connected to a blocking module interface of a smart device: prevent receipt, by one or more processors of the smart device, of first signals generated by at least one microphone of the smart device while the removable blocking device is in an untriggered state, wherein each communication path between the at least one microphone and the one or more processors is conducted via the blocking module interface; detect, using an input device of the removable blocking device, a first trigger associated with activating the removable blocking device, wherein the first trigger is different from a second trigger associated with activating the smart device; and based on detecting the first trigger, temporarily enter a triggered state and allow receipt, by the one or more processors and via the blocking module interface, of second signals generated by the at least one microphone.

Clause 97. The removable blocking device of clause 96, wherein the first trigger comprises an audio trigger received from at least one second microphone.

Clause 98. The removable blocking device of any one of clauses 96-97, wherein the audio trigger comprises a command spoken by a user within a predetermined distance of the smart device.

Clause 99. The removable blocking device of any one of clauses 96-98, wherein the removable blocking device comprises the at least one second microphone.

Clause 100. The removable blocking device of any one of clauses 96-99, wherein the removable blocking device is configured to detect the first trigger associated with activating the removable blocking device by: determining, based on processing, using a speech recognition algorithm, the audio trigger, that one or more words in the audio trigger are associated with the triggered state.

Clause 101. A system comprising: a smart device comprising at least one first microphone; and a blocking device comprising at least one second microphone and an output device, wherein the blocking device is configured to: determine, using the at least one second microphone, one or more sounds corresponding to an environment associated with the smart device; output, using the output device, first audio to the at least one first microphone, wherein the first audio is generated based on a volume of the one or more sounds and is configured to impede receipt, by the at least one first microphone, of environmental audio while the blocking device is in an untriggered state; detect, using the at least one second microphone, a first trigger associated with activating the blocking device, wherein the first trigger is different from a second trigger associated with activating the smart device; and based on detecting the first trigger, temporarily enter a triggered state and output, to the at least one first microphone and using the output device, the second trigger.

Clause 102. The system of clause 101, wherein a first volume of the first audio is configured to be greater than the volume of the one or more sounds.

Clause 103. The system of any one of clauses 101-102, further comprising: selecting the one or more sounds based on the volume of the one or more sounds satisfying a threshold.

Clause 104. The system of any one of clauses 101-103, wherein the first trigger comprises an audio trigger received from at least one second microphone.

Clause 105. The system of any one of clauses 101-104, wherein the audio trigger comprises a command spoken by a user within a predetermined distance of the smart device.

Clause 106. The system of any one of clauses 101-105, wherein one or more first words associated with the first trigger are different than one or more second words associated with the second trigger.

Clause 107. The system of any one of clauses 101-106, wherein the blocking device is configured to detect the first trigger associated with activating the blocking device by: determining, based on processing, using a speech recognition algorithm, the audio trigger, that one or more words in the audio trigger are associated with the triggered state.

Clause 108. The system of any one of clauses 101-107, wherein the first trigger corresponds to a movement detected by an optical sensor of the blocking device.

Clause 109. The system of any one of clauses 101-108, wherein the first trigger corresponds to a movement detected by a wearable device.

Clause 110. The system of any one of clauses 101-109, wherein impeding receipt of the environmental audio comprises shielding at least a portion of the at least one first microphone.

Clause 111. The system of any one of clauses 101-110, wherein the blocking device is further configured to: return, based on determining that a time period associated with the triggered state has elapsed, to the untriggered state.

Clause 112. The system of any one of clauses 101-111, wherein the blocking device is configured to temporarily enter the triggered state and output the second trigger by: determining, based on processing the first trigger to determine an origin of the first trigger, that the smart device did not output the first trigger.

Clause 113. The system of any one of clauses 101-112, wherein the first audio is configured to emulate speech by one or more users of the smart device.

Clause 114. The system of any one of clauses 101-113, wherein the blocking device is further configured to determine the one or more sounds by: recording, for a period of time while the blocking device is in the untriggered state, the one or more sounds.

Clause 115. The system of any one of clauses 101-114, wherein the second trigger is configured to obscure an identity of at least one user.

Clause 116. The system of any one of clauses 101-115, wherein the blocking device is configured to attach to at least a portion of a housing of the smart device.

Clause 117. The system of any one of clauses 101-116, wherein the blocking device is configured to impede the at least one first microphone from receiving any audio other than audio originating from the output device.

Clause 118. The system of any one of clauses 101-117, wherein the blocking device is further configured to indicate when the blocking device is in the triggered state.

Clause 119. The system of any one of clauses 101-118, wherein the blocking device is incapable of communication over a network used by the smart device.

Clause 120. The system of any one of clauses 101-119, wherein the first trigger is configurable by a user.

Clause 121. A method comprising: determining, using at least one first microphone of a blocking device, one or more sounds corresponding to an environment associated with a smart device; outputting, using an output device of the blocking device, first audio to at least one second microphone of the smart device, wherein the first audio is based on the one or more sounds and is configured to impede receipt, by the at least one second microphone, of environmental audio while the blocking device is in an untriggered state; detecting, using the at least one first microphone, a first trigger associated with activating the blocking device, wherein the first trigger is different from a second trigger associated with activating the smart device; and based on detecting the first trigger, temporarily entering a triggered state and outputting, to the at least one second microphone and using the output device, the second trigger.

Clause 122. The method of clause 121, wherein the first trigger comprises an audio trigger received from at least one first microphone.

Clause 123. The method of any one of clauses 121-122, wherein the audio trigger comprises a command spoken by a user within a predetermined distance of the smart device.

Clause 124. The method of any one of clauses 121-123, wherein one or more first words associated with the first trigger are different than one or more second words associated with the second trigger.

Clause 125. The method of any one of clauses 121-124, wherein the blocking device is configured to detect the first trigger associated with activating the blocking device by: determining, based on processing, using a speech recognition algorithm, the audio trigger, that one or more words in the audio trigger are associated with the triggered state.

Clause 126. A blocking device comprising at least one first microphone and an output device, wherein the blocking device is configured to: determine, using the at least one first microphone, one or more sounds corresponding to an environment associated with a smart device; output, using the output device, first audio to at least one second microphone of the smart device, wherein the first audio is based on the one or more sounds and is configured to impede receipt, by the at least one second microphone, of environmental audio while the blocking device is in an untriggered state; detect, using the at least one first microphone, a first trigger associated with activating the blocking device, wherein the first trigger is different from a second trigger associated with activating the smart device; and based on detecting the first trigger, temporarily enter a triggered state and output, to the at least one second microphone and using the output device, the second trigger.

Clause 127. The blocking device of clause 126, wherein the first trigger comprises an audio trigger received from at least one first microphone.

Clause 128. The blocking device of any one of clauses 126-127, wherein the audio trigger comprises a command spoken by a user within a predetermined distance of the smart device.

Clause 129. The blocking device of any one of clauses 126-128, wherein one or more first words associated with the first trigger are different than one or more second words associated with the second trigger.

Clause 130. The blocking device of any one of clauses 126-129, wherein the blocking device is configured to detect the first trigger associated with activating the blocking device by: determining, based on processing, using a speech recognition algorithm, the audio trigger, that one or more words in the audio trigger are associated with the triggered state.

Clause 131. A method comprising: detecting first electrical signals associated with a communications path between at least one microphone of a smart device and one or more processors of the smart device; determining, based on the first electrical signals, that blocking circuitry prevents receipt, by the one or more processors, of first signals generated by the at least one microphone while the blocking circuitry is in an untriggered state, wherein each communication path between the at least one microphone and the one or more processors is conducted via the blocking circuitry; detecting second electrical signals associated with the communications path between the at least one microphone of the smart device and the one or more processors of the smart device; determining, based on the second electrical signals, that the blocking circuitry detects, using an input device of the blocking circuitry, a first trigger associated with activating the blocking circuitry, wherein the first trigger is different from a second trigger associated with activating the smart device; detecting third electrical signals associated with the communications path between the at least one microphone of the smart device and the one or more processors of the smart device; and determining, based on the third electrical signals, that, based on detecting the first trigger, the blocking circuitry temporarily enters a triggered state and allows receipt, by the one or more processors, of second signals generated by the at least one microphone.

Clause 132. The method of clause 131, wherein detecting the first electrical signals comprises monitoring one or more circuits of the smart device.

Clause 133. The method of any one of clauses 131-132, wherein detecting the first electrical signals comprises monitoring a power use of the smart device.

Clause 134. The method of claim 1, further comprising: assigning, based on the first electrical signals, the second electrical signals, and the third electrical signals, a privacy level to the blocking circuitry.

Clause 135. The method of any one of clauses 131-134, wherein the first trigger comprises an audio trigger received from at least one second microphone.

Clause 136. The method of any one of clauses 131-135, wherein the first trigger corresponds to a movement detected by an optical sensor of the blocking circuitry.

Clause 137. The method of any one of clauses 131-136, wherein the first trigger corresponds to a movement detected by a wearable device.

Clause 138. The method of any one of clauses 131-137, wherein preventing receipt of the first signals comprises grounding at least a portion of a circuit associated with the at least one microphone.

Clause 139. The method of any one of clauses 131-138, further comprising determining, based on fourth electrical signals, that the blocking circuitry returns, based on determining that a time period associated with the triggered state has elapsed, to the untriggered state.

Clause 140. The method of any one of clauses 131-139, further comprising determining, based on the third electrical signals, that the blocking circuitry is configured to temporarily enter the triggered state and allow receipt of the second signals by: determining, based on processing the first trigger to determine an origin of the first trigger, that the smart device did not output the first trigger.

Clause 141. The method of any one of clauses 131-140, wherein preventing receipt of signals from the at least one microphone comprises outputting, to the one or more processors, third signals comprising one or more first sounds configured to emulate one or more second sounds from an environment associated with the smart device.

Clause 142. The method of any one of clauses 131-141, wherein a first volume of the one or more first sounds is based on a second volume of the one or more second sounds.

Clause 143. The method of any one of clauses 131-142, further comprising determining, based on the first electrical signals, that the blocking circuitry determines the one or more first sounds by recording, for a period of time while the blocking circuitry is in the untriggered state, the one or more second sounds.

Clause 144. The method of any one of clauses 131-143, further comprising determining, based on the third electrical signals, that the blocking circuitry is configured to temporarily enter the triggered state and allow receipt of the second signals by: processing the second signals to obscure an identity of at least one user; and outputting, to the one or more processors, the processed second signals.

Clause 145. A method comprising: detecting first electrical signals associated with a communications path between at least one microphone of a smart device and one or more processors of the smart device; determining, based on the first electrical signals, that a removable blocking device, connected to the smart device via a blocking module interface, prevents receipt, by the one or more processors of the smart device, of first signals generated by the at least one microphone of the smart device while the removable blocking device is in an untriggered state, wherein each communication path between the at least one microphone and the one or more processors is conducted via the blocking module interface; detecting second electrical signals associated with the communications path between the at least one microphone of the smart device and the one or more processors of the smart device; determining, based on the second electrical signals, that the removable blocking device detects, using an input device of the removable blocking device, a first trigger associated with activating the removable blocking device, wherein the first trigger is different from a second trigger associated with activating the smart device; detecting third electrical signals associated with the communications path between the at least one microphone of the smart device and the one or more processors of the smart device; and determining, based on the third electrical signals, that, based on detecting the first trigger, the removable blocking device temporarily enters a triggered state and allows receipt, by the one or more processors and via the blocking module interface, of second signals generated by the at least one microphone.

Clause 146. The method of clause 145, wherein detecting the first electrical signals comprises monitoring one or more circuits of the smart device.

Clause 147. The method of any one of clauses 145-146, wherein detecting the first electrical signals comprises monitoring a power use of the smart device.

Clause 148. The method of any one of clauses 145-147, further comprising: assigning, based on the first electrical signals, the second electrical signals, and the third electrical signals, a privacy level to the removable blocking device.

Clause 149. The method of any one of clauses 145-148, wherein the first trigger comprises an audio trigger received from at least one second microphone.

Clause 150. The method of any one of clauses 145-149, wherein the first trigger corresponds to a movement detected by an optical sensor of the removable blocking device.

Clause 151. The method of any one of clauses 145-150, wherein the first trigger corresponds to a movement detected by a wearable device.

Clause 152. The method of any one of clauses 145-151, wherein preventing receipt of the first signals comprises grounding at least a portion of a circuit associated with the at least one microphone.

Clause 153. The method of any one of clauses 145-152, further comprising determining, based on fourth electrical signals, that the removable blocking device returns, based on determining that a time period associated with the triggered state has elapsed, to the untriggered state.

Clause 154. The method of any one of clauses 145-153, further comprising determining, based on the third electrical signals, that the removable blocking device is configured to temporarily enter the triggered state and allow receipt of the second signals by: determining, based on processing the first trigger to determine an origin of the first trigger, that the smart device did not output the first trigger.

Clause 155. The method of any one of clauses 145-154, wherein preventing receipt of signals from the at least one microphone comprises outputting, to the one or more processors, third signals comprising one or more first sounds configured to emulate one or more second sounds from an environment associated with the smart device.

Clause 156. The method of any one of clauses 145-155, wherein a first volume of the one or more first sounds is based on a second volume of the one or more second sounds.

Clause 157. The method of any one of clauses 145-156, further comprising determining, based on the first electrical signals, that the removable blocking device is configured to determine the one or more first sounds by recording, for a period of time while the removable blocking device is in the untriggered state, the one or more second sounds.

Clause 158. The method of any one of clauses 145-157, further comprising determining, based on the third electrical signals, that the removable blocking device is configured to temporarily enter the triggered state and allow receipt of the second signals by: processing the second signals to obscure an identity of at least one user; and output, to the one or more processors, the processed second signals.

Clause 159. A method comprising: detecting first electrical signals associated with a communications path between at least one first microphone of a smart device and one or more processors of the smart device; determining, based on the first electrical signals, that a blocking device determines, using at least one second microphone of the blocking device, one or more sounds corresponding to an environment associated with the smart device; detecting second electrical signals associated with the communications path between the at least one microphone of the smart device and the one or more processors of the smart device; determining, based on the second electrical signals, that the blocking device is configured to output, using an output device of the blocking device, first audio to the at least one first microphone of the smart device, wherein the first audio is based on the one or more sounds and is configured to impede receipt, by the at least one first microphone, of environmental audio while the blocking device is in an untriggered state; detecting third electrical signals associated with the communications path between the at least one microphone of the smart device and the one or more processors of the smart device; determining, based on the third electrical signals, that the blocking device is configured to detect, using the at least one second microphone of the blocking device, a first trigger associated with activating the blocking device, wherein the first trigger is different from a second trigger associated with activating the smart device; detecting fourth electrical signals associated with the communications path between the at least one microphone of the smart device and the one or more processors of the smart device; and determining, based on the fourth electrical signals, that the blocking device is configured to, based on detecting the first trigger, temporarily enter a triggered state and output, to the at least one first microphone and using the output device, the second trigger.

Clause 160. The method of clause 159, wherein detecting the first electrical signals comprises monitoring a power use of the smart device.

Clause 161. A method comprising: detecting, by a blocker, at least one of a position and orientation of a mobile device; determining, based on the at least one of the position and orientation of the mobile device, that the mobile device is in blocking mode; intercepting, based on a determination that the mobile device is in blocking mode, one or more signals received via one or more inputs of the mobile device; detecting a trigger associated with a triggered state; and entering, based on detecting the trigger, the triggered state that allows one or more processors of the mobile device to receive one or more signals from the one or more inputs of the mobile device.

Clause 162. The method of clause 161, wherein detecting at least one of a position and orientation of a mobile device further comprises: determining that the mobile device has been stationary for a predetermined amount of time.

Clause 163. The method of any one of clauses 161-162, wherein detecting at least one of a position and orientation of a mobile device further comprises: determining which way the mobile device is facing.

Clause 164. The method of any one of clauses 161-163, wherein detecting at least one of a position and orientation of a mobile device further comprises: determining a first orientation of the mobile device; determining a second orientation of the mobile device; determining whether the second orientation of the mobile device satisfies a first threshold; and determining, based on a determination that the second orientation does not satisfy the first threshold, that the mobile device is in blocking mode.

Clause 165. The method of any one of clauses 161-164, wherein intercepting the one or more signals comprises: interrupting a transmission medium of the mobile device.

Clause 166. The method of any one of clauses 161-165, wherein intercepting the one or more signals comprises: interrupting one or more wires of the mobile device.

Clause 167. The method of any one of clause 161-166, wherein intercepting the one or more signals comprises: grounding at least a portion of a circuit associated with the via one or more inputs of the mobile device.

Clause 168. The method of any one of clauses 161-167, wherein the trigger comprises a gesture input.

Clause 169. The method of any one of clauses 161-168, wherein the gesture input comprises a shaking movement.

Clause 170. The method of any one of clauses 161-169, wherein detecting the trigger further comprises: receiving an audio trigger via the one or more inputs of the mobile device.

Clause 171. The method of any one of clauses 161-170, wherein the audio trigger comprises a command spoken by a user within a predetermined distance of the mobile device.

Clause 172. The method of claim 10, wherein the audio trigger overrides one or more gesture inputs.

Clause 173. A computing device comprising: one or more processors; and memory storing instructions that, when executed by the one or more processors, cause the computing device to: detect at least one of a position and orientation of the computing device; determine, based on the at least one of the position and orientation of the computing device, that the computing device is in blocking mode; intercept, based on a determination that the computing device is in blocking mode, one or more signals received via one or more inputs of the computing device; detect a trigger associated with a triggered state; and enter, based on detecting the trigger, the triggered state that allows the one or more processors to receive one or more signals from the one or more inputs.

Clause 174. The computing device of clause 173, wherein the instructions further cause the computing device to: determine that the computing device has been stationary for a predetermined amount of time.

Clause 175. The computing device of any one of clauses 173-174, wherein the instructions further cause the computing device to: determine which way the computing device is facing.

Clause 176. The computing device of any one of clauses 173-175, wherein the instructions further cause the computing device to: determine a first orientation of the computing device; determining a second orientation of the computing device; determining whether the second orientation of the computing device satisfies a first threshold; and determining, based on a determination that the second orientation does not satisfy the first threshold, that the computing device is in blocking mode.

Clause 177. The computing device of any one of clauses 173-176, wherein the instructions further cause the computing device to: interrupt a transmission medium of the computing device.

Clause 178. The computing device of any one of clauses 173-177, wherein the instructions further cause the computing device to: interrupt one or more wires of the computing device.

Clause 179. The computing device of any one of clauses 173-178, wherein intercepting the one or more signals comprises grounding at least a portion of a circuit associated with the via one or more inputs.

Clause 180. The computing device of any one of clauses 173-179, wherein the trigger comprises a gesture input.

Clause 181. The computing device of any one of clauses 173-180, wherein the gesture input comprises a shaking movement.

Clause 182. The computing device of any one of clauses 173-181, wherein the instructions further cause the computing device to: receive an audio trigger via the one or more inputs.

Clause 183. The computing device of any one of clauses 173-182, wherein the audio trigger comprises a command spoken by a user within a predetermined distance of the computing device.

Clause 184. The computing device of any one of clauses 173-183, wherein the audio trigger overrides one or more gesture inputs.

Clause 185. A blocking device comprising: intercept circuitry configured to prevent one or more signals from being transmitted from one or more inputs to a processor of a mobile device; an accelerometer configured to detect a gesture input; and output circuitry configured to allow, based on the gesture input, one or more second signals to be received by the processor of the mobile device.

Clause 186. The blocking device of clause 185, further comprising: listening circuitry configured to determine, using the microphone, an audio trigger, wherein the audio trigger causes the output circuitry to allow the one or more second signals to be received by the processor of the mobile device.

Clause 187. The blocking device of any one of clauses 185-186, wherein the blocking device draws power from the mobile device.

Clause 188. The blocking device of any one of clauses 185-187, wherein the blocking device does not comprise a processor.

Clause 189. A system comprising: a mobile device comprising: one or more inputs, wherein the one or more inputs comprise at least one microphone and at least one image capture device; one or more processors; and a blocking device adapted to connect to the mobile device, wherein the blocking device is configured to, when connected to the mobile device: detect at least one of a position and orientation of the mobile device; determine, based on the at least one of the position and orientation of the mobile device, that the mobile device is in blocking mode; intercept, based on a determination that the mobile device is in blocking mode, one or more signals received via one or more inputs of the mobile device; detect a trigger associated with a triggered state; and enter, based on detecting the trigger, the triggered state that allows the one or more processors of the mobile device to receive one or more signals from the one or more inputs of the mobile device.

Clause 190. The system of clause 189, wherein the trigger comprises a repetitive motion of the mobile device.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
   detecting, by a blocker device, at least one of a position or an orientation of a mobile device;
   determining, by the blocker device and based on the detected at least one of the position or the orientation of the mobile device, that the blocker device is in blocking mode;
   generating, by the blocker device and based on a determination that the blocker device is in blocking mode, a jamming signal;

outputting, by the blocker device, the jamming signal toward one or more inputs of the mobile device, wherein outputting the jamming signal prevents the one or more inputs of the mobile device from discerning signals other than the jamming signal;

detecting, by the blocker device, a gesture input based on a change of at least one of the position or the orientation of the mobile device;

determining, by the blocker device and based on the gesture input, a trigger associated with a triggered state is satisfied;

entering, by the blocker device and based on a determination that the trigger is satisfied, the triggered state;

ceasing, by the blocker device and during the triggered state, output of the jamming signal; and allowing, by the blocker device and during the triggered state, one or more second audio signals to be received by the one or more inputs of the mobile device.

2. The method of claim 1, wherein determining that the blocker device is in blocking mode comprises:
determining that the mobile device has been stationary for a predetermined amount of time.

3. The method of claim 1, wherein determining that the blocker device is in blocking mode comprises:
determining which way the mobile device is facing.

4. The method of claim 1, wherein determining that the blocker device is in blocking mode further comprises:
determining a first orientation of the mobile device;
determining a second orientation of the mobile device;
determining whether a combination of the first orientation of the mobile device and the second orientation of the mobile device satisfies the trigger; and
determining, based on a determination that the combination of the first orientation of the mobile device and the second orientation of the mobile device does not satisfy the trigger, that the mobile device is in blocking mode.

5. The method of claim 1, wherein the gesture input comprises at least one of a predetermined change in position or a predetermined change of orientation of the mobile device.

6. The method of claim 1, wherein the change of at least one of the position or the orientation of the mobile device comprises a shaking movement.

7. The method of claim 1, further comprising:
receiving an audio trigger via one or more second inputs of the blocker device.

8. The method of claim 7, wherein the audio trigger overrides the gesture input.

9. The method of claim 1, wherein the blocker device is a case for the mobile device.

10. The method of claim 1, wherein detecting the gesture input based on the change of at least one of the position or the orientation of the mobile device comprises:
receiving data from one or more sensors of the mobile device.

11. The method of claim 1, wherein detecting the gesture input based on the change of at least one of the position or the orientation of the mobile device comprises using one or more sensors of the blocker device.

12. The method of claim 11, wherein the one or more sensors comprise an accelerometer.

13. The method of claim 1, further comprising:
detecting, by the blocker device, an alert associated with an incoming communication for the mobile device, wherein determining the trigger associated with the triggered state is further based on detecting the alert associated with the incoming communication.

14. The method of claim 1, wherein:
one or more second inputs remain enabled when the blocking mode disables the one or more inputs of the mobile device, and
the one or more inputs comprise at least one of a microphone or a camera.

15. The method of claim 14, wherein the one or more second inputs comprise a touchscreen.

16. The method of claim 1, wherein the blocker device comprises a SIM card inserted into the mobile device.

17. The method of claim 1, wherein the jamming signal comprises one or more ultrasonic sound waves.

18. The method of claim 1, wherein generating the jamming signal comprises:
determining, using one or more microphones of the blocker device, one or more characteristics of environmental audio; and
adjusting, based on the one or more characteristics of the environmental audio, one or more parameters of the jamming signal.

19. The method of claim 1, wherein the jamming signal comprises one or more noise profiles.

20. The method of claim 1, further comprising:
re-disabling, based on a determination that a predetermined amount of time has elapsed, the one or more inputs of the mobile device by resuming output of the jamming signal toward the one or more inputs.

21. The method of claim 1, wherein the jamming signal is generated using one or more light sources.

22. A blocker device comprising:
one or more processors;
a speaker; and
memory storing instructions that, when executed by the one or more processors, cause the blocker device to:
detect at least one of a position or an orientation of a mobile device;
determine, based on the detected at least one of the position or an orientation of the mobile device, that the blocker device is in blocking mode;
generate, based on a determination that the blocker device is in blocking mode, a jamming signal;
output, via the speaker and toward one or more inputs of the mobile device, the jamming signal, wherein outputting the jamming signal prevents the one or more inputs of the mobile device from discerning signals other than the jamming signal;
detect a gesture input based on a change of at least one of the position or the orientation of the mobile device;
determine, based on detecting the gesture input, a trigger associated with a triggered state is satisfied;
enter, based on a determination that the trigger is satisfied, the triggered state;
cease during the triggered state, output of the jamming signal; and
allow, during the triggered state, one or more second audio signals to be received by the one or more inputs of the mobile device.

23. The blocker device of claim 22, wherein the instructions further cause the blocker device to determine that the blocker device is in blocking mode by causing the blocker device to:
determine that the mobile device has been stationary for a predetermined amount of time.

24. The blocker device of claim 22, wherein the instructions further cause the blocker device to determine that the blocker device is in blocking mode by causing the blocker device to:

determine which way the mobile device is facing.

25. The blocker device of claim 22, wherein the instructions further cause the blocker device to determine that the blocker device is in blocking mode by causing the blocker device to:

determine a first orientation of the mobile device;
determine a second orientation of the mobile device;
determine whether a combination of the first orientation of the mobile device and the second orientation of the mobile device satisfies the trigger; and
determine, based on a determination that the combination of the first orientation of the mobile device and the second orientation of the mobile device does not satisfy the trigger, that the blocker device is in blocking mode.

26. The blocker device of claim 22, wherein the gesture input comprises a shaking movement.

27. The blocker device of claim 22, wherein the blocker device draws power from the mobile device.

28. A system comprising:

a mobile device comprising:
one or more inputs, wherein the one or more inputs comprise at least one microphone and at least one image capture device;
one or more processors; and
a blocking device adapted to connect to the mobile device, wherein the blocking device is configured to, when connected to the mobile device:
detect at least one of a position or an orientation of the mobile device;
determine, based on the detected at least one of the position or the orientation of the mobile device, that the blocking device is in blocking mode;
generate, based on a determination that the blocking device is in blocking mode, a jamming signal;
output the jamming signal toward the one or more inputs of the mobile device, wherein outputting the jamming signal prevents the one or more inputs of the mobile device from discerning signals other than the jamming signal;
detect a gesture input based on a change of at least one of the position or the orientation of the mobile device;
determine, based on detecting the gesture input, a trigger associated with a triggered state is satisfied;
enter, based on a determination that the trigger is satisfied, the triggered state;
cease, during the triggered state, output of the jamming signal; and
allow, during the triggered state, one or more second audio signals to be received by the one or more inputs.

29. The system of claim 28, wherein the gesture input comprises a repetitive motion of the mobile device.

30. The system of claim 28, wherein the blocking device comprises insulation to prevent the one or more inputs of the mobile device from discerning the one or more second audio signals.

* * * * *

UNITED STATES PATENT AND TRADEMARK OFFICE
CERTIFICATE OF CORRECTION

Page 1 of 1

PATENT NO. : 11,184,711 B2
APPLICATION NO. : 16/785202
DATED : November 23, 2021
INVENTOR(S) : Thomas Stachura It is certified that error appears in the above-identified patent and that said Letters Patent is hereby corrected as shown below:

In the Claims

Column 64, Claim 22, Line 57:
After "cease", insert --,--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*